(12) United States Patent
Bai et al.

(10) Patent No.: US 12,499,975 B2
(45) Date of Patent: Dec. 16, 2025

(54) METHODS AND APPARATUS FOR ENHANCED OIL RECOVERY

(71) Applicant: UNIVERSITY OF WYOMING, Laramie, WY (US)

(72) Inventors: Shixun Bai, Laramie, WY (US); Jan Kubelka, Laramie, WY (US); Mohammad Piri, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 1014 days.

(21) Appl. No.: 17/527,400

(22) Filed: Nov. 16, 2021

(65) Prior Publication Data

US 2022/0157406 A1     May 19, 2022

Related U.S. Application Data

(60) Provisional application No. 63/114,311, filed on Nov. 16, 2020.

(51) Int. Cl.
*G16C 10/00* (2019.01)
*C09K 8/584* (2006.01)
(Continued)

(52) U.S. Cl.
CPC .............. *G16C 10/00* (2019.02); *C09K 8/584* (2013.01); *G06Q 50/02* (2013.01); *G16C 20/30* (2019.02); *G16C 20/40* (2019.02)

(58) Field of Classification Search
CPC ........ G16C 10/00; G16C 20/30; G16C 20/40; G16C 20/10; G16C 60/00; C09K 8/584;
(Continued)

(56) References Cited

U.S. PATENT DOCUMENTS 8,589,130 B2 * 11/2013 Stukan ................... G16C 20/30
                                                                 73/64.55
2009/0114387 A1    5/2009   Horvath Szabo et al.
(Continued)

FOREIGN PATENT DOCUMENTS

| CN | 110412203 A | 11/2019 |
|---|---|---|
| WO | 2011059650 A2 | 5/2011 |
| WO | 2013174679 A1 | 11/2013 |

OTHER PUBLICATIONS

Japanese Office Action dated Sep. 13, 2024 for Application No. 2023-528727.
(Continued)

*Primary Examiner* — Hoang M Nguyen
(74) *Attorney, Agent, or Firm* — Patterson + Sheridan, LLP

(57) ABSTRACT

Embodiments of the present disclosure generally relate to methods and apparatus for enhanced oil recovery. In an embodiment, a method of enhanced oil recovery from a reservoir is provided. The method includes determining a three-dimensional molecular association between simulated oil and a simulated surface using molecular dynamics, and selecting a reservoir additive from a plurality of additives. The method further includes introducing the reservoir additive to the reservoir, and recovering oil from the reservoir using the reservoir additive. Methods of testing a candidate chemical or candidate formulation for use in enhanced oil recovery, and methods of determining an effect of a candidate chemical or formulation of candidate chemicals for use in enhanced oil recovery are also described. Oil extraction apparatus are also provided.

20 Claims, 20 Drawing Sheets

(51) Int. Cl.
 G06Q 50/02 (2024.01)
 G16C 20/30 (2019.01)
 G16C 20/40 (2019.01)
(58) Field of Classification Search
 CPC .... C09K 8/588; C09K 2208/10; G06Q 50/02;
  E21B 43/16; E21B 2200/20
 See application file for complete search history.

(56) References Cited

U.S. PATENT DOCUMENTS

| | | | |
|---|---|---|---|
| 2011/0112815 | A1 | 5/2011 | Stukan et al. |
| 2013/0067999 | A1* | 3/2013 | Xu .................... G01N 13/02 |
| | | | 73/64.48 |
| 2014/0151041 | A1 | 6/2014 | Hernandez Altamirano et al. |
| 2016/0024372 | A1* | 1/2016 | Fathi Najafabadi .. E21B 49/087 |
| | | | 166/279 |
| 2017/0234126 | A1 | 8/2017 | Al-Shalabi et al. |
| 2017/0298714 | A1 | 10/2017 | Ferreira et al. |
| 2018/0327651 | A1* | 11/2018 | Piri .......................... C09K 8/18 |

OTHER PUBLICATIONS

Saudi Arabian Office Action dated Aug. 14, 2024 for Application No. 523440789.
V. A. Rigo, C. O. Metin, Q. P. Nguyen, and C. R. Miranda, "Hydrocarbon adsorption on carbonate mineral surfaces: A first-principles study with Vander Waals interactions," J. Phys. Chem. C, vol. 116, pp. 24538-24548, 2012.
E. Escamilla-Roa, C. I. Sainz-Diaz, F. J. Huertas, and A. Hernandez-Laguna, "Adsorption of molecules onto (1014) dolomite surface: An application of computational studies for microcalorimetry," J. Phys. Chem. C, vol. 117, pp. 17583-17590, 2013.
S. R. Gadre and S. S. Pingale, "An electrostatic investigation: how polar are ionic surfactant hydrocarbon tails?" Chem. Commun., pp. 595-596, 1996.
A. Awolayo, H. Sarma, and A. A. Sumaiti, "An experimental investigation into the impact of sulfate ions in smart water to improve oil recovery in carbonate reservoirs," Transp. Porous Media, vol. 111, pp. 649-668, 2016.
C. Rukuan, L. Yuetian, W. Junqiang, X. Jing, P. Jian, and L. Changyong, "Molecular dynamics simulation of wettability of calcite and dolomite," Chi. J. Comput. Phys., vol. 36, pp. 474-482, 2019.
Tang, X., "Molecular Dynamics Simulation of Surfactant Flooding Driven Oil-Detachment in Nano-Silica Channels", J. Phys. Chem. B 2019, 123, 277-288.
Canadian Office dated May 30, 2024 for Application No. 3,199,170.
Brazilian Office Action dated Apr. 30, 2024 for Application No. BR1120230093600.
Algerian Office Action dated Dec. 19, 2023 for Application No. 230732.
Extended European Search Report dated Nov. 18, 2024 for Application No. 21893011.3.
Akai Takashi et al: "Mechanisms of Microscopic Displacement During Enhanced Oil Recovery in Mixed-Wet Rocks Revealed Using Direct Numerical Simulation", Transport in Porous Media, Springer Netherlands, Dordrecht, vol. 130, No. 3, Sep. 25, 2019 (Sep. 25, 2019), pp. 731-749.
Van Cappellen, et al., A Surface Complexation Model of the Carbonate Mineral-aqueous Solution Interface, Geochimica et Cosmochimica Acta, 57 (1993), pp. 3505-3518.
"Heberling, et al., Reactivity of the Calcite-water-interface, from Molecular Scale Processes to Geochemical eEngineering, Applied Geochemistry 45 (2014) pp. 158-190".
Wolthers, et al., The Surface Chemistry of Divalent Metal Carbonate Minerals; A Critical Assessment of Surface Charge and Potential Data Using the Charge Distribution Multi-site Ion Complexation Model, American Journal of Science 308 (2008), pp. 905-941.

"Lardge, et al., Investigation of the Interaction of Water with the Calcite (10.4) Surface Using Ab Initio Simulation, J. Phys. Chem. C, 113 (2009), pp. 7207-7212".
"Lardge, et al., Ab Initio Simulations of the Interaction between Water and Defects on the Calcite (101 4) Surface, J. Phys. Chem. C, 114 (2010), pp. 2664-2668".
"Vijapurapu, et al., Compositional Effects of Fluids on Spreading, Adhesion and Wettability in Porous Media, Colloids and Surfaces A: Physicochem. Eng. Aspects, 241 (2004) pp. 335-342".
Van Der Spoel, GROMACS: Fast, Flexible, and Free, Journal of Computational Chemistry, 26 (16) 2005, pp. 1701-1718.
Brooks, et al., CHARMM: The Biomolecular Simulation Program, Journal of Computational Chemistry, 30 (10) 2009, pp. 1546-1614.
"Bjelkmar, et al., Implementation of the CHARMM Force Field in GROMACS: Analysis of Protein Stability Effects from Correction Maps, Virtual Interaction Sites, and Water Models, J. Chem. Theory Comput., 6 (2010), pp. 459-466".
"Raiteri, et al., Water Is the Key to Nonclassical Nucleation of Amorphous Calcium Carbonate, J. Am. Chem. Soc., 132 (2010), pp. 17623-17634".
"Wu, et al., Flexible Simple Point-charge Water Model with Improved Liquid-state Properties, The Journal of Chemical Physics, 124 (2006), pp. 024503-12-024503-1".
Jarrahian, et al., Wettability Alteration of Carbonate Rocks by Surfactants: A Mechanistic Study, Colloids and Surfaces A: Physicochem. Eng. Aspects, 410 (2012), pp. 1-10.
"Wu., et al. A Study of Wetting Behavior and Surfactant EOR in Carbonates With Model Compounds, Paper presented at the SPE/DOE Symposium on Improved Oil Recovery, Tulsa, Oklahoma, USA, Apr. 2006. Paper No. SPE-99612-MS, 11 pp.".
"Standnes, et al., An Evaluation of Spontaneous Imbibition of Water into Oil-Wet Carbonate Reservoir Cores Using a Nonionic and a Cationic Surfactant, Energy & Fuels, 16 (2002) pp. 1557-1564".
"Zhang, et al., Wettability Alteration and Spontaneous Imbibition in Oil-wet Carbonate Formations, Journal of Petroleum Science and Engineering, 52 (2006) pp. 213-226".
Xie, et al., Improved Oil Recovery from Carbonate Reservoirs by Chemical Stimulation, SPE J. 10 (2005), pp. 276-285.
"Weiss, et al., Oilfield Surfactants Improve Recovery by Imbibition, Society of Petroleum Engineers, SPE 106402, This paper was prepared for presentation at the 2007 SPE International Symposium on Oilfield Chemistry held in Houston, Texas, U.S.A., Feb. 28-Mar. 2, 2007., 13 pp.".
"Zhang, et al., Wettability alteration and improved oil recovery by spontaneous imbibition of seawater into chalk: Impact of the potential determining ions Ca2+, Mg2+, and SO4 2?, Colloids and Surfaces A: Physicochem. Eng. Aspects, 301 (2007) pp. 199-208".
P. O. Roehland P. W. Choquette, Carbonate petroleum reservoirs. Springer Science & Business Media, 1985.
A. Seethepalli, B. Adibhatla, and K. K. Mohanty, "Wettability alteration during surfactant flooding of carbonate reservoirs," in SPE/DOE Symposium on Improved Oil Recovery, Apr. 17-21, Tulsa, Oklahoma, 2004.
E. W. Al-Shalabi and K. Sepehrnoori, "A comprehensive review of low salinity/engineered water injections and their applications in sandstone and carbonate rocks," J. Pet. Sci. Eng., vol. 139, pp. 137-161, 2016.
M. A. Sohal, G. Thyne, and E. G. Sogaard, "Review of recovery mechanisms of ionically modified waterflood incarbonate reservoirs," Energy Fuels, vol. 30, pp. 1904-1914, 2016.
T. Austad, "Water-based EOR in carbonates and sandstones: new chemical understanding of the EOR potential using "smart water"," in Enhanced oil recovery Field case studies. Elsevier, 2013, pp. 301-335.
U. N. Berninger, G. D. Saldi, G. Jordan, J. Schott, and E. H. Oelkers, "Assessing dolomite surface reactivity at temperatures from 40 to 120 C by hydrothermal atomic force microscopy," Geochim. Cosmochim. Acta, vol. 199, pp. 130-142, 2017.
S. L. Stipp and M. F. H. Jr., "Structure and bonding environments at the calcite surface as observed with X-ray photoelectron spectroscopy (XPS) and low energy electron diffraction (LEED)," Geochim. Cosmochim. Acta, vol. 55, pp. 1723-1736, 1991.

(56) References Cited

OTHER PUBLICATIONS

D. VP, S. RP, and V. Nimisha, "Reservoir geophysics: some basic concepts," in Handbook of Geophysical Exploration: Seismic Exploration. Elsevier, 2012, vol. 41, pp. 89-118.

M. Urosevic, C. Rodriguez-Navarro, C. V. Putnis, C. Cardell, A. Putnis, and E. Ruiz-Agudo, "In situ nanoscale observations of the dissolution of (10$^-$14) dolomite cleavage surfaces," Geochim. Cosmochim. Acta, vol. 80, pp. 1-13, 2012.

P. Fenter, Z. Zhang, C. Park, N. C. Sturchio, X. M. Hu, and S. R. Higgins, "Structure and reactivity of the dolomite (104)—water interface: New insights into the dolomite problem," Geochim. Cosmochim. Acta, vol. 71, pp. 566-579, 2007.

H. Al-Hashim, A. Kasha, W. Abdallah, and B. Sauerer, "Impact of modified seawater on zeta potential and morphology of calcite and dolomite aged with stearic acid," Energy Fuels, vol. 32, pp. 1644-1656, 2018.

S. I. Kuriyavar, R. Vetrivel, S. G. Hedge, A. V. Ramaswamy, D. Chakrabarty, and S. Mahapatra, "Insights into the formation of hydroxyl ions in calcium carbonate: temperature dependent ftir and molecular modelling studies," J. Mater. Chem., vol. 10, pp. 1835-1840, 2000.

N. H. de Leeuw and S. C. Parker, "Atomistic simulation of the effect of molecular adsorption of water on the surface structure and energies of calcite surfaces," J. Chem. Soc., Faraday Trans., vol. 93, pp. 467-475, 1997.

R. Kristensen and S. L. S. Stipp, "Modeling steps and kinks on the surface of calcite," J. Chem. Phys., vol. 121, pp. 8511-8523, 2004.

S. L. S. Stipp, C. M. Eggleston, and B. S. Nielsen, "Calcite surface structure observed at microtopographic and molecular scales with atomic force microscopy (AFM)," Geochim. Cosmochim. Acta, vol. 58, pp. 3023-3033, 1994.

Y. Liang and D. R. Baer, "Anisotropic dissolution at the CaCO3 (10$^-$14) water interface," Surf. Sci., vol. 373, pp. 275-287, 1997.

X. Hu, P. Joshi, S. M. Mukhopadhyay, and S. R. Higgins, "X-ray photoelectron spectroscopic studies of dolomite surfaces exposed to undersaturated and supersaturated aqueous solutions," Geochim. Cosmochim. Acta, vol. 70, pp. 3342-3350, 2006.

M. Xu, K. Sullivan, G. VanNess, K. G. Knauss, and S. R. Higgins, "Dissolution kinetics and mechanisms at dolomite-water interfaces: effects of electrolyte specific ionic strength," Environ. Sci. Technol., vol. 47, pp. 110-118, 2013.

M. Y. Jabbar, H. S. A. Hashim, and W. Abdallah, "Effect of brine composition on wettability alteration of carbonate rocks in the presence of polar compounds," in SPE Annual Technical Symposium and Exhibition, May 19-22, 2013, Khobar, Saudi Arabia. Society of Petroleum Engineers, 2013.

P. Ahmadi, M. Riazi, and M. R. Malayeri, "Investigation of wettability alteration of carbonate rock in presence of sulfate, calcium and magnesium ions," in International Symposium of the Society of Core Analysts, Aug. 27-Sep. 1, 2012, Vienna, Austria. Society of Core Analysts, 2017.

A. Awolayo, H. Sarma, and A. M. A. Sumaiti, "A laboratory study of ionic effect of smart water for enhancing oil recovery in carbonate reservoirs," in SPEEOR Conference at Oil and Gas West Asia, Mar. 31-Apr. 2, 2014, Muscat, Oman. Society of Petroleum Engineers, 2014.

V. M. Sanchez and C. R. Miranda, "Modeling acid oil component interactions with carbonate reservoirs: a first-principles view on low salinity recovery mechanisms," J. Phys. Chem. A, vol. 118, pp. 19180-19187, 2014.

E. Lowry, M. Sedghi, and L. Goual, "Molecular simulations of NAPL removal from mineral surfaces using microemulsions and surfactants," Colloids Surf., A, vol. 506, pp. 485-494, 2016.

K. A. R. Gomari, A. A. Hamouda, and R. Denoyel, "Influence of sulfate ions on the interaction between fatty acids and calcite surface," Colloids Surf., A, vol. 287, pp. 29-35, 2006.

S. Strand, E. J. Hognesen, and T. Austad, "Wettability alteration of carbonates—effects of potential determining ions (Ca2+ and SO42?) and temperature," Colloids Surf., A, vol. 275, pp. 1-10, 2006.

S. F. Shariatpanahi, S. Strand, and T. Austad, "Initial wetting properties of carbonate oil reservoirs: effect of the temperature and presence of sulfate information water," Energy Fuels, vol. 25, pp. 3021-3028, 2011.

H. H. A. Attar, M. Y. Mahmoud, A. Y. Zekri, R. Almehaideb, and M. Ghannam, "Low-salinity flooding in a selected carbonate reservoir: experimental approach," J. Pet. Explor. Prod. Technol., vol. 3, pp. 139-149, 2013.

D. E. Ince, C. T. Johnson, and B. M. Moudgil, "Fourier transform infrared spectroscopic study of adsorption of oleic acid/oleate on surfaces of apatite and dolomite," Langmuir, vol. 7, pp. 1453-1457, 1991.

S. F. Shariatpanahi, P. Hopkins, H. Aksulu, S. Strand, T. Puntervold, and T. Austad, "Water based EOR by wettability alteration in dolomite," Energy Fuels, vol. 30, pp. 180-187, 2016.

A. Duran-Alvarez, M. Maldonado-Dominguez, O. Gonzalez-Antonio, and C. Duran-Valencia, "Experimental-theoretical approach to adsorption mechanisms for anionic, cationic, and zwitterionic surfactants at the calcite-water interface," Langmuir, vol. 32, pp. 2608-2616, 2016.

International Search Report and Written Opinion dated Mar. 31, 2022 for Application No. PCT/US21/59484.

Koleini et al., Interactions between Rock/Brine and Oil/Brine Interfaces within Thin Brine Film Wetting Carbonates: A Molecular Dynamics Simulation Study. Energy & Fuels 2019 33 (9), 7983-7992 DOI: 10.1021/acs.energyfuels.9b00496; p. 7983 para 1; p. 7985 para 2, 3; p. 7989 para 1.

Khosravi et al., "Application of Molecular Dynamics Simulation: A Case Study to Estimate Wettability", Sep. 2020; pp. 445-455. 10.1007/978-981-15-5753-8_41.

Szczerba et al., "Molecular dynamics simulations of interactions of organic molecules found in oil with smectite: Influence of brine chemistry on oil recovery", Mar. 7, 2020, Journal of Petroleum Science and Engineering. 191.107148. 10.1016/j.petrol.2020.107148.

Kubeika el al., "Effects of Surfactant Charge and Molecular Structure on Wettability Alteration of Calcite: Insights from Molecular Dynamics Simulations", The Journal of Physical Chemistry B 2021 125 (4), 1293-1305 DOI: 10.1021/acs.jpcb.0c10361.

Sheng, Status of Surfactant EOR Technology, Petroleum 1 (2015), pp. 97-105.

Kamal, et al., Review on Surfactant Flooding: Phase Behavior, Retention, IFT, and Field Applications, Energy Fuels 31 (2017), pp. 7701-7720.

"Yefeit, et al., Surfactant Induced Reservoir Wettability Alteration: Recent Theoretical and Experimental Advances in Enhanced Oil Recovery, Petroleum Science, 8 (2011), pp. 463-476".

Negin, et al., Most Common Surfactants Employed in Chemical Enhanced Oil Recovery, Petroleum 3 (2017), pp. 197-211.

"Purswani, et al., Factors and Mechanisms Governing Wettability Alteration by Chemically Tuned Waterflooding: A Review, Energy Fuels 31 (2017), pp. 7734-7745".

Morrow, Wettability and Its Effect on Oil Recovery, Journal of Petroleum Technology 42: 12, Dec. 1990, pp. 1476-1484.

"Standnes, et al., Wettability Alteration in Chalk 2. Mechanism for Wettability Alteration from Oil-wet to Water-wet Using Surfactants; Journal of Petroleum Science and Engineering 28 (2002), pp. 123-143".

Pal, et al., Review of Surfactant-Assisted Chemical Enhanced Oil Recovery for Carbonate Reservoirs: Challenges and Future Perspectives, Petroleum Science.

"Masalmeh, et al., EOR Options for Heterogeneous Carbonate Reservoirs Currently Under Waterflooding, SPE-171900-MS, Society of Petroleum Engineers International, Paper presented at the Abu Dhabi International Petroleum Exhibition and Conference, Abu Dhabi, UAE, Nov. 2014, 29 pp.".

"Chilingar, et al., Some Notes on Wettability and Relative Permeabilities of Carbonate Reservoir Rocks, II, Energy Sources, 7:1, 1983, pp. 67-75".

"Hirasaki, et al., Surface Chemistry of Oil Recovery From Fractured, Oil-Wet, Carbonate Formations, SPE J. 9 (2004), pp. 151-162.".

(56) References Cited

OTHER PUBLICATIONS

"Ayirala, et al., Beneficial Effects of Wettability Altering Surfactants in Oil-wet Fractured Reservoirs, Journal of Petroleum Science and Engineering 52 (2006), pp. 261-274".

"Xu, et al., Wettability Alterations Due to Crude Oil Composition and an Anionic Surfactant in Petroleum Reservoirs, Journal of Adhesion Science and Technology, 20:7, pp. 693-704".

"Standnes, et al., Wettability Alteration in Carbonates Interaction between Cationic Surfactant and Carboxylates as a Key Factor in Wettability Alteration from Oil-wet to Water-wet Conditions, Colloids and Surfaces A: Physicochem. Eng. Aspects 216 (2003), pp. 243-259".

Mohan, et al., Wettability Altering Secondary Oil Recovery in Carbonate Rocks, Energy Fuels 25 (2011), pp. 3966-3973.

Buckley, et al., Some Mechanisms of Crude Oilr/brine/solid Interactions, Journal of Petroleum Science and Engineering 20 (1998), pp. 155-160.

"De Lara, et al., Molecular Dynamics Studies of Fluid/Oil Interfaces for Improved Oil Recovery Processes, J. Phys. Chem. B 116 (2012), pp. 14667?14676".

"Koleini, et al., Effects of Low Salinity Water on Calcite/brine Interface: A Molecular Dynamics Simulation Study, Colloids and Surfaces A, 537 (2018), pp. 61-68".

"Stukan, et al., Molecular Dynamics Simulation of Spontaneous Imbibition in Nanopores and Recovery of Asphaltenic Crude Oils Using Surfactants for EOR Applications, Oil & Gas Science and Technology—Rev. IFP Energies Nouvelles, 67:5 (2012), pp. 737-742".

"Sedghi, et al., Molecular Dynamics of Wetting Layer Formation and Forced Water Invasion in Angular Nanopores with Mixed Wettability, The Journal of Chemical Physics, 141 (2014), 13 pp.".

"Sedghi, et al., Atomistic Molecular Dynamics Simulations of Crude Oil/Brine Displacement in Calcite Mesopores, Langmuir, 32 (2016), pp. 3375?3384".

"Jang, et al., Molecular Dynamics Study of a Surfactant-Mediated Decane-Water Interface: Effect of Molecular Architecture of Alkyl Benzene Sulfonate, J. Phys. Chem. B, 108 (2004), pp. 12130-12140".

"Moncayo-Riascos, et al., Molecular Dynamics Methodology for the Evaluation of the Chemical Alteration of Wettability with Organosilanes, Energy Fuels, 30 (201), pp. 3605?3614".

"Zhong, et al., Combined Molecular Dynamics and Quantum Mechanics Study of Oil Droplet Adsorption on Different Self-Assembly Monolayers in Aqueous Solution, J. Phys. Chem. C, 117 (2013), pp. 12510?12519".

"Liu, et al., Mechanism of Oil Detachment from a Silica Surface in Aqueous Surfactant Solutions: Molecular Dynamics Simulations, J. Phys. Chen. B., 116 (2012), pp. 2867-2875".

"Yuan, et al., Molecular Dynamics Simulation of Oil detachment from calcite surface in aqueous surfactant solution, Computational and Theoretical Chemistry 1092 (2016) pp. 82-89".

"Zhang, et al., Mechanism of Oil Detachment from Hybrid Hydrophobic and Hydrophilic Surface in Aqueous Solution, The Journal of Chemical Physics, 140 (2014), 11 pp.".

"Li, et al., How to Select an Optimal Surfactant Molecule to Speed Up the Oil-detachment from Solid Surface: A Computational Simulation, Chemical Engineering Science 147 (2016), pp. 47-53".

"Tang, et al., Molecular Dynamics Simulations of the Oil-Detachment from the Hydroxylated Silica Surface: Effects of Surfactants, Electrostatic Interactions, and Water Flows on the Water Molecular Channel Formation, J. Phys. Chem. B, 122 (2018), pp. 1905?1918".

"De Leeuw, et al., Surface Structure and Morphology of Calcium Carbonate Polymorphs Calcite, Aragonite, and Vaterite: An Atomistic Approach, J. Phys. Chem. B, 102 (1998), pp. 2914-2922".

Kerisit, et al., Atomistic Simulation of the Dissociative Adsorption of Water on Calcite Surfaces, J. Phys. Chem. B, 107 (2003) pp. 7676-7682.

Cooke, et al., Interaction of Ethanol and Water with the {1014} Surface of Calcite, Langmuir 26(18), 2010, pp. 14520-14529.

Fender, et al., Calcite (104)—water Interface Structure, Revisited, Geochimica et Cosmochimica Acta 97(2012) pp. 58-69.

"Chiarello, et al., Otavite-calcite Solid-solution Formation at the Calcite-water Interface Studied In Situ by Synchrotron X-ray Scattering, Geochimica et Cosmochimica Acta. 61 (7) 1997, pp. 1467-1474".

"Fender, et al., Mineral-water Interfacial Structures Revealed by Synchrotron X-ray Scattering, Progress in Surface Science 77 (2004) pp. 171-258".

"Geissbuhler, et al., Three-dimensional Structure of the Calcite-water Interface by Surface X-ray Scattering, Surface Science 573 (2004) pp. 191-203".

Heberling, et al., Structure and Reactivity of the Calcite-water Interface, Journal of Colloid and Interface Science 354 (2011) pp. 843-857.

"Magdans, et al., Investigation of the {104} Surface of Calcite under Dry and Humid Atmospheric Conditions with Grazing Incidence X-ray Diffraction (GIXRD), Eur. J. Mineral, 18 (2006), pp. 83-92".

"Wright, et al., Structure of the (1014) Surfaces of Calcite, Dolomite and Magnesite under Wet and Dry Conditions, Phys. Chem. Chem. Phys., 3 (2001), 6 pp.".

"Cygan, et al., Atomistic Models of Carbonate Minerals: Bulk and Surface Structures, Defects, and Diffusion, Molecular Simulation, 28:6-7 (2002), pp. 475-495".

Seifert, et al., Analysis of Crude Oil Carboxylic Acids After Conversion to Their Corresponding Hydrocarbons, Analytical Chemistry, 41 (12) Oct. 1969, 10 pp.

Seifert, et al., Interfacially Active Acids in a California Crude Oil: Isolation of Carboxylic Acids and Phenols, Analytical Chemistry, 41 (4) Apr. 1969, 9 pp.

"Mahani, et al., Insights into the Mechanism of Wettability Alteration by Low-Salinity Flooding (LSF) in Carbonates, Energy Fuels, 29 (2015), pp. 1352?1367".

"Fathi, et al., Wettability Alteration in Carbonates: The Effect of Water-Soluble Carboxylic Acids in Crude Oil, Energy Fuels, 24 (2010), pp. 2974-2979".

"Fathi, et al., Effect of Water-Extractable Carboxylic Acids in Crude Oil on Wettability in Carbonates, Energy Fuels, 25 (2011), pp. 2587-2592".

* cited by examiner

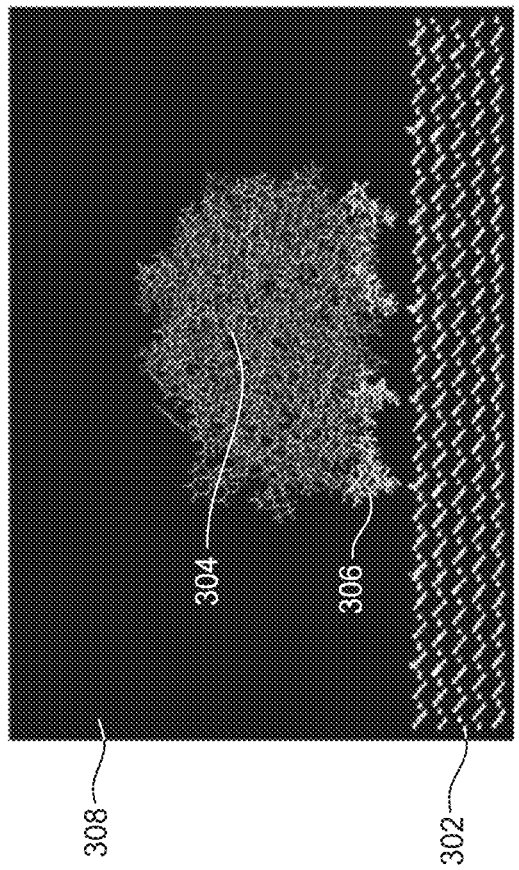
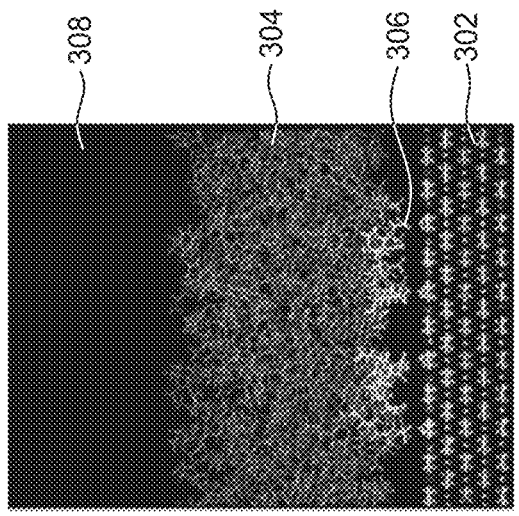
FIG. 3A
FIG. 3B
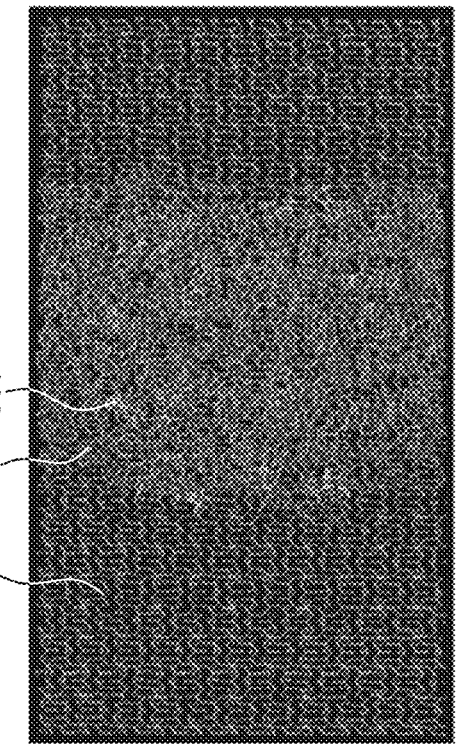
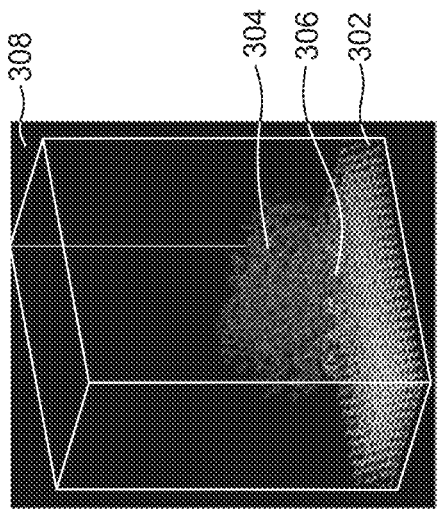
FIG. 3C
FIG. 3D

METHODS AND APPARATUS FOR ENHANCED OIL RECOVERY

CROSS-REFERENCE TO RELATED APPLICATIONS

This application claims benefit of U.S. Provisional Patent Application No. 63/114,311, filed Nov. 16, 2020, the entirety of which is herein incorporated by reference.

FIELD

Embodiments of the present disclosure generally relate to methods and apparatus for enhanced oil recovery.

DESCRIPTION OF RELATED ART

A primary challenge facing recovery from carbonate reservoirs—which hold the majority of the world's discovered oil—is the strongly oil—wet characteristics of such reservoirs. Additives, such as surfactants, can be used to alter the wettability of the oil-wet surfaces of carbonate reservoirs to become more water-wet, thereby enabling enhanced recovery from such reservoirs. Despite extensive research efforts into the mechanisms by which surfactants contribute to enhanced oil recovery, a thorough mechanistic understanding remains lacking.

Very few computer simulations have been utilized to study the wettability alteration of initially oil-wet surfaces by surfactants. Even so, the studies disregard generally-accepted properties of the reservoir—e.g., the minerals and the oil—as well as the mechanisms of the interaction between the two. For example, surface planes most naturally abundant for calcite surfaces $\{1,0,-1,4\}$ are replaced by a different $\{-1,0,0\}$ plane, and such planes have significantly different properties. Moreover, the oil is approximated as a bulk phase of aliphatic hydrocarbons (e.g., dodecane) whose molecules are assumed to adhere to the surface laterally along the length of the aliphatic chain. Utilizing such assumptions about the surface planes and the hydrocarbons is inconsistent with mechanisms of oil adsorption on carbonate surfaces. As such, conclusions drawn from these studies are not particularly meaningful for practical applications.

There is a need for improved computer models that simulate realistic chemical and physical conditions of the reservoir in order to, e.g., better understand the use of additives such as surfactants in enhanced oil recovery. There is also a need for methods and apparatus that utilize such computer models.

SUMMARY

Embodiments of the present disclosure generally relate to methods and apparatus for enhanced oil recovery.

In an embodiment, a method of enhanced oil recovery from a reservoir is provided. The method includes determining a three-dimensional molecular association between simulated oil and a simulated surface using molecular dynamics, and selecting a reservoir additive from a plurality of additives. The method further includes introducing the reservoir additive to the reservoir, and recovering oil from the reservoir using the reservoir additive.

In another embodiment, a method of determining an effect of a formulation for use in enhanced oil recovery is provided. The method includes determining a three-dimensional molecular association between simulated oil and a simulated surface using molecular dynamics, and simulating an interaction of a first formulation with the simulated oil and the simulated surface using molecular dynamics, the first formulation comprising a surfactant. The method further includes measuring a first simulated wettability alteration characteristic, wherein the first simulated wettability alteration characteristic is associated with the first formulation. The method further includes repeating the simulating and measuring operations for a second formulation to produce a second simulated wettability alteration characteristic, and comparing the first simulated wettability alteration characteristic and the second simulated wettability alteration characteristic to each other.

In another embodiment, an oil extraction apparatus is provided. The oil extraction apparatus includes a processor configured to: determine a three-dimensional molecular association between simulated oil and a simulated surface using molecular dynamics; simulate an interaction of a first additive of a plurality of additives with the simulated oil and the simulated surface using molecular dynamics; measure a first simulated wettability alteration characteristic, the first simulated wettability alteration characteristic associated with the first additive; repeat the simulate and measure operations for each remaining additive of the plurality of additives to produce a simulated wettability alteration characteristic for each remaining additive; compare the simulated wettability alteration characteristics of the plurality of additives to each other; and select a reservoir additive from the plurality of additives based on the comparison. The oil extraction apparatus includes an additive injection unit configured to inject the reservoir additive into a reservoir, and an extraction system configured to extract oil from the reservoir.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3A is a molecular dynamics (MD) simulation of a side view, along the long edge, of a model surface/oil/brine system showing a calcite surface with an attached oil droplet according to at least one embodiment of the present disclosure.

FIG. 3B is another side view, along the short edge, of the model surface surface/oil/brine system of FIG. 3A according to at least one embodiment of the present disclosure.

FIG. 3C is a top view of the model surface surface/oil/brine system of FIG. 3A according to at least one embodiment of the present disclosure.

FIG. 3D is a general view of the model surface surface/oil/brine system of FIGS. 3A-3D according to at least one embodiment of the present disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
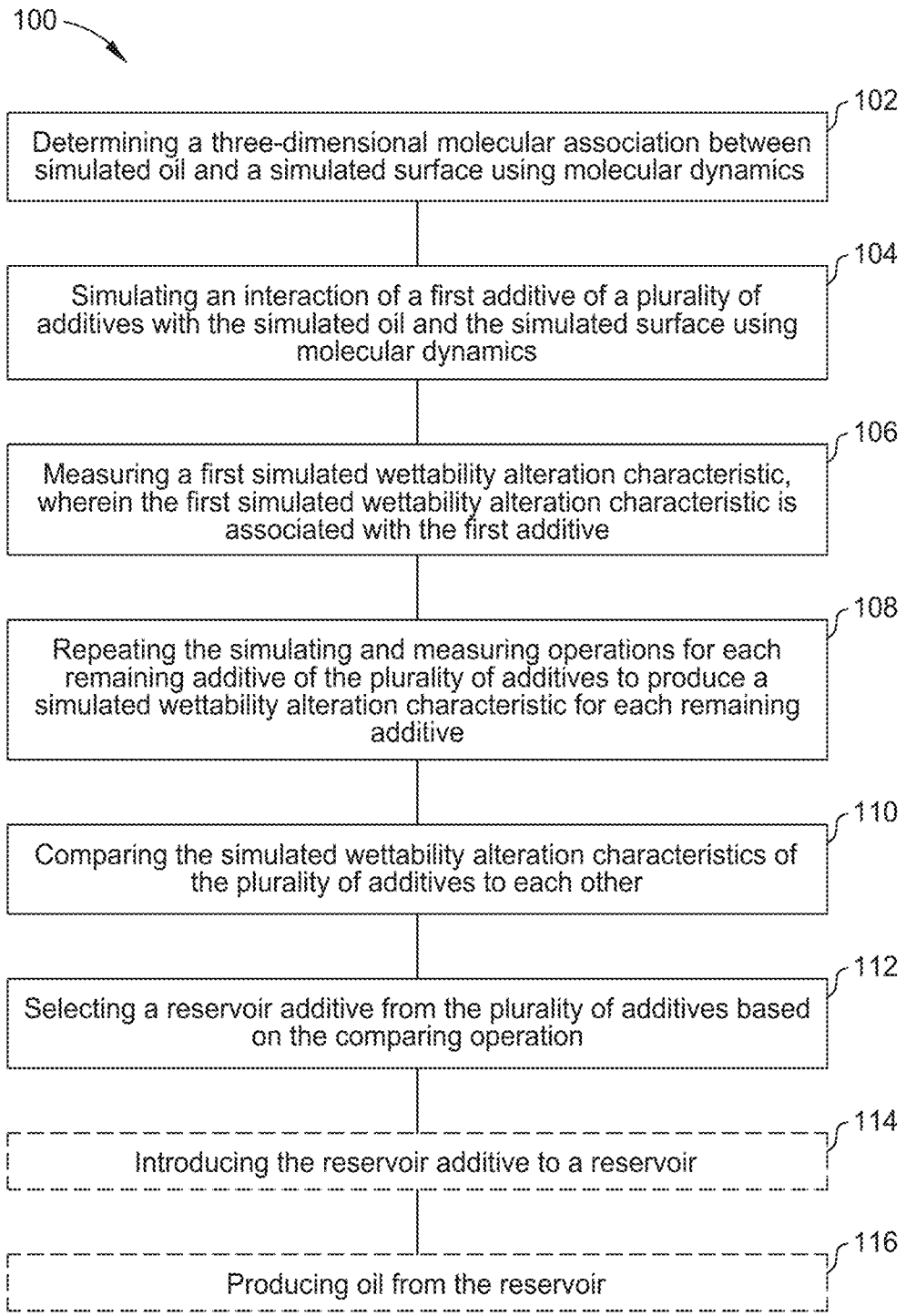
FIG. 1A is a flowchart showing selected operations of a method of enhanced oil recovery according to at least one embodiment of the present disclosure.

Embodiments of the present disclosure generally relate to methods and apparatus for enhanced oil recovery. The inventors have found new and improved methods and apparatus for enhanced oil recovery that, e.g., enable selection of an additive to be used to extract oil from reservoirs. Briefly, and in some embodiments, the methods and apparatus utilize, e.g., properties of the additives to select an additive from among a variety of chemically and physically different additives. Such properties include an additive's ability to alter the wettability of a surface. In contrast to conventional methods and apparatus, the methods and apparatus described herein can simulate polar and non-polar components of oil, various reservoir surfaces, and additives to enable, e.g., an efficient selection of an additive to be injected into a reservoir for enhanced oil recovery.

As discussed above, recovery from carbonate reservoirs is challenged by its strongly oil-wet characteristics. This oil-wet nature causes the reservoirs to retain a large amount of oil adsorbed to the rock surfaces. The oil-wet state of the reservoir originates from the molecular-level interactions between the surface and the oil. More favorable interactions than those between the surface and the water phase lead to the preferential adsorption of the oil, rendering the surface oil-wet. Additives can be utilized to lower the interfacial tension between the oil and the water of the reservoir, thereby improving oil mobility. Additives, such as surfactants, can also be used to alter the wettability of the oil-wet surfaces of carbonate reservoir to become more water-wet, thereby enabling enhanced recovery from such reservoirs. The alteration, and even reversal, of the wettability of a reservoir by a surfactant solution is a result of specific physicochemical forces and interactions between the chemical groups of the various participating molecular species: the oil, surfactant, brine, and mineral surface.

Despite extensive research efforts into the mechanisms by which additives contribute to enhanced oil recovery, the current state-of-the-art lacks the ability to characterize, e.g., the physicochemical forces, interactions, and mechanisms of wettability alteration at the molecular level. Computer simulations, such as molecular dynamics (MD) simulations, can provide insight into the physicochemical forces, interactions, and mechanisms of wettability alteration. MD simulations represent molecules in atomistic detail, with individual atoms interacting according to well-defined energy terms (collectively known as the Force field) and following the laws of classical physics.

To date, very few computer simulations have been utilized to study the wettability alteration of initially oil-wet surfaces by additives such as surfactants. Even so, the few existing studies rely on improper models that largely disregard the experimentally well-documented and generally accepted properties of the minerals, the oil, as well as the mechanisms of the interaction between the two. For example, rather than using the most naturally abundant $\{1,0,-1,4\}$ calcite surface to model the carbonate surface, conventional simulation methods utilize a different $\{-1,0,0\}$ plane for modeling. Different surface planes generally have significantly different physical properties, and any useful modeling of the wettability should utilize correct surface planes.

In addition, conventional simulation methods neglect the positive surface charge and the thin layer of 'surface water', both experimentally observed and important for the surface interactions. Further, conventional simulation methods approximate the oil as a bulk phase of aliphatic hydrocarbon (e.g. dodecane), whose molecules are assumed to adhere to the surface laterally along the length of the aliphatic chain. Such modeling is inconsistent with oil adsorption on carbonate through the oil's polar components which are predominantly negatively charged carboxylates. The conclusions drawn from these simulation methods, therefore, cannot be considered particularly useful for understanding the mechanism of behavior of surfactants in realistic systems and, consequently, for estimating the relative performance of various surfactant types and structures for practical applications.

The methods and apparatus described herein overcome these and other challenges facing enhanced oil recovery. In some embodiments, molecular dynamics simulations are utilized as a tool to screen for an additive that most effectively shifts mineral wettability toward water wet to facilitate enhanced oil recovery (EOR). In contrast to conventional methods for EOR, embodiments described herein enable systematic investigation (via MD simulations) of the effects of molecular structure details on an additive's EOR performance such as wettability alteration. Moreover, such simulations described herein can assess oil recovery and surfactant adsorption on rock/surface without relatively inefficient lab-based or field-based studies of additives. Embodiments described herein also enable molecular-scale models for testing of an additive's ability to alter a surface's wettability. Here, instead of screening or testing the surfactants in the field, embodiments described herein enable pre-screening of potential target molecules, to substantially narrow the field of suitable candidates for the real experimental testing at the next stage. As such, embodiments described herein can be much more cost- and time-efficient than typical lab-based or field-based testing.

Methods and apparatus described herein can be utilized to produce or recover hydrocarbon(s) (e.g., petroleum oil) from hydrocarbon-containing formations or reservoirs. Such formations or reservoirs can include those already subjected to recovery operations, such as primary, secondary, and/or tertiary recovery operations. The formations or reservoirs can also include those not yet subject to such recovery operations. The formations or reservoirs can be subterranean and/or porous formations and reservoirs. The terms "formation" and "reservoir" are used interchangeably. For example, use of the term "reservoir" refers to "reservoir" and "formation."

The reservoirs can be carbonate reservoirs and/or carbonate-containing reservoirs. Carbonate reservoirs and carbonate-containing reservoirs have carbonate disposed on one or more surfaces of the reservoir can be characterized as having high heterogeneous porosity and permeability. Such carbonate surfaces can include carbonate, calcite, silica, dolomite, or combinations thereof, among other surfaces. Additionally, or alternatively, one or more surfaces of the reservoir can include carbonate, calcite, silica, dolomite, or combinations thereof.

Embodiments of the methods and apparatus described herein can be utilized with any suitable recovery technique capable of recovering reserves from oilfield reservoirs, such as waterflooding techniques, gasflooding techniques, chemical flooding techniques, and thermal techniques (e.g., steam injection, hot water injection, electrical heating, and/or combustion), or combinations thereof.

Embodiments described herein can utilize computer simulations such as molecular dynamics (MD). For purposes of the present disclosure, the term "molecular dynamics" refers to a computer simulation method for analyzing the physical movements of atoms and molecules. The simulated atoms and molecules are generally allowed to interact in the simulation for a fixed period of time, in order to model dynamic behavior of the system. In some embodiments of molecular dynamics, the trajectories of atoms and molecules are determined by numerically solving Newton's equations of motion for a system of interacting particles, where forces between the particles and their potential energies are often calculated using interatomic potentials or molecular mechanics force fields.

For purposes of the present disclosure, the term "simulated oil" refers to a computer simulation of oil. The computer simulation of oil may be simplified in terms of composition as compared to physical oil found in in subterranean formations. The simulated oil may be simplified in order to reduce computational complexity of a molecular dynamics simulation of an oil/rock/surfactant system.

For purposes of the present disclosure, the term "simulated surface" refers to a computer simulation of a surface. In some embodiments, the simulated surface is configured to model a solid surface. For example, the simulated surface can be configured to model a solid surface of porous rock.

For purposes of the present disclosure, the term "simulating an interaction" refers to a computer simulation of one or more interactions between atoms and/or molecules. Simulating the interaction may include modeling forces, e.g., attractive forces and/or repellant forces, acting on the atoms and/or molecules.

Methods

Embodiments of the present disclosure generally relate to methods of enhanced oil recovery. The methods can be utilized to, e.g., pre-screen target additives. The target additives can be used to produce oil from a reservoir. Briefly, and in some embodiments, methods described herein can enable the determination, identification, and/or selection of an additive or plurality of additives for use in an enhanced oil recovery (EOR) process. Embodiments described herein, for example, may be utilized to guide a user in determining, identifying, and/or selecting such additive(s) based on, e.g., the additive's potential in EOR recovery techniques.

The methods utilize computer simulations that simulate the interaction energies of atoms and molecules by integrating their equations of motion. Such interaction energies can include the total interaction energy, electrostatic interaction energy which is represented by Coulomb intermolecular potential, and van der Waals interaction energy which is represented by a Lennard-Jones intermolecular potential.

The simulations can be based on a simulated oil, a simulated surface, a simulated additive, a simulated water, a simulated brine, combinations thereof, among other simulated components. Such simulated or modeled components are used for molecular dynamics simulations. One or more components of the simulated oil, one or more components of the simulated surface, one or more components of the simulated additive, one or more components of the simulated water, and/or one or more components of the simulated brine may be in their ionic form, non-ionic form, or both. For example, a carboxylic acid present in simulated oil may be modeled as a carboxylate, a carboxylic acid, or both.

Briefly, the molecular dynamics simulations utilize a software package such as GROMACS. Force field parameters (e.g., CHARMM36 force field parameters) and bonding parameters can be selected for the simulated components. A model can be utilized for water, e.g., a simple point charge/flexible (SPC/Fw) model. Force-field parameters and partial charges for the additives can be derived from published values, e.g., those compiled under the CHARMM General Force Field (CGenFF) Project and with the aid of CGenFF website, cgenff.umaryland.edu. Bonding parameters based on the surface (e.g., calcite, dolomite, silica, etc.) can be chosen.

For the molecular dynamics simulations, a canonical ensemble such as NVT can be utilized, though other ensembles are contemplated. In the canonical ensemble, the amount of substance (N), volume (V), and temperature (T) are conserved (NVT). NVT is sometimes referred to as constant temperature molecular dynamics (CTMD). In NVT simulations, the energy of endothermic and exothermic processes can be exchanged with a thermostat. Various thermostat algorithms can be utilized to add and/or remove energy from the boundaries of the MD simulation. Exemplary, but non-limiting, methods for controlling temperature that can be utilized with embodiments described herein include velocity rescaling, Nose-Hoover thermostat, Nose-Hoover chains, Berendsen thermostat, Anderson thermostat, Langevin dynamics, or combinations thereof. Periodic boundary conditions and non-bonded cutoffs can also be selected as desired. For example, the periodic boundary conditions may be imposed on all three dimensions. Long range electrostatic interactions can be computed using, e.g., particle mesh Ewald (PME) summation. Time steps, temperatures, pressures, among other parameters can also be chosen as desired. Time steps can be in the nanosecond, picosecond, or femtosecond range, however other time steps are contemplated. Pressures can be controlled by a piston. Algorithms are also used for integration of the equations of motion and constraining of hydrogens, e.g., Verlet and LINCS algorithms. Other software packages, models, and algorithms are contemplated. Non-limiting examples of molecular dynamics simulations are further discussed in the Examples section.

FIG. 1A is a flowchart showing selected operations of a method 100 for recovering oil according to at least one embodiment of the present disclosure. The method 100 can be utilized for enhanced oil recovery operations. The method 100 begins with determining a three-dimensional molecular association between simulated oil and a simulated surface using molecular dynamics at operation 102. The three-dimensional molecular association describes and represents, e.g., the attachment between the simulated oil and the simulated surface. The three-dimensional molecular association can rely on interaction energies (e.g., electrostatic, van der Waals, et cetera) between one or more components of the simulated oil and one or more components of the simulated surface.

Conventional approaches to represent the attachment of an oil droplet on a surface are based on unrepresentative oil models and unnatural surfaces, which lead to incorrect association between the oil and the mineral surface. As such, these conventional approaches do not take into account proper electrostatic interactions, interactions between the oil and the calcite surface, and the untrustworthy mechanisms produced from the corresponding studies. In contrast, the methods described herein use a three-dimensional molecular association that provides a more realistic representation of the oil-surface association. The three-dimensional molecular association utilized herein is more consistent with current experimental observations and theoretical calculations as it accounts for, e.g., experimentally detectable surface structures, the surface water layer, and the correct estimation of the interaction energy strengths.

Simulated oil refers to a computer simulation of oil. In some examples, the determining process of operation 102 includes modeling a component of oil or a plurality of components of the oil. The component(s) modeled or assembled can be polar and/or non-polar. For example, one or more polar components of the oil can be modeled. As another example, one or more non-polar components of the oil can be modeled. As another example, one or more polar components of the oil and one or more non-polar components of the oil can be modeled. That is, the simulated oil can include non-polar component(s), polar component(s), or combinations thereof.

In some examples, the simulated oil includes one or more aliphatic hydrocarbons (also referred to as paraffins or alkanes), one or more cyclic hydrocarbons (also referred to as cycloalkanes or naphthenes), one or more aromatic hydrocarbons, or combinations thereof, in any suitable amounts or weight ratios. One or more asphaltenes can be part of the simulated oil. Asphaltenes typically include complex mixtures of carbonaceous material such as polycyclic aromatic ring units with sulfur, oxygen, and/or nitrogen heteroatoms.

The simulated oil can include one or more substituted hydrocarbons, one or more substituted aromatic hydrocarbons, and/or one or more substituted heteroaromatic hydrocarbons, such as one or more sulfur-containing molecules, one or more nitrogen-containing molecules, one or more oxygen-containing molecules, or combinations thereof, in any suitable amounts or weight ratios. The simulated oil can include one or more metals. The chemical composition of the simulated oil can affect its physical properties. In some embodiments, the simulated oil can be assembled or modeled according to one or more desired physical characteristics.

The one or more aliphatic hydrocarbons can have a carbon number of $C_1$ to $C_{50}$, such as from $C_2$ to $C_{30}$, such as from $C_3$ to $C_{20}$, such as from $C_5$ to about $C_{18}$, and can be linear or branched, saturated or unsaturated. Illustrative, but non-limiting, examples of the one or more aliphatic hydrocarbons include pentane, heptane, methylhexane, octane, nonane, dimethyloctane, undecane, pentadecane, octadecane, tetramethylpentadecane, isomers thereof, or combinations thereof in any suitable amounts or weight ratios.

The one or more cyclic hydrocarbons can have a carbon number of $C_5$ to $C_{50}$, such as from $C_5$ to $C_{30}$, such as from $C_5$ to $C_{20}$, such as from $C_5$ to about $C_{15}$, and can be linear or branched, saturated or unsaturated. Illustrative, but non-limiting, examples of the one or more cyclic hydrocarbons include cyclopentane, cyclohexane, cyclopentane, decalin, isomers thereof, or combinations thereof in any suitable amounts or weight ratios.

The one or more aromatic hydrocarbons can have a carbon number of $C_5$ to $C_{50}$, such as from $C_5$ to $C_{30}$, such as from $C_5$ to $C_{20}$, such as from $C_5$ to about $C_{15}$. Illustrative, but non-limiting, examples of the one or more cyclic hydrocarbons include benzene, toluene, p-xylene, naphthalene, isomers thereof, or combinations thereof in any suitable amounts or weight ratios.

The one or more substituted hydrocarbons can have a carbon number of $C_1$ to $C_{50}$, such as from $C_2$ to $C_{30}$, such as from $C_3$ to $C_{20}$, such as from $C_5$ to about $C_{18}$, and can be linear or branched, saturated or unsaturated. The one or more substituted aromatic hydrocarbons can have a carbon number of $C_5$ to $C_{50}$, such as from $C_5$ to $C_{30}$, such as from $C_5$ to $C_{20}$, such as from $C_5$ to about $C_{15}$. The one or more substituted heteroaromatic hydrocarbons can have a carbon number of $C_5$ to $C_{50}$, such as from $C_5$ to $C_{30}$, such as from $C_5$ to $C_{20}$, such as from $C_5$ to about $C_{15}$. Illustrative, but non-limiting, examples of the one or more substituted hydrocarbons, the one or more substituted aromatic hydrocarbons, and/or the one or more substituted heteroaromatic hydrocarbons include phenol, indole, quinoline, benzothiophene, propylphenol, nonanone, naphthenic acid, ethylbenzoic acid, nonanoic acid, methyloctylsulfide, carbazole, nonanethiol, methyloctyldisulfide, isomers thereof, or combinations thereof in any suitable amounts or weight ratios.

Any suitable combination of the aforementioned materials can be at least a portion of the simulated oil. For example, the simulated oil can include one or more aliphatic hydrocarbons can be combined with one or more substituted hydrocarbons.

In some embodiments, a polar component of the simulated oil is selected to approximate, or substantially approximate, an experimentally observed interfacial tension. The interfacial tension (IFT) relates to the force of attraction between molecules at an interface. The polarity of components in both the oil affect the interfacial tension present in oil-water systems.

The determining process of operation 102 can include modeling a surface. This simulated surface, or modeled surface, can be configured to model one or more surfaces of reservoirs. The simulated surface can simulate a desired surface roughness, mineral composition, and/or other characteristic.

Typically, reservoir surfaces include carbonate, calcite, silica, dolomite, or combinations thereof. In some embodiments, the simulated surface can be configured to model a carbonate surface, a calcite surface, a dolomite surface, a silica surface, or combinations thereof. In some embodiments, the carbonate surface includes calcite, dolomite, silica, or combinations thereof. At least a portion of the simulated surface can include a porous surface, a substantially porous surface, a non-porous surface, a substantially non-porous surface, or combinations thereof. Other surfaces are contemplated.

The simulated surface can include a single layer and/or multiple layers. The simulated surface can include a vacancy or a plurality of vacancies in one or more layers. For example, the simulated surface can include vacancies in a top layer of the multiple layers, a middle layer of the multiple layers, a bottom layer of the multiple layers, layer(s) in between these layers, or combinations thereof. A vacancy can be a defect, an atom vacancy (e.g., a calcium vacancy), a functional group vacancy (e.g., a carbonate vacancy), among other vacancies. The simulated surface may include point defects, step vacancies, and/or etch pits. The simulated surface may also contain one or more charged species, such as surface hydroxyl ions and/or carbonate ions ($CO_3^{2-}$).

In some examples, the determining process of operation 102 includes modeling the simulated surface as a $\{1,0,-1,4\}$ plane of calcite, though other planes are contemplated. The simulated surface can be based, at least in part, on experimental surface characterization. Experimental surface characterization refers to laboratory detection of surface structures and ionic surface species. For example, point defects and surface steps are two common calcite surface structures that can be experimentally identified, and the surface Ca(OH) and surface $CO_3H$ species can be experimentally detected. The simulated surface can be based, at least in part, on one or more slit and pore models of porous media. For example, a simulated carbonate surface can be based, at least in part, on a slit and pore models of porous media. Slit models model the porous space confined between two parallel calcite planes. Pore models, such as angular shaped models, model a pore with an angular shape, such as a triangular shape or other suitable polygonal shapes. Such models describe the pores in microporous or mesoporous materials.

The determining process of operation 102 can include modeling oil adsorption on the simulated surface. Adsorption can include an interaction of a negatively charged carboxylate(s) in the modeled oil with a positively charged site(s) of the simulated surface. For example, surfaces in oil reservoirs can include positively charged calcite surfaces. These positively charged surfaces can bind negatively charged carboxylate molecules contained in the oil.

Other reservoir components, such as components naturally at the reservoir or added to the reservoir, can be modeled or simulated. In some embodiments, the determining process of operation 102 includes modeling a brine component of the reservoir.

Method 100 further includes determining, identifying, and/or selecting an additive from a plurality of additives. Such an operation can include various sub-operations shown as operations 104, 106, 108, 110, and 112 in FIG. 1A. The selected additive, also referred to as a reservoir additive, is the additive that will be added to the reservoir.

At operation 104, an interaction of a first additive of a plurality of additives with the simulated oil and the simulated surface is simulated using molecular dynamics at operation 104. The additive can be a chemical, a composition, a formulation, an enhanced oil recovery agent, or combinations thereof. In some examples, the additive comprises a surfactant, a foaming chemical, a polymer, an amphiphile, a nanoparticle (e.g., a metal such as an alkali metal or transition metal), or combinations thereof. Examples of additives, such as surfactants, are described below.

At operation 106, a first simulated wettability alteration characteristic is measured. The first simulated wettability alteration characteristic is associated with the first additive used in the simulation. The wettability alteration characteristic generally refers to an additive's ability to alter the reservoir wettability from, e.g., oil-wet to more water-wet. Reservoirs are typically oil-wet, substantially oil-wet, mixed water-wet/oil wet, or substantially mixed water-wet/oil wet. Additives such as surfactants can be utilized to alter the reservoir wettability towards water-wet or substantially water-wet, allowing more of the entrapped oil to be released. The wettability alteration characteristic can be associated with the interaction of the additive with the simulated oil, the simulated surface, the simulated brine, and/or the simulated water.

The wettability alteration characteristic associated with the additive enables, e.g., selection of the additive from among numerous additives. The wettability alteration characteristic can be based on the propensity of an additive (e.g., surfactant or formulation/composition including a surfactant) to alter the wettability of the surface from, e.g., oil-wet to water-wet.

In some embodiments, operations 102, 104, and/or 106 can be performed for the simulated oil having a specific chemical composition as described above. As also explained above, operations 102, 104, and/or 106 can be performed for a simulated surface having a desired surface roughness, mineral composition, and/or other characteristic.

At operation 108, operations 104 and 106 are repeated for the remaining additives of the plurality of additives. Repeating the simulating and measuring operations (e.g., operations 104 and 106) produces a simulated wettability alteration characteristic associated with each of the remaining additives of the plurality of additives. Here, the interaction of each respective additive with the simulated oil and simulated surface is simulated and measured using molecular dynamics.

The method 100 further includes comparing the simulated wettability alteration characteristics of the plurality of additives to each other at operation 110. The comparison process of operation 110 can include analyzing, evaluating, and/or contrasting the additives in terms of, e.g., the wettability alteration characteristic and/or how the additive would act in the reservoir. Other parameters of the additives can also be compared, such as concentration. Based on the comparing process of operation 110, a reservoir additive is selected from the plurality of additives at operation 112.

Optionally, method 100 further includes introducing the additive to a reservoir at operation 114. The additive can be introduced, injected, or otherwise added to the reservoir by suitable methods, systems, or apparatus. Optionally, method 100 further includes producing hydrocarbons (e.g., oil) from the reservoir at operation 116. Here, hydrocarbons are produced, recovered, extracted, or otherwise removed from the reservoir by suitable methods, systems, or apparatus. Operations 114 and/or 116 can include using embodiments of the oil extraction apparatus described below with respect to FIG. 1D, though other oil extraction apparatus and additive injection apparatus are contemplated.

Figure 1B:
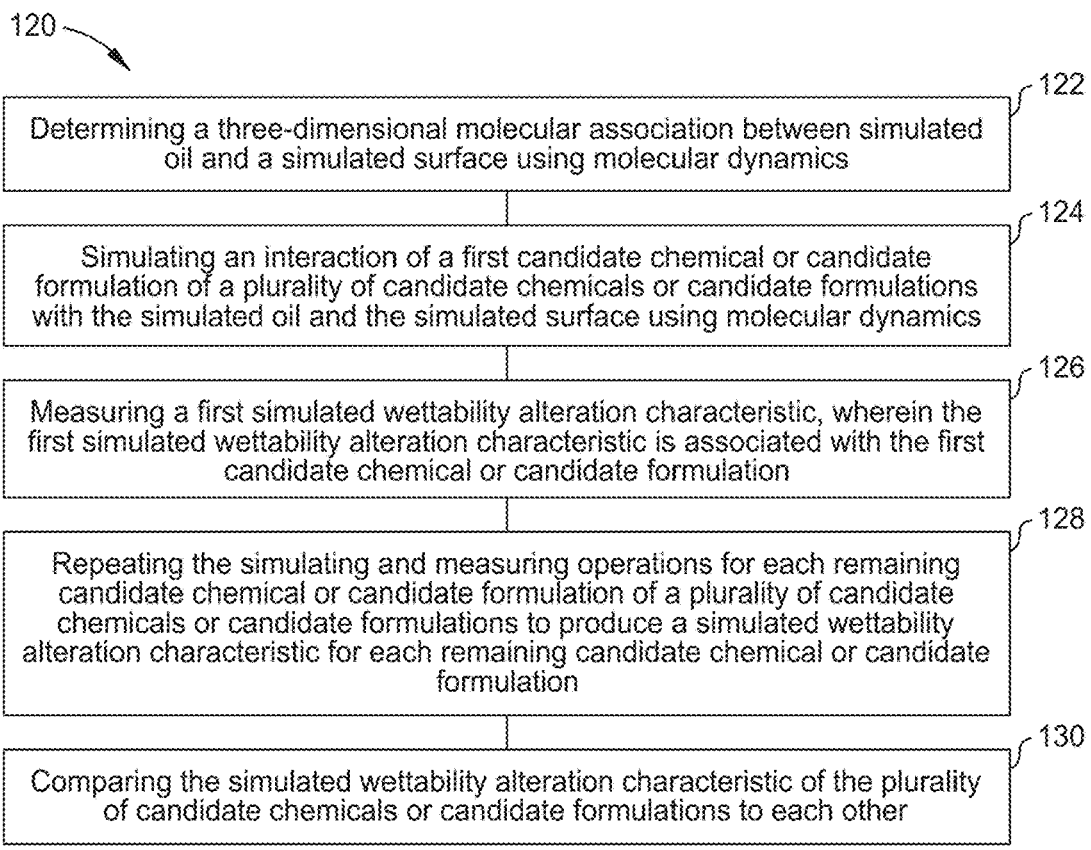
FIG. 1B is a flowchart showing selected operations of a method of testing a candidate chemical or candidate formulation for use in, e.g., enhanced oil recovery, according to at least one embodiment of the present disclosure.

FIG. 1B is a flowchart showing selected operations of a method 120 of testing a candidate chemical or candidate formulation according to at least one embodiment of the present disclosure. The method 120 can be utilized to, e.g., pre-screen a chemical or formulation prior to enhanced oil recovery operations in the field.

In method 120, the candidate chemical can be an additive. The candidate formulation (or candidate composition) can include one or more additives such as a surfactant, plus one or more other components. The one or more other components of the formulation or composition can include a salt (e.g., NaCl, $CaCl_2$), $MgCl_2$, $Mg_2SO_4$, $Na_2SO_4$), brine, a polymer (e.g., poly(vinyl alcohol), xantham gum, polyacrylamide), alkaline materials (e.g., NaOH and/or $Na_2CO_3$), a hydrophobe, an alcohol (e.g., sec-butyl alcohol), co-surfactants (such as alcohols, among other chemicals), or combinations thereof). Such formulations or compositions can include component(s) of the formulation/composition and/or reaction product(s) of two or more components of the formulation/composition. The formulation or composition can be prepared by any suitable mixing process.

The method 120 of testing shown in FIG. 1B generally includes determining a three-dimensional molecular association between simulated oil and a simulated surface using molecular dynamics at operation 122. At operation 124, an interaction of a first candidate chemical or candidate formulation of a plurality of candidate chemicals or candidate formulations with the simulated oil and the simulated surface is simulated using molecular dynamics. Operations 122 and 124 of method 120 can be the same as, or similar to, operations 102 and 104 of method 100.

The method 120 further includes measuring a simulated wettability alteration characteristic of the first candidate chemical or candidate formulation at operation 126. The simulated wettability alteration characteristic is associated with the first candidate chemical or candidate formulation in the simulation. At operation 128, operations 124 and 126 are repeated for the remaining candidate chemicals or candidate formulations of the plurality of candidate chemicals or candidate formulations. Repeating the simulating and measuring operations (e.g., operations 124 and 126) produces a simulated wettability alteration characteristic associated with each of the remaining candidate chemicals or candidate formulations of the plurality of candidate chemicals/candidate formulations. Here, the interaction of each remaining candidate chemical or candidate formulation with the simulated oil and simulated surface is simulated and measured using molecular dynamics. Operations 126 and 128 can be the same as, or similar to, operations 106 and 108 of FIG. 1A.

The method 120 further includes comparing the simulated wettability alteration characteristics of the plurality of candidate chemicals or candidate formulations to each other at operation 130. The comparison process of operation 130 can include analyzing, evaluating, and/or contrasting the candidate chemicals or candidate formulations in terms of, e.g., the wettability alteration characteristic and/or how the additive would act in the reservoir. Other parameters of the candidate chemicals or candidate formulations can also be compared. Operation 130 can be the same as, or similar to, operation 110 of FIG. 1A.

Figure 1C:
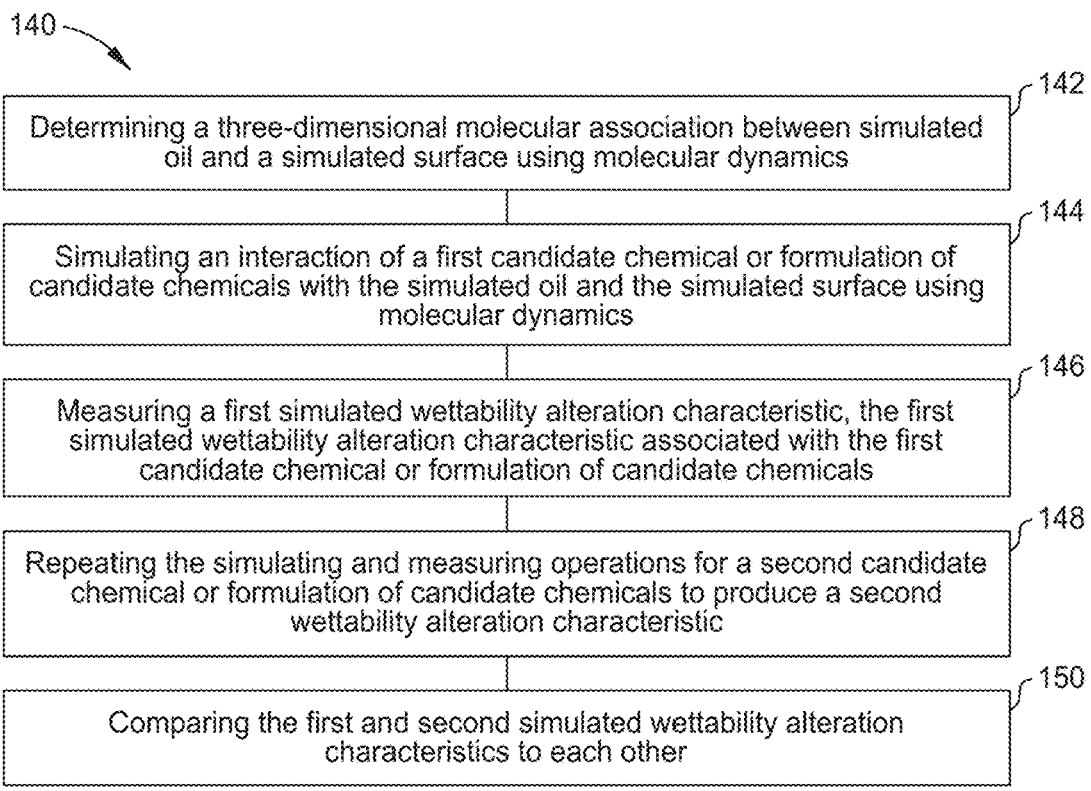
FIG. 1C is a flowchart showing selected operations of a method of determining an effect of a candidate chemical or formulation of candidate chemicals for use in, e.g., enhanced oil recovery, according to at least one embodiment of the present disclosure.

FIG. 1C is a flowchart showing selected operations of a method 140 of determining an effect of a candidate chemical or candidate formulation (or candidate composition) according to at least one embodiment of the present disclosure. The method 140 can be utilized for enhanced oil recovery operations. Candidate chemicals and candidate formulations are described above.

The method 140 of determining an effect shown in FIG. 1C generally includes determining a three-dimensional molecular association between simulated oil and a simulated surface using molecular dynamics at operation 142. At operation 144, an interaction of a first candidate chemical or candidate formulation with the simulated oil and the simulated surface is simulated using molecular dynamics. Operations 142 and 144 of method 140 can be the same as, or similar to, operations 102 and 104 of method 100.

The method 140 further includes measuring a simulated wettability alteration characteristic of the first candidate chemical or candidate formulation at operation 146. The simulated wettability alteration characteristic is associated with the first candidate chemical or candidate formulation in the simulation. At operation 148, operations 144 and 146 are repeated for the second candidate chemical or second candidate formulation. Repeating the simulating and measuring operations (e.g., operations 144 and 146) produces a simulated wettability alteration characteristic associated the second candidate chemical or candidate formulation. Here, the interaction of the second candidate chemical or candidate formulation with the simulated oil and simulated surface is simulated and measured using molecular dynamics. Operations 146 and 148 can be the same as, or similar to, operations 106 and 108 of FIG. 1A.

The method 140 further includes comparing the first simulated wettability alteration characteristic associated with the first candidate chemical or candidate formulation with the second simulated wettability alteration characteristic associated with the second candidate chemical or candidate formulation at operation 150. The comparison process of operation 150 can include analyzing, evaluating, and/or contrasting the first and second candidate chemicals or candidate formulations in terms of, e.g., the wettability alteration characteristic and/or how the additive would act in the reservoir. Other parameters of the candidate chemicals or candidate formulations can also be compared. Operation 150 can be the same as, or similar to, operation 110 of FIG. 1A.

In some embodiments, method 140 can be utilized to determine various effects of adding an additive or formulation versus a different formulation.

In some embodiments, a combination of one or more operations shown in FIGS. 1A, 1B, and/or 1C can be performed. Likewise, and in some embodiments, one or more operations shown in FIGS. 1A, 1B, and/or 1C can be performed with a suitable oil extraction apparatus or component(s) of a suitable oil extraction apparatus (e.g., apparatus 200 or components thereof, described below). Similarly, embodiments described herein with respect to one or more of method 100, method 120, and/or method 140 can be combined with one or more embodiments of apparatus 200 described below.

Apparatus

Figure 2A:
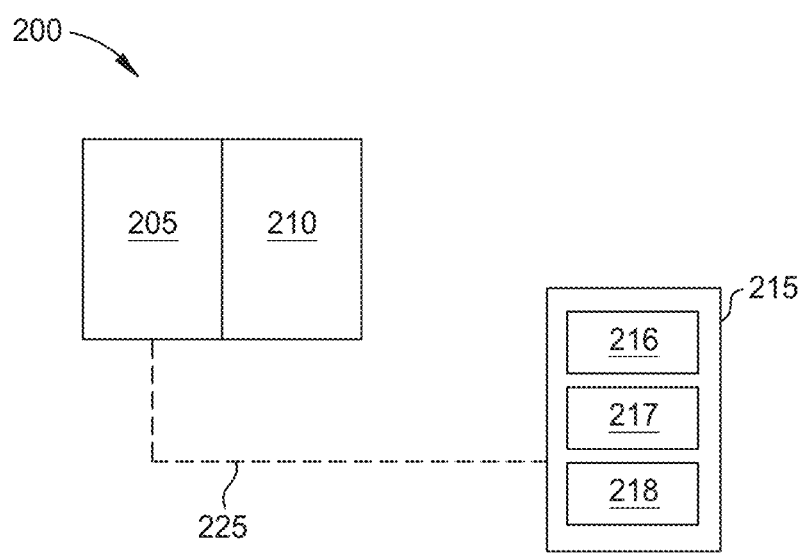
FIG. 2A is a schematic of an example oil extraction apparatus according to at least one embodiment of the present disclosure.

Embodiments of the present disclosure also generally relate to apparatus for enhanced oil recovery. The apparatus can be utilized to, e.g., produce oil from a reservoir such as an oilfield reservoir or a petroleum reservoir. FIG. 2A shows a schematic of an oil extraction apparatus according to at least one embodiment of the present disclosure. The oil extraction apparatus generally includes an additive injection unit 205, an extraction unit 210, and a controller 215.

The additive injection unit 205 (or additive injection system) is configured to inject a reservoir additive into a reservoir based on methods described herein. The additive injection unit 205 generally includes suitable elements to deliver, inject, or otherwise introduce an additive, formulation, or composition into a reservoir, such as tools and elements known in the art. The extraction unit 210 (or extraction system) is configured to extract hydrocarbons from the reservoir. The extraction unit 210 generally includes suitable tools and elements to produce, recover, extract, or otherwise remove hydrocarbons (e.g., oil) from a reservoir, such as tools and elements known in the art.

The controller 215, e.g., a computer unit, is generally configured to control or direct one or more processes in apparatus 200. The controller can be electrically coupled via, e.g., a wire, to one or more elements of the apparatus 200. A wire 225 electrically couples controller 215 with the additive injection unit 205. Although not shown, a wire can electrically couple the controller 215 with the extraction unit 210. The controller 215 includes at least one processor 216, a memory 217, and support circuits 218. In some examples, the at least one processor 216 can be utilized to perform one or more operations of one or more methods shown in FIGS. 1A-1C.

In some embodiments, the additive injection unit 205 and/or the extraction unit 210 may, independently, include a controller (not shown) that is separate from controller 215. Such a controller can include a processor, a memory, and support circuits, and can be utilized to control one or more operations of one or more methods shown in FIGS. 1A-1C.

The at least one processor 216 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. The memory 217 is non-transitory and may be one or more of readily available memory such as random access memory (RAM), read only memory (ROM), or any other form of digital storage, local or remote. The memory 217 contains instructions, that when executed by the at least one processor 216, facilitates one or more operations of processes described herein (e.g., one or more operations shown in FIGS. 1A-1C).

The instructions in the memory 217 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure. In one example, the disclosure may be implemented as the program product stored on a computer-readable storage media (e.g., memory 217) for use with a computer system (not shown). The program(s) of the program product define functions of the disclosure, described herein. The support circuits 218 may be coupled to the at least one processor 216 to support the processor in a conventional manner.

In operation the processor (e.g., the at least one processor 216 and/or a processor of the additive injection unit) determines a reservoir additive to be introduced to the reservoir. The additive injection unit 205 introduces the additive to the reservoir. After a desired time period, the extraction unit 210 extracts hydrocarbons from the reservoir.

As an illustrative, but non-limiting, example, at least one processor of the apparatus 200 can be configured to perform one or more of the following operations: determining a three-dimensional molecular association between simulated oil and a simulated surface using molecular dynamics; simulating an interaction of a first additive of a plurality of additives with the simulated oil and the simulated surface using molecular dynamics; measuring a first simulated wettability alteration characteristic, wherein the first simulated wettability alteration characteristic is associated with the first additive; repeating the simulating and measuring operations for each remaining additive of the plurality of additives to produce a simulated wettability alteration characteristic for each remaining additive of the plurality of additives; comparing the simulated wettability alteration characteristics of the plurality of additives to each other; and selecting the reservoir additive from the plurality of additives based on the comparing operation.

The reservoir additive selected can then be injected into the reservoir by the additive injection unit 205, and the hydrocarbons (e.g., oil) can be extracted from the reservoir by the extraction unit 210.

Additives

Additives are utilized with methods and apparatus described herein. For purposes of the present disclosure, the term "additive" refers to a chemical, a composition, a formulation, an enhanced oil recovery agent, or combinations thereof. As used herein, a "composition" can include component(s) of the composition and/or reaction product(s) of two or more components of the composition. Compositions of the present disclosure can be prepared by any suitable mixing process. As used herein, a "formulation" can include component(s) of the formulation and/or reaction product(s) of two or more components of the formulation. Formulations of the present disclosure can be prepared by any suitable mixing process.

The additive can include a surfactant, a foaming chemical, a polymer, an amphiphile, a nanoparticle, or combinations thereof. These and other additives can be utilized with methods and apparatus described herein.

Surfactants generally contain a "head" X and a tail "Y":

X—Y, where X is a polar head group (or relatively polar head group) that is non-ionic, anionic, cationic, amphoteric, or zwitterionic; and Y is a chain of atoms, such as: a hydrocarbon chain, which can be branched, linear, and/or aromatic, substituted or unsubstituted; a siloxane or a siloxane-derived chain; an ethoxylated (polyethylene oxide-like) chain; et cetera. Chains can be tailored to specific needs and requirements of, for example, hydrophobicity and hydrophilicity. The surfactant can have multiple head groups and/or multiple tails.

Surfactants that can be employed with embodiments described herein include cationic surfactants, anionic surfactants, non-ionic surfactants, zwitterionic surfactants, amphoteric surfactants, biosurfactants, or combinations thereof.

The surfactants can include one or more counterions. Such counterions can include monoatomic cations such as an alkali metal, an alkaline earth metal, a transition metal, or combinations thereof; polyatomic cations such as ammonium or pyridinium; monoatomic anions such as a halide (F, Cl, Br, and I); and/or polyatomic anions such as a sulfate, a sulfonate, a tosyl, a trifluoromethesulfonate, a phosphate, a phosphonate, or combinations thereof. Other counterions are contemplated.

The surfactant can be in solution or other media. In solution, the surfactant can exist as one or more ions. In some embodiments, the additive includes a surfactant, an ion thereof, or combinations thereof.

A. Cationic Surfactants

Cationic surfactants useful with embodiments described herein can include pH-dependent primary, secondary, and tertiary amines, as well as permanently charged quaternary ammonium salts. Exemplary, but non-limiting, examples of cationic surfactants are shown in formula (1), formula (2), and formula (3), among others.

The cationic surfactant can include a quaternary amine represented by the formula (1):

wherein:

each of $R^1$, $R^2$, $R^3$ and $R^4$ is, independently, a group selected from hydrogen, an unsubstituted hydrocarbyl (such as $C_1$-$C_{100}$ unsubstituted hydrocarbyl, such as a $C_1$-$C_{30}$ unsubstituted hydrocarbyl, such as a $C_8$-$C_{20}$ unsubstituted hydrocarbyl), a substituted hydrocarbyl (such as a $C_1$-$C_{100}$ substituted hydrocarbyl, such as a $C_1$-$C_{30}$ substituted hydrocarbyl, such as a $C_8$-$C_{20}$ substituted hydrocarbyl), an unsubstituted alkoxy (such as a $C_1$-$C_{20}$ alkoxy, such as an ethylene glycol or a polyethylene glycol), a substituted alkoxy (such as a $C_1$-$C_{20}$ substituted alkoxy, for example a $C_1$-$C_8$ substituted alkoxy), an unsubstituted aryl (such as a $C_4$-$C_{60}$ unsubstituted aryl, such as a $C_4$-$C_{20}$ unsubstituted aryl, such as a $C_6$-$C_{14}$ unsubstituted aryl), a substituted aryl (such as a $C_4$-$C_{60}$ substituted aryl, such as a $C_4$-$C_{20}$ substituted aryl, such as a $C_6$-$C_{14}$ substituted aryl), an unsubstituted heteroaryl (such as a $C_4$-$C_{60}$ unsubstituted heteroaryl, such as a $C_4$-$C_{20}$ unsubstituted heteroaryl, such as a $C_6$-$C_{14}$ unsubstituted heteroaryl), or a substituted heteroaryl (such as a $C_4$-$C_{60}$ substituted heteroaryl, a $C_4$-$C_{20}$ substituted heteroaryl, such as a $C_6$-$C_{14}$ substituted heteroaryl); or two or more of $R^1$, $R^2$, $R^3$ and/or $R^4$ may join together to form a substituted or unsubstituted, cyclic or polycyclic ring structure;

one or more of $R^1$, $R^2$, $R^3$, or $R^4$ is, independently, saturated or unsaturated, linear or branched, cyclic or acyclic, aromatic or non-aromatic;

when one or more of $R^1$, $R^2$, and/or $R^3$ is joined together, the formed structure may be substituted or unsubstituted, fully saturated, partially unsaturated, or fully unsaturated, aromatic or non-aromatic, cyclic or polycyclic; and $X^-$ is a counterion, such as those monoatomic or polyatomic anions described above, such as bromide or chloride.

Examples of quaternary amines of formula (1) include dodecyl trimethyl ammonium chloride (DTAC), didodecyl dimethyl ammonium chloride, cetyl trimethyl ammonium bromide, dodecyl trimethyl ammonium bromide, coconut alkyl trimethyl ammonium salts; and stearyltrimethyl ammonium chloride.

The cationic surfactant can include an alkylaryl ammonium represented by the formula (2):

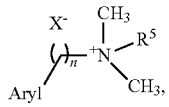

(2)

wherein:

Aryl is a group selected from an unsubstituted aryl (such as a $C_4$-$C_{60}$ unsubstituted aryl, such as a $C_4$-$C_{20}$ unsubstituted aryl, such as a $C_6$-$C_{14}$ unsubstituted aryl), a substituted aryl (such as a $C_4$-$C_{60}$ substituted aryl, such as a $C_4$-$C_{20}$ substituted aryl, such as a $C_6$-$C_{14}$ substituted aryl), an unsubstituted heteroaryl (such as a $C_4$-$C_{60}$ unsubstituted heteroaryl, such as a $C_4$-$C_{20}$ unsubstituted heteroaryl, such as a $C_6$-$C_{14}$ unsubstituted heteroaryl), or a substituted heteroaryl (such as a $C_4$-$C_{60}$ substituted heteroaryl, a $C_4$-$C_{20}$ substituted heteroaryl, such as a $C_6$-$C_{14}$ substituted heteroaryl);

R is a group of $R^1$ of formula (1);

n is an integer from 1 to 50, such as from 8 to 18; and $X^-$ is a counterion, such as those monoatomic or polyatomic anions described above, such as bromide or chloride.

Examples of aryls and heteroaryls of formula (2) include: phenyl, naphthyl, anthracenyl, and pyridinyl radicals. Examples of alkylaryl ammoniums of formula (2) include benzalkoniums, such as benzalkonium chlorides, such as dodecyl dimethyl benzyl ammonium chloride.

The cationic surfactant can include an ethoxylated alkyl amine represented by the formula (3):

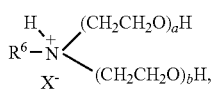

(3)

wherein:

$R^6$ is a group of $R^1$ of formula (1);

each of a and b is, independently, an integer of 1 or more, such as from 2 to 50, for example from 2 to 15; and $X^-$ is a counterion, such as those monoatomic or polyatomic anions described above, such as bromide or chloride.

Other examples of cationic surfactants include octenidine dihydrochloride, cetylpyridinium chloride, benzethonium chlorides, dimethyldioctadecylammonium chloride, dimethyldioctadecylammonium bromide, didecyldimethylammonium chloride, dioctadecyldimethylammonium bromide, and analogs thereof.

B. Anionic Surfactants

Exemplary, but non-limiting, anionic surfactants useful with embodiments described herein include those shown in formula (4a), (4b), (5), (6), (7), (8), (9), (10), (11), (12), (13), and (14), among others. Anionic surfactants typically include a sulfonate, a sulfate, or a carboxylate.

The anionic surfactant can include an alkylaryl sulfonate or an alkylaryl carboxylate represented by the formula (4a):

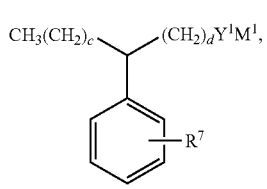

(4a)

wherein:

$R^7$ is a group of $R^1$ of formula (1);

$Y^1$ is a sulfonate group ($SO_3$) or a carboxylate group ($CO_2$);

each of c and d is, independently, an integer of 1 or more, such as from 1 to 100, for example from 9 to 30; and $M^1$ is a counterion, such as those monoatomic or polyatomic cations described above, such as ammonium, sodium, lithium, potassium, ammonium, or pyridinium.

The anionic surfactant can include an alkylaryl sulfonate or an alkylaryl carboxylate represented by the formula (4b):

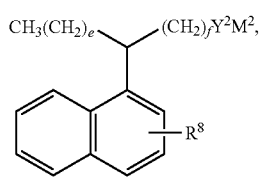

(4b)

wherein:

$R^8$ is a group of $R^1$ of formula (1);

$Y^2$ is a sulfonate group ($SO_3$) or a carboxylate group ($CO_2$);

each of e and f is, independently, an integer of 1 or more, such as from 1 to 100, for example from 9 to 30; and $M^2$ is a counterion, such as those monoatomic or polyatomic cations described above, such as ammonium, sodium, lithium, potassium, ammonium, or pyridinium.

In some examples of alkyl aryl sulfonate represented by the formula (4a, 4b), $R^7$ or $R^8$ is an alkyl sulfonate group. Examples of alkylaryl sulfonates represented by the formula (4a, 4b) include alkylbenzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts.

Examples of alkylaryl carboxylates include those aforementioned sulfonic acids/salts but with a carboxylic acid instead of s sulfonic acid.

The anionic surfactant can include an alkylbenzene sulfonate or an alkylbenzene carboxylate represented by the formula (5):

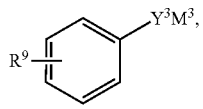

(5)

wherein:
$R^9$ is a group of $R^1$ of formula (1);
$Y^3$ is a sulfonate group ($SO_3$) or a carboxylate group ($CO_2$); and
$M^3$ is a counterion, such as those monoatomic or polyatomic cations described above, such as ammonium, sodium, lithium, potassium, ammonium, or pyridinium.

When $R^9$ is branched, the compounds are known as branched alkyl benzene sulfonates (BABS), such as $C_{15-18}$ BABS and $C_{16-18}$ BABS, which are also useful surfactants for the formulations described herein. An example of an alkylbenzene sulfonate is sodium dodecylbenzene sulfonate (SDBS).

The anionic surfactant can include an alkylsulfate or an alkylcarboxylate represented by the formula (6):

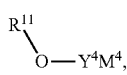
(6)

wherein:
$R^{11}$ is a group of $R^1$ of formula (1);
$Y^4$ is a sulfonate group ($SO_3$) or a carboxylate group ($CO_2$); and
$M^4$ is a counterion, such as those monoatomic or polyatomic cations described above, such as ammonium, sodium, lithium, potassium, ammonium, or pyridinium.

Examples of alkylsulfates represented by the formula (6) include sodium lauryl sulfate, sodium dodecyl sulfate (SDS), and sodium octyl sulfate. Examples of alkylcarboxylates represented by the formula (6) include sodium laureth carboxylate and sodium lauryl glucoside.

The anionic surfactant can include an alcohol propoxy sulfate or an alcohol propoxy carboxylate represented by the formula (7):

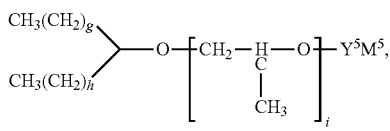
(7)

wherein:
$Y^5$ is a sulfonate group ($SO_3$) or a carboxylate group ($CO_2$);
each of g and h is, independently, an integer of 1 or more, such as from 1 to 100, such as from 9 to 30, such as 16 and 20;
i is an integer of 1 or more, such as from 1 to 100, such as from 1 to 30, such as 7 to 10; and
$M^5$ is a counterion, such as those monoatomic or polyatomic cations described above, such as ammonium, sodium, lithium, potassium, ammonium, or pyridinium.

The anionic surfactant can include an alkyl (or alcohol) ethoxy sulfate or an alkyl (or alcohol) ethoxy carboxylate represented by the formula (8):

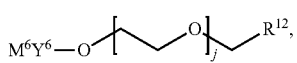
(8)

wherein:
$R^{12}$ is a group of $R^1$ of formula (1);
$Y^6$ is a sulfonate group ($SO_3$) or a carboxylate group ($CO_2$);
j is an integer of 1 or more, such as from 1 to 100, such as from 2 to 40; and
$M^6$ is a counterion, such as those monoatomic or polyatomic cations described above, such as ammonium, sodium, lithium, potassium, ammonium or pyridinium.

The anionic surfactant can include a Guerbet alkoxy sulfate represented by the formula (9):

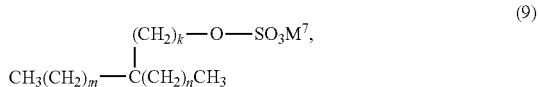
(9)

wherein:
each of k, m, and n is, independently, an integer of 1 or more, such as from 1 to 100, such as from 1 to 50, such as from 12 to 44; and
$M^7$ is a counterion, such as those monoatomic or polyatomic cations described above, such as ammonium, sodium, lithium, potassium, ammonium, or pyridinium.

In some embodiments, the alkyl chains of the Guerbet alkoxy sulfate (9) can be branched or linear, substituted or unsubstituted.

The anionic surfactant can include an n-ethoxy sulfonate represented by the formula (10):

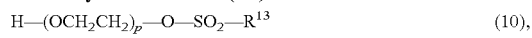
(10), wherein:
$R^{13}$ is a group of $R^1$ of formula (1); and
p is an integer of 1 or more, such as from 1 to 100, such as from 1 to 20, such as from 5 to 20.

Examples of n-ethoxy sulfonates represented by the formula (10) include 7-ethoxy sulfonate and 15-ethoxy sulfonate.

The anionic surfactant can include an alpha olefin sulfonate or an alpha olefin carboxylate represented by the formula (11):

(11)

wherein:
$R^{14}$ is a group of $R^1$ of formula (1);
$Y^8$ is a sulfonate group ($SO_3$), sulfate group ($OSO_3$), or a carboxylate group ($CO_2$);
q is an integer of 1 or more, such as from 1 to 100, such as from 1 to 20, such as from 10 to 20; and
$M^8$ is a counterion, such as those monoatomic or polyatomic cations described above, such as ammonium, sodium, lithium, potassium, ammonium, pyridinium, or pyridinium.

Examples of alpha-olefin sulfonates represented by the formula (11) include sodium C14-C16 olefin sulfonate and sodium alpha-olefin (C12) sulfonate. Examples of alpha-olefin carboxylate represented by the formula (11) include sodium C14-C16 olefin carboxylate and sodium alpha-olefin (C12) carboxylate.

The anionic surfactant can include an alkyl polyalkoxy alkyl sulfonate, alkylaryl polyalkoxy alkyl sulfonate, alkyl polyalkoxy alkyl carboxylate, or an alkylaryl polyalkoxy alkyl carboxylate represented by the formula (12):

$$R^{15}O(R^{16}O)_tR^{17}Y^9M^9 \tag{12}$$

wherein:
- $R^{15}$ is a group of $R^1$ of formula (1);
- $R^{16}$ is a group selected from unsubstituted hydrocarbyl (such as a $C_1$ to $C_{10}$ unsubstituted hydrocarbyl) or substituted hydrocarbyl (such as a $C_1$ to $C_{10}$ substituted hydrocarbyl), such as ethyl, propyl, or a mixture of ethyl and propyl;
- $R^{17}$ is a group selected from unsubstituted hydrocarbyl (such as a $C_1$ to $C_{10}$ unsubstituted hydrocarbyl), a substituted hydrocarbyl (such as a $C_1$ to $C_{10}$ substituted hydrocarbyl), an unsubstituted alkoxy (such as a $C_1$ to $C_{10}$ unsubstituted alkoxy), or a substituted alkoxy (such as a $C_1$ to $C_{10}$ substituted alkoxy), such as ethyl, propyl, butyl and hydroxypropyl;
- $Y^9$ is a sulfonate group ($SO_3$) or a carboxylate group ($CO_2$);
- t is an integer from 1 to 100, such as from 1 to 20, such as from 2 to 8; and
- $M^9$ is a counterion, such as those monoatomic or polyatomic cations described above, such as ammonium, sodium, lithium, potassium, ammonium, or pyridinium.

The anionic surfactant can include a sulfonated, ethoxylated alcohol represented by the formula (13):

$$R^{18}\text{—}O(CH_2)(CH_2)_uCH_2CH_2SO_3M^{10} \tag{13}$$

wherein: $R^{18}$ is a group of $R^1$ of formula (1);
- u is an integer of 1 or more, such as from 1 to 100, such as from 1 to 20; and
- $M^{10}$ is a counterion, such as those monoatomic or polyatomic cations described above, such as ammonium, sodium, lithium, potassium, ammonium, or pyridinium.

The anionic surfactant can include an alkyl ethoxy carboxylate (also referred to as alkyl ether carboxylate) represented by the formula (14):

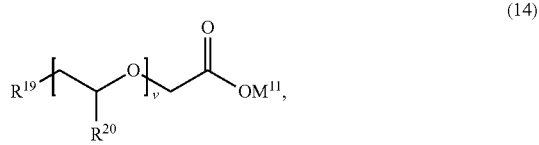

(14)

wherein: each of $R^{19}$ and $R^{20}$ is, independently, a group of $R^1$ of formula (1); v is an integer of 1 or more, such as from 1 to 100, such as from 1 to 20; and $M^{11}$ is a counterion, such as those monoatomic or polyatomic cations described above, such as ammonium, sodium, lithium, potassium, ammonium, or pyridinium.

Other anionic surfactants include: tridecyl-9-propylene oxide-sulfate; ethoxy glycidyl sulfonates; and propoxy glycidyl sulfonates; esterquats; docusate sodium ($C_{20}H_{37}NaO_7S$); alkyl ether sulfates; gemini anionic surfactants; sulfonated, ethoxylated alkyl phenols; sodium petroleum sulfonates; alkyl alcohol propoxylated sulfates (such as propoxylated $C_{12}$ to $C_{20}$ alcohol sulfates); and internal olefin sulfonates.

C. Non-Ionic Surfactants

Exemplary, but non-limiting, non-ionic surfactants useful with embodiments described herein include those shown in formula (15) and (16).

The non-ionic surfactant can include an alkylphenol-n-ethoxylates represented by the formula (15):

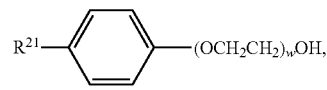

(15)

wherein:
- $R^{21}$ is a group selected from unsubstituted hydrocarbyl (such as $C_1$-$C_{100}$ unsubstituted hydrocarbyl, such as a $C_1$-$C_{30}$ unsubstituted hydrocarbyl, such as a $C_8$-$C_{20}$ unsubstituted hydrocarbyl), or substituted hydrocarbyl (such as a $C_1$-$C_{100}$ substituted hydrocarbyl, such as a $C_1$-$C_{30}$ substituted hydrocarbyl, such as a $C_8$-$C_{20}$ substituted hydrocarbyl); and
- w is an integer of 1 or more, such as from 1 to 100, such as from 1 to 50, such as from 1 to 15.

The non-ionic surfactant can include an alcohol ethoxylate represented by the formula (16a) and/or an alcohol propoxylate represented by the formula (16b)

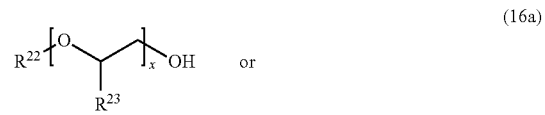

(16a)

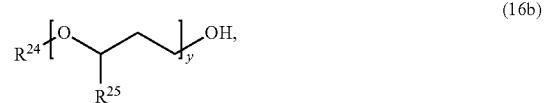

(16b)

wherein:
each of $R^{22}$, $R^{23}$, $R^{24}$, and $R^{25}$ is, independently, a group of $R^1$ of formula (1); and each of x and y is, independently, an integer of 1 or more, such as from 1 to 100, such as from 1 to 20.

Examples of alcohol ethoxylates include dodecyl tetraethylene glycol ether (DTGE) and tetraethylene oxide n-dodecylamide.

Other alcohol ethoxylates and alcohol propoxylates can include those compounds where the R groups inside the brackets (e.g., $R^{23}$ and $R^{25}$) are located on a different carbon atom of a carbon within the brackets.

Alcohol ethoxylates and alcohol propoxylates that are useful as surfactants can include those compounds formed from the reaction of an alcohol with an ethylene oxide, propylene oxide, or a combination thereof. Examples include alkyl phenoxypolyethoxylethanol, such as octyl phenoxypolyethoxylethanol and nonyl phenoxypolyethoxylethanol.

Non-ionic surfactants can also include amines (e.g., primary, secondary, and tertiary amines). An example of a non-ionic surfactant amine is dodecyldiethanolamine.

Additionally, non-ionic surfactants include alcohols (such as $C_1$ to $C_{100}$ alcohols, such as $C_1$ to $C_{30}$ alcohols, such as $C_{10}$ to $C_{20}$ alcohols); fatty alcohol ethoxylates (such as octaethylene glycol monododecyl ether and pentaethylene glycol monododecyl ether); fatty acid ethoxylates; tridecyl alcohol 30 ethoxylate ($C_{13}H_{27}(OCH_2CH_2)_{30}OH$); ethoxylated fatty esters and oils; ethoxylated amines and/or fatty acid amides (such as polyethoxylated tallow amine, cocamide monoethanolamine, and cocamide diethanolamine); Poloxamers; fatty acid esters of polyhydroxy compounds; fatty acid esters of glycerol (such as glycerol monostearate and glycerol monolaurate); fatty acid esters of sorbitol (such as sorbitan monolaurate, sorbitan monostearate, sorbitan oleate, sorbitan trioleate, and sorbitan tristearate), and the Tweens (such as polyoxyethylene (20) sorbitan monolaurate, polyoxyethylene (20) sorbitan monopalmitate, polyoxyethylene (20) sorbitan monostearate, and polyoxyethylene (20) sorbitan monooleate, where 20 refers to the number of oxyethylene groups); fatty acid esters of sucrose; amine oxides such as lauryldimethylamine oxide; polyethoxylated alkylphenols (such as nonoxynols and 4-Octylphenol polyethoxylate); poly (ethylene/propylene) glycol ethers; alkyl polyglycosides (such as decyl glucoside, lauryl glucoside, and octyl glucoside); poloxamers (such as triblock copolymers comprising a polyoxypropylene flanked by polyoxyethylene); modified triphenylmethanes; and organic acids.

D. Zwitterionic Surfactants

Zwitterionic surfactants include those surfactants having a cationic center and an anionic center attached to the same molecule. Examples of zwitterionic surfactants useful with embodiments herein can include those surfactants where the cationic portion is based on a primary, secondary, or tertiary amine or quaternary ammonium cations.

Exemplary, but non-limiting, zwitterionic surfactants useful with embodiments described herein include: sultaines, such as dodecylamidopropyl hydroxysultaine, 3-[(3-Cholamidopropyl)dimethylammonio]-1-propanesulfonate) and cocamidopropyl hydroxy sultaine; betaines such as cocamidopropyl betaine; and phospholipids such as phosphatidylserine, phosphatidylethanolamine, phosphatidylcholine, and sphingomyelins.

Tertiary amine oxides are also contemplated, for example, lauryldimethylamine oxide and myristamine oxide.

Exemplary, but non-limiting, biosurfactants useful with embodiments described herein include: lipopeptides, lipoproteins, rhamnolipids, polyol lipids, trehalolipids, ornithine lipids, sophorose lipids, sophorolipids, surfactin, lichenysin, fatty acids, phospholipids, neutral lipids, polymeric biosurfactants (e.g., emulsan, liposan, alasan, lipomanan, and other polysaccharide-protein complexes), viscosin, diglycosyl diglycerides, and glycolipids.

One or more different surfactants may be combined and used as an additive for methods, apparatus, and systems described herein. Illustrative, but non-limiting, examples of surfactants include dodecyl trimethyl ammonium, didodecyl dimethyl ammonium, dodecyl dimethyl benzyl ammonium, dodecyl tetraethylene glycol ether, tetraethylene oxide n-dodecylamide, dodecyldiethanolamine, dodecylamidopropyl hydroxysultaine, dodecylbenzene sulfonate, dodecyl sulfate, one or more salts thereof, one or more ions thereof, derivatives thereof, and combinations thereof. The salts, as explained above, include a counterion such as an alkali metal, alkaline earth metal, transition metal, ammonium, pyridinium, halides (F, Cl, Br, I), sulfate, sulfonate, tosyl, trifluoromethesulfonate, phosphate, and phosphonate, among others. Other counterions are contemplated.

For purposes of the present disclosure, and unless the context indicates otherwise, when a carboxylate is described as being "attached" to the surface, such description is also intended to include a carboxylate being "bound" to the surface.

Embodiments of the present disclosure can be further understood by the following non-limiting examples. The following non-limiting examples are put forth so as to provide those of ordinary skill in the art with a complete disclosure and description of how to make and use aspects of the present disclosure, and are not intended to limit the scope of aspects of the present disclosure.

EXAMPLES

The examples illustrate, e.g., improved computer models simulating realistic chemical and physical conditions of the reservoir in order to, e.g., better understand the use of additives such as surfactants in enhanced oil recovery. The wettability alteration of oil-wet calcite surfaces by surfactants was investigated through molecular dynamics simulations. In some examples, the ability to alter the surface wettability, which can be directly quantified by the release of surface-bound carboxylates, was tested for different surfactants of all charge types—cationic, anionic, nonionic, and zwitterionic—and was compared to brine.

Example molecular dynamics (MD) simulations were performed with the following parameters. All MD simulations were carried out using GROMACS 5.1.2 software package. CHARMM36 force field parameters with conventions default to the GROMACS software were used for all organic molecules. CHARMM36 force field parameters with GROMACS software are described in the GROMACS Reference Manual Version 5.5.1, manual.gromacs.org/5.1.1/manual-5.1.1.pdf, pages 115-116; B. R. Brooks et al., "CHARMM: The Biomolecular Simulation Program," *J. Comput. Chem.*, 2009, 30, 1545-1614.

Bonding parameters for calcite used for the simulations are described in P. Raiteri et al. "Water Is the Key to Nonclassical Nucleation of Amorphous Calcium Carbonate," *J. Am. Chem. Soc.*, 2010, 132, 17623-17634. The SPC/Fw model used for water in the example simulations are described in Y. Wu et al., "Flexible Simple Point-Charge Water Model with Improved Liquid-State Properties," *J. Chem. Phys.*, 2006, 124, 024503. The non-bonded cutoff distance was 1.2 or 1.4 nm and particle mesh Ewald (PME) summation was employed for the long range electrostatic interactions. Periodic boundary conditions (PBC) in all three dimensions were imposed. The equations of motion were integrated using Verlet algorithm with hydrogens constrained according to the LINCS algorithm similar to that described in D. Van Der Spoel et al., "GROMACS: Fast, Flexible, and Free," *J. Comput. Chem.*, 2005, 26, 1701-1718. The time step was 1.5 ns. The temperature was 300K for all runs, coupled via Nose-Hoover thermostat. The pressure was controlled by a piston formed from a two-layer calcite slab, which was given an acceleration equaling 10 bar of pressure.

In some examples, the harmonic parameters for the C—O intermolecular interaction included $K_b$=35.9 eV Å$^{-2}$ (truncated to 346388.0 kJ mol$^{-1}$ nm$^{-2}$), and $R_0$=1.313 Å; angle-bending parameters for the O—C—O intramolecular interaction included $k_\theta$=12.0 eV rad$^{-2}$ (truncated to 1157.84 kJ mol$^{-1}$ rad$^{-2}$), and $\theta_0$=120 degrees; and the partial charges of Ca: +2, C: +1.123285 (truncated to 1.123), and O: −1.041095 (truncated to 1.041).

SPC/Fw parameters included $k_b$=1059.162 kcal mol$^{-1}$ Å$^{-2}$ (truncated to 443153 kJ mol$^{-1}$ nm$^{-2}$); $r_0$=1.012 Å; $k_a$=75.90 kcal mol$^{-1}$ rad$^{-2}$ (truncated to 317.57 kJ mol$^{-1}$ rad$^{-2}$); $\theta$=113.24 degrees; and the partial charges of $H_w$: +0.41, and $O_w$: −0.82.

An example mineral surface model was assembled according to the following procedure. A section of calcite crystal cut along the {1,0,-1,4} plane with six layers was used to model the mineral surface. In the topmost calcite plane, selected carbonate ions ($CO_3^2$) are substituted by hydroxyl anions (OH$^-$), while another neighboring carbonate is converted to a bicarbonate ($HCO_3^-$). An additional hydroxyl was attached to the OH$^-$ filled vacancy site, leaving a net single positive charge. The oil phase was positioned so that the oil occupies its central part along one of the plane dimensions, but stretches along the entire surface in the second dimension (see FIGS. 3A-3D). With periodic boundary conditions, this arrangement created a pseudo-2D system, where the model oil forms a droplet in one dimension, but an infinite layer in the other. The surface dimensions were 9.716 nm×5.489 nm. The central section (4.858 nm×5.489 nm) contained 16 charged sites with pre-attached carboxylates (5 nonanoate ions, 4 benzoate ions, and 4 naphthenate ions). The two flanking sections (dimensions of 2.429 nm×5.489 nm) had 8 charged sites each, which were paired with additional hydroxyl ions. This can be utilized to mimic the charged surface without oil, initially neutralized by solution anions, but available for competitive displacement by the oil carboxylates in the simulations.

An example oil model was assembled according to the following procedure. Two models for crude oil were assembled, and are referred to as polar oil (POil) and non-polar oil (NOil). Table 1 shows the molecular compositions of the POil and NOil models. Both oil models contained a non-polar portion of aliphatic hydrocarbons (paraffins), cyclic hydrocarbons (naphthenes), and aromatic hydrocarbons in a 40:40:20 ratio by weight. Each of these non-polar fractions were composed of several molecules representative of the chemical composition of the oil in equal weight proportions. The NOil model had no other components aside from the sixteen carboxylate molecules attached to the surface. The POil model assembled had approximately 50% of the total weight of polar species, including alcohols, a ketone, nitrogen-containing heterocycles, charged carboxylates, and several sulfur-containing compounds, in equal weight proportions, as detailed in Table 1. The acids, e.g., ethylbenzoic acid, nonanoic acid, and naphthenic acid were in ionized (de-protonated) form for the simulation. The numeric values in Table 1 with respect to POil and NOil refer to the number of the molecules contained in the oil phase. For example, the model polar oil (POil) contains three undecane molecules.

TABLE 1

| Compound | Mol. wt., g/mol | POil amount | NOil amount |
|---|---|---|---|
| Aliphatic hydrocarbons | | | |
| undecane | 156.3 | 3 | 6 |
| pentadecane | 212.4 | 2 | 5 |
| octadecane | 254.5 | 2 | 4 |
| nonane | 128.2 | 4 | 8 |
| octane | 114.2 | 4 | 9 |
| heptane | 100.2 | 5 | 10 |
| pentane | 72.15 | 7 | 14 |
| tetramethylpentadecane | 268.5 | 2 | 4 |
| methylhexane | 100.2 | 5 | 11 |
| dimethyloctane | 142.3 | 4 | 8 |
| Cyclic hydrocarbons | | | |
| cyclohexane | 84.2 | 19 | 41 |
| cyclopentane | 70.1 | 23 | 49 |
| decalin | 138.25 | 12 | 25 |
| Aromatic hydrocarbons | | | |
| benzene | 78.1 | 7 | 16 |
| toluene | 92.1 | 7 | 14 |
| p-xylene | 106.2 | 6 | 12 |
| naphthalene | 128.2 | 5 | 10 |
| Polar | | | |
| indole | 117.2 | 7 | — |
| quinoline | 129.2 | 6 | — |
| carbazole | 167.2 | 5 | — |
| ethylbenzoic acid | 150.2 | 7 | 5 |
| nonanoic acid | 158.2 | 7 | 6 |
| naphthenic acid | 142.3 | 7 | 5 |
| phenol | 94 | 11 | — |
| propylphenol | 136.2 | 8 | — |
| nonanone | 142.2 | 8 | — |
| methyloctylsulfide | 160.3 | 7 | — |
| methyloctyldisulfide | 192.4 | 6 | — |
| nonanethiol | 160.3 | 7 | — |
| benzothiophene | 134.2 | 8 | — |

The composition and relative amount of the polar molecules of the two models of crude oil (NOil and POil) was chosen to approximate the correct value of the interfacial tension (IFT) for the model oils. Due to, e.g., the disproportionately higher surface-to-volume ratio of the very small model oil droplet in the computer simulation, the fraction of polar molecules for the model was higher than real crude oil in order to achieve, e.g., the same IFT. The NOil model was constructed to, e.g., eliminate artifacts due to the high polarity of the model oil with the correct IFT. For the simulations, three droplets of both the POil and the NOil were independently assembled to ensure minimum similarity between the initial conditions.

Figure 2B:
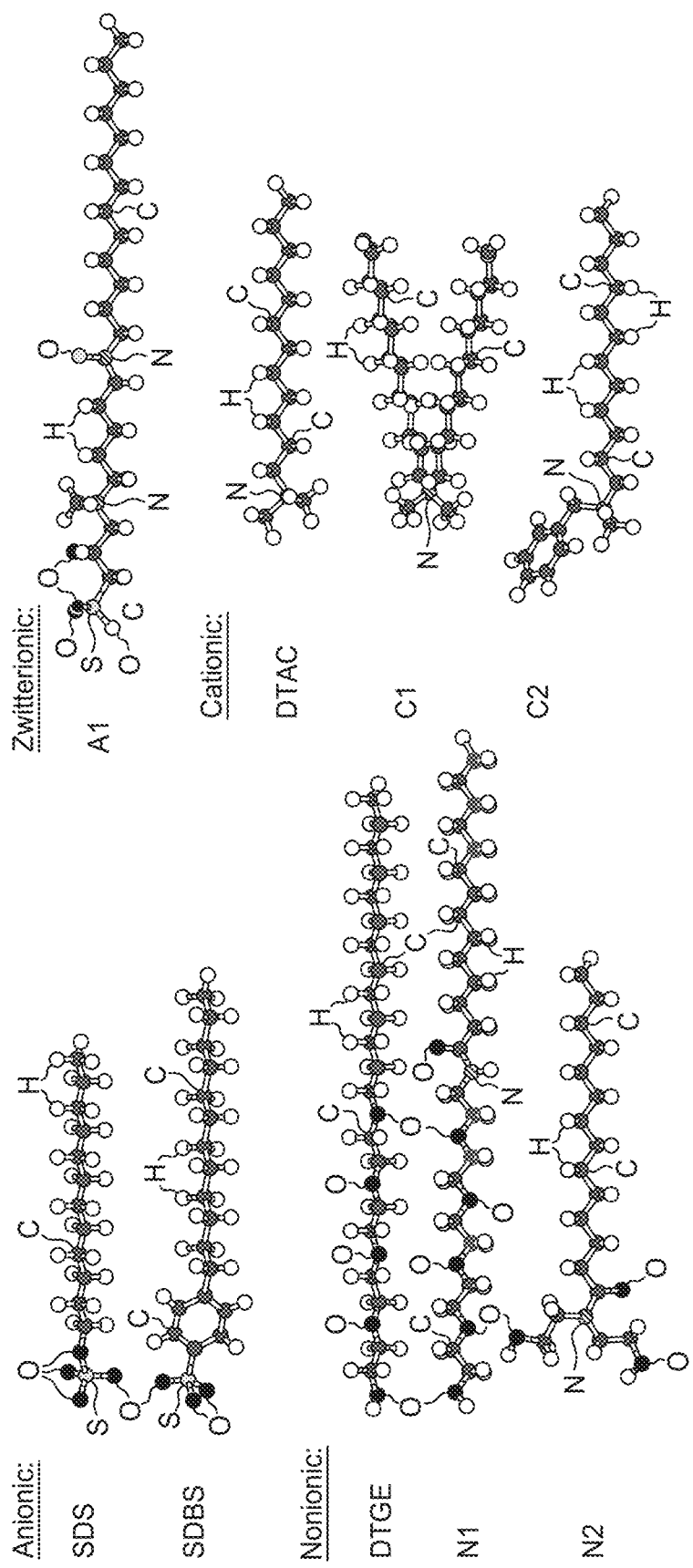
FIG. 2B shows ball-and-stick representations of example surfactants utilized with some embodiments of the present disclosure.

Example additives were chosen (e.g., cationic non-ionic, anionic, and zwitterionic surfactants) and tested with the simulations. The force field parameters and partial charges for the model surfactants were derived from the published values for the same chemical groups, compiled under the CGenFF project and with the aid of CGenFF website, cgenff.umaryland.edu. Table 2 shows the model surfactants utilized for the examples and ball-and-stick models of the surfactants are shown in FIG. 2B.

TABLE 2

| Surfactant name/Chemical description | Code name | Electric character | Mol. Wt., g/mol |
|---|---|---|---|
| Dodecyl trimethyl ammonium chloride | DTAC | Cationic | 264 |
| Didodecyl dimethyl ammonium chloride | C1 | Cationic | 418 |
| Dodecyl dimethyl benzyl ammonium chloride | C2 | Cationic | 340 |
| Dodecyl tetraethylene glycol ether | DTGE | Nonionic | 363 |
| Tetraethylene oxide n-dodecylamide | N1 | Nonionic | 448 |
| Dodecyldiethanolamine | N2 | Nonionic | 274 |
| Dodecylamidopropyl hydroxysultaine | A1 | Zwitterionic | 465 |
| Sodium dodecylbenzene sulfonate | SDBS | Anionic | 348 |
| Sodium dodecyl sulfate | SDS | Anionic | 288 |

Example simulation protocols were performed as follows. A surface/oil/brine system was assembled from the pre-equilibrated calcite surface model with 16 ionized oil acids attached via their carboxylate groups to the positively-charged sites and covered with approximately 0.5 nm of water, corresponding to two to three molecular layers. The oil mixture was then superimposed onto the surface and solvated with SPC/Fw water containing about 90 g/L (~1.55 M or ~8% by weight) NaCl, which corresponds to the typical salt concentrations in carbonate reservoir brines. The system was then equilibrated in a NVT simulation at 300 K for 600 ps. The pressure was controlled by a piston formed from a two-layer calcite slab, which was given an acceleration equaling of about 10 bar of pressure. After the equilibration, the solvent other than the surface water and ions were removed. FIGS. 3A-3D show the resulting surface/oil/brine system. This surface/oil/brine system was also used as a starting configuration for the wettability alteration examples.

In FIGS. 3A-3D, showing the calcite with an attached oil droplet, various components are indicated—the calcite surface 302, the oil 304 with carboxylic acids 306 (or carboxylates), and the water 308. The water 308 fills the black space and the water molecules are not shown for clarity. FIGS. 3A and 3B are side views of the surface/oil/brine system along the longer and shorter edges, respectively, while FIG. 3C is a top view of the surface/oil/brine system. FIG. 3D shows a general view of the surface/oil/brine system, where the boundaries of the simulation box are depicted with the box.

Each of the example surfactants (Table 2) were, independently, added to the system. Here, a surfactant is introduced by re-solvating the model oil droplet on the calcite surface with the surfactant solution (in about 90 g/L NaCl). The concentration of all surfactants was about 15% by weight. After an energy minimization, the surface/oil/brine system was equilibrated once more at ~300K and ~10 bar for 600 ps, but with the surfactant positions frozen to ensure that the surfactants had not begun to influence the oil-calcite interaction prior to the beginning of the production run. After the final energy minimization, the production runs were launched for about 150 ns. For the polar oil, another 150 ns trajectories were performed, yielding a total of about 300 ns simulation time. For the non-polar oil, about 150 ns of simulation time was performed to reach the equilibrium.

The same procedure was repeated with three independently generated and equilibrated oil droplets to, e.g., help eliminate artifacts in the results arising from a specific starting configuration. The control simulation with just the brine (no surfactants or additives) followed the same protocol, only the pre-equilibrated oil droplet was re-solvated in just brine.

Figure 3E:
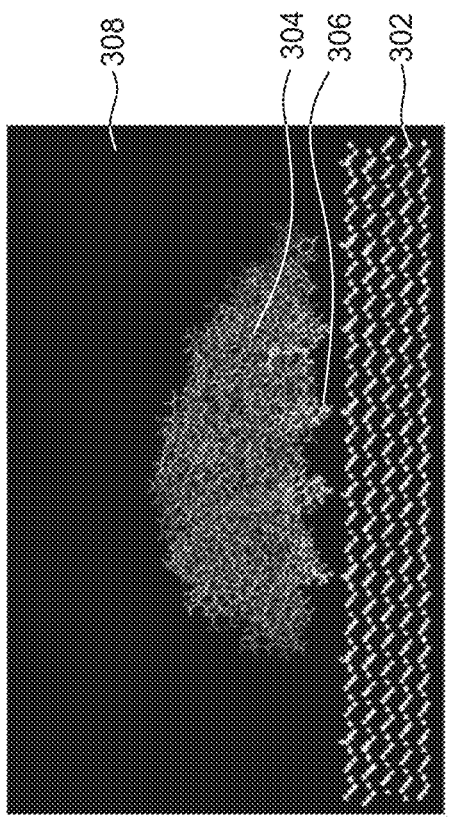
FIG. 3E is an MD simulation of a surface/oil/brine system having first initial conditions according to at least one embodiment of the present disclosure.
Figure 3F:
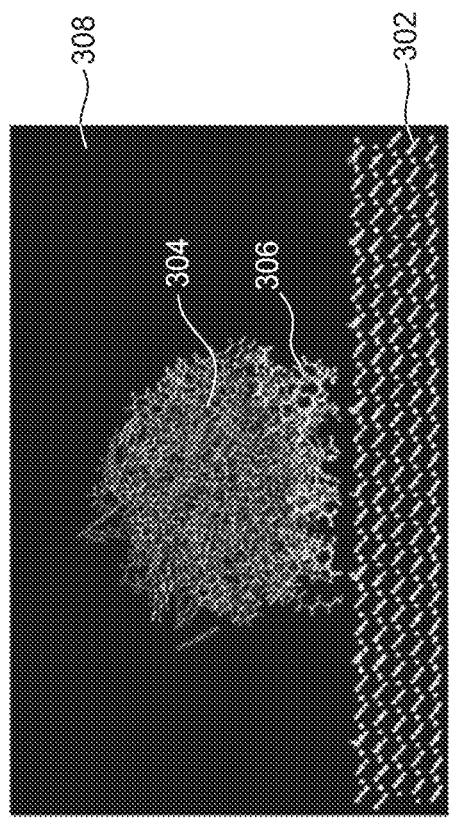
FIG. 3F is an MD simulation of a surface/oil/brine system having second initial conditions according to at least one embodiment of the present disclosure.
Figure 3G:
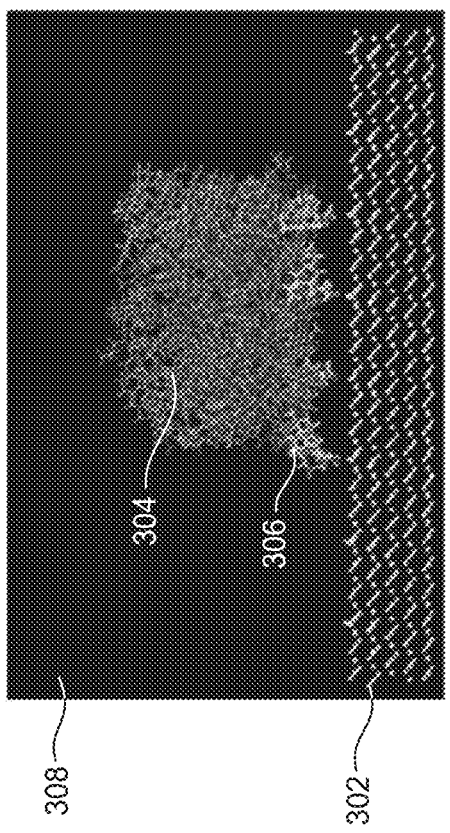
FIG. 3G is an MD simulation of a surface/oil/brine system having third initial conditions according to at least one embodiment of the present disclosure.
Figure 3H:
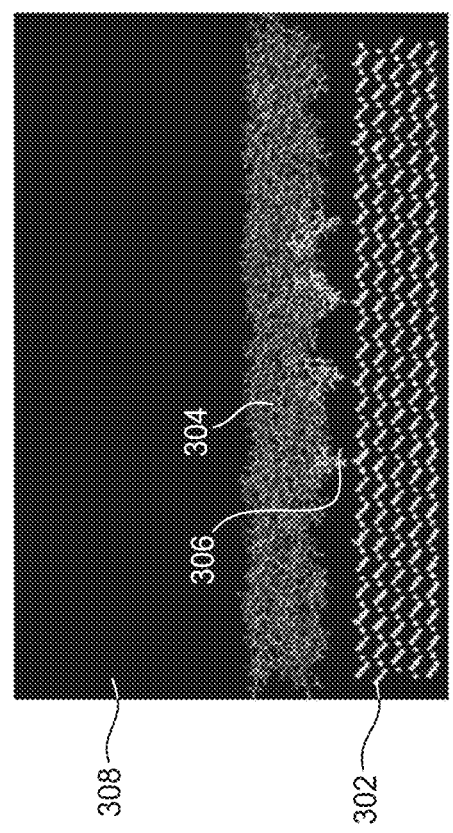
FIG. 3H is an MD simulation of a surface/oil/brine system at an equilibrium state according to at least one embodiment of the present disclosure.

The adsorption of oil of the calcite surface was investigated by molecular dynamics and interaction energetics. FIG. 3E-3H are MD simulations of the surface/oil/brine system showing the convergence of various initial configurations of the oil to the same equilibrium state. Specifically, FIGS. 3E-3G show the different initial conditions of the individual MD simulations, and FIG. 3H shows the shape of the final state that results from all MD simulations regardless of the initial condition utilized. Various components of the system are indicated: the calcite surface 302, the oil 304 with carboxylic acids 306, and the water 308.

The data indicated that the MD trajectories, starting from very different initial oil arrangements, all equilibrated to essentially the same state, with the round oil droplet (oil 304) anchored to the calcite surface 302 solely via the ionized acidic components 306. No other compounds in the oil, including any of the polar ones (Table 1), participated in the oil-surface adsorption. The data also indicated that the Coulombic forces between the surface charges and organic carboxylates in the oil are the sole source of the oil wetness.

Figure 4:
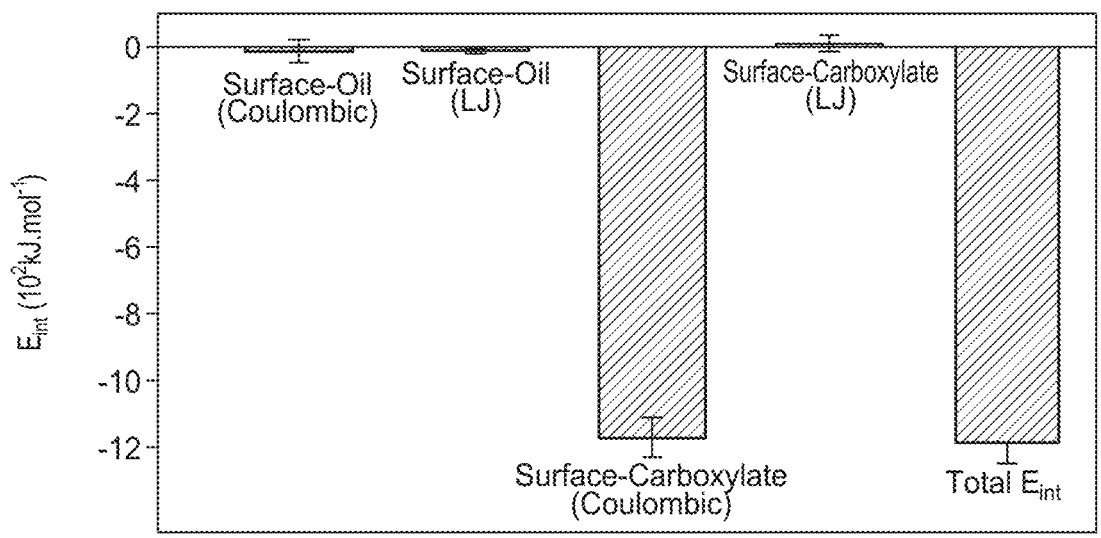
FIG. 4 shows exemplary data for the energetics of the oil-surface interaction according to at least one embodiment of the present disclosure.

FIG. 4 shows exemplary data for the interaction energetics of the oil-surface interaction. The electrostatic forces between the calcite surface and the carboxylates in the oil are decomposed into individual interaction energies. In FIG. 4, "Surface-Oil (Coulombic)" refers to the Coulombic interaction energy between all atoms that constitute the surface and those that constitute the oil, and "Surface-Carboxylate (Coulombic)" refers to the Coulombic interaction energy between all atoms that constitute the surface and the carboxylate molecules. "Surface-Oil (LJ)" refers to the Lennard-Jones (LJ) interaction energy between all atoms that constitute the surface and those that constitute the oil, and "Surface-Carboxylate (LJ)" refers to LJ interaction energy between all atoms that constitute the surface and the carboxylate molecules. Total Ent refers to the sum of the preceding four items.

The data shown in FIG. 4 indicated that the Coulombic term between the carboxylates (Surface-Carboxylate (Coulombic)) overwhelmingly dominated the total interaction energy (Total Ent) of the oil-surface interaction. The data of FIG. 4 also indicated that the amount of the surface-bound carboxylates is a useful measure of the wettability alteration. The amount of the surface-bound carboxylates were used to quantify the performance of the different surfactants.

The wettability alteration by various surfactants were examined. MD simulations were run three times for each surfactant with each oil model (POil and NOil) for a total of 6 runs per surfactant.

Figure 5A:
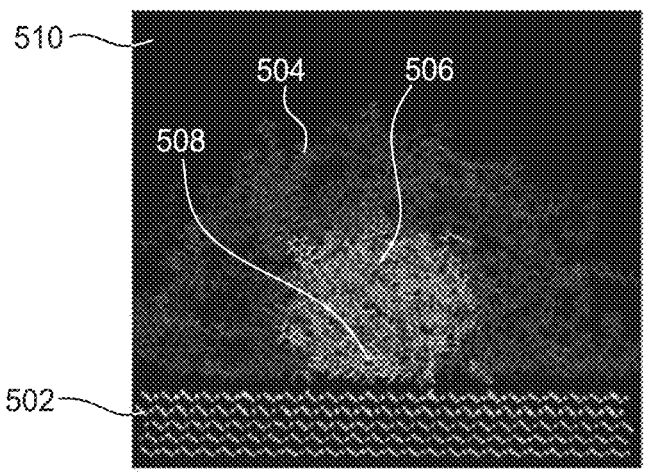
FIG. 5A shows a snapshot of the MD trajectory of a calcite/oil/brine system with dodecyl trimethyl ammonium chloride (DTAC) at 0 ns (starting configuration) according to at least one embodiment of the present disclosure.
Figure 5B:
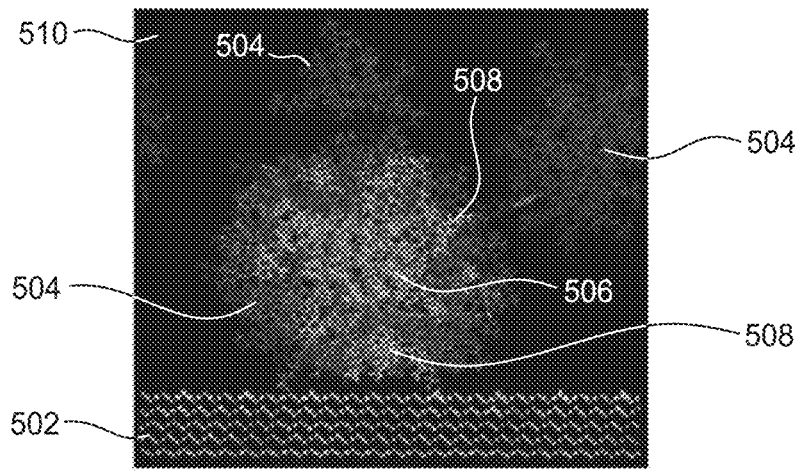
FIG. 5B shows a snapshot of the MD trajectory of a calcite/oil/brine system with DTAC at 150 ns according to at least one embodiment of the present disclosure.
Figure 5C:
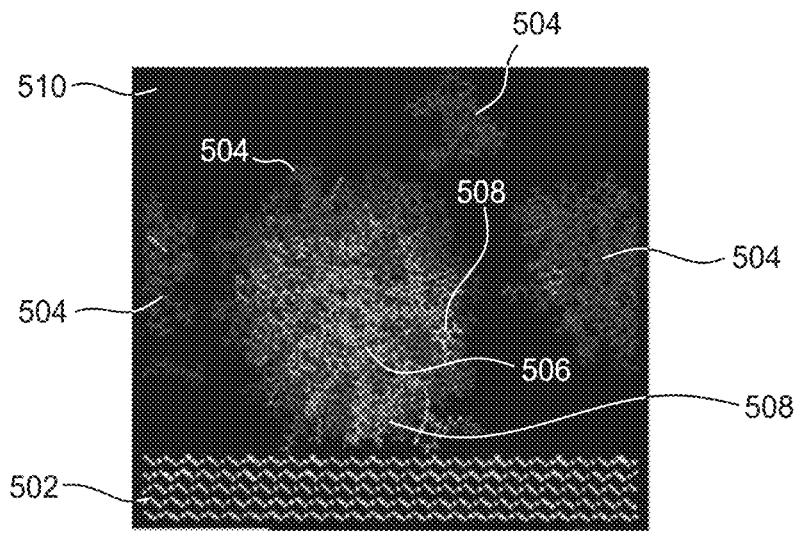
FIG. 5C shows a snapshot of the MD trajectory of a calcite/oil/brine system with the DTAC at 300 ns according to at least one embodiment of the present disclosure.

FIGS. 5A-5C show snapshots from the MD simulation of the calcite/oil/brine system with the cationic surfactant DTAC. Various components of the system are indicated: the calcite surface 502, surfactant 504, the oil 506 with carboxylate compounds 508, and the water 510. The water 510 fills the black space and the water molecules are not shown for clarity. Specifically, FIGS. 5A, 5B, and 5C show the MD simulation at 0 ns (starting configuration), the MD simulation at 150 ns, and the MD simulation at 300 ns, respectively.

The data indicated that the surfactant 504 molecules (DTAC), while associating with the oil droplet (oil 506), not only form a layer at the interface between the oil 506 and brine, but also form several micellar structures in the solution. Such results were observed for all cationic surfactants and anionic surfactants, but not for the nonionic surfactants or zwitterionic surfactants, as discussed below. Although the surfactant molecules did not completely release the oil 506 from the calcite surface 502, FIGS. 5A-5C indicated that some of the carboxylate compounds 508 of the oil were detached.

The number of oil carboxylates attached/bound to the calcite surface were also examined. The oil carboxylates, e.g., the carboxylates present in the oil models, are also referred to herein as "carboxylic acids" and "acids". To determine the number of oil carboxylates bound to the surface, a molecule was considered bound if the carboxylate carbon atom is within 0.55 nm of the calcite surface.

Figure 6A:
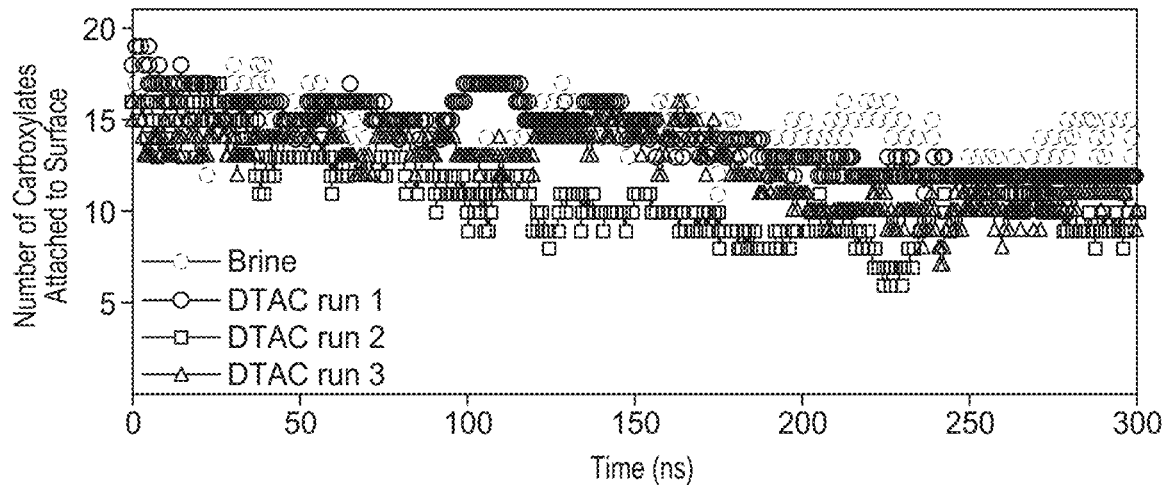
FIG. 6A shows exemplary MD simulation data of the wettability alteration by DTAC with a polar oil model according to at least one embodiment of the present disclosure. The data shown are from three independent MD trajectories with DTAC and an MD trajectory with brine alone.
Figure 6B:
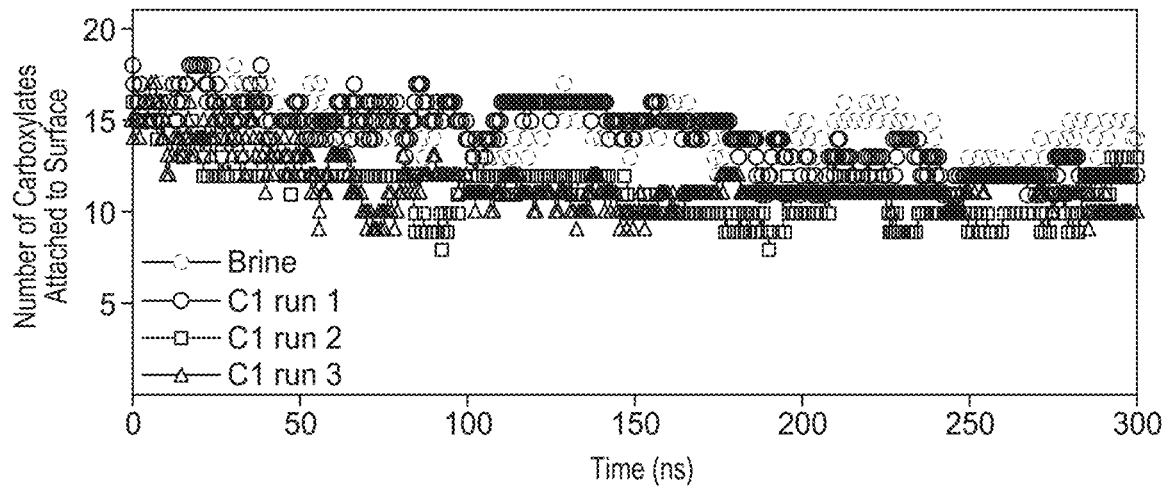
FIG. 6B shows exemplary MD simulation data of the wettability alteration by didodecyl dimethyl ammonium chloride (C1) with a polar oil model according to at least one embodiment of the present disclosure. The data shown are from three independent MD trajectories with C1 and an MD trajectory with brine alone.
Figure 6C:
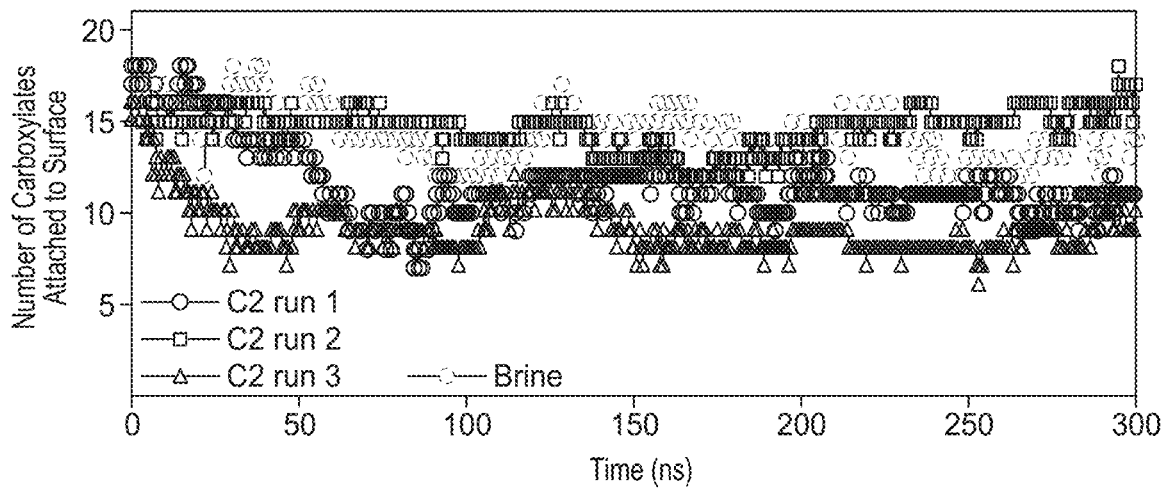
FIG. 6C shows exemplary MD simulation data of the wettability alteration by dodecyl dimethyl benzyl ammonium chloride (C2) with a polar oil model according to at least one embodiment of the present disclosure. The data shown are from three independent MD trajectories with C2 and an MD trajectory with brine alone.

FIGS. 6A-6C show exemplary data for the wettability alteration by cationic surfactants with the polar oil model (POil). The plots detail the number of oil carboxylates (also referred to as acids) bound to the calcite surface as a function of time for three independent MD trajectories with the cationic surfactants DTAC (FIG. 6A), C1 (FIG. 6B), and C2 (FIG. 6C). A control run with just the brine was also performed and shown in the figures. The MD trajectories were performed for 300 ns. In the figures, e.g., FIGS. 6A-6C, the term "attached" is used interchangeably with the term "bound."

The polar oil model contains a total of 21 carboxylates, 16 of which are initially attached to the calcite surface. The number of carboxylates at the surface fluctuated considerably during each run as well as among the individual trajectories. However, the overall trend toward lower number of adsorbed acids and, therefore, less oil-wet surface, is evident. While the simulation with the DTAC surfactant (FIG. 6A) may indicate that the trend toward a lower number of adsorbed acids might continue at longer times, the simulations with the C1 surfactant (FIG. 6B) and the C2 surfactant (FIG. 6C) indicated that the system has equilibrated. The fluctuations in the bound carboxylate numbers, particularly those on the longer time-scale (10's of ns), show that the detached acids do not leave the surface irreversibly, but may eventually diffuse back to the surface and re-adsorb.

Figure 14A:
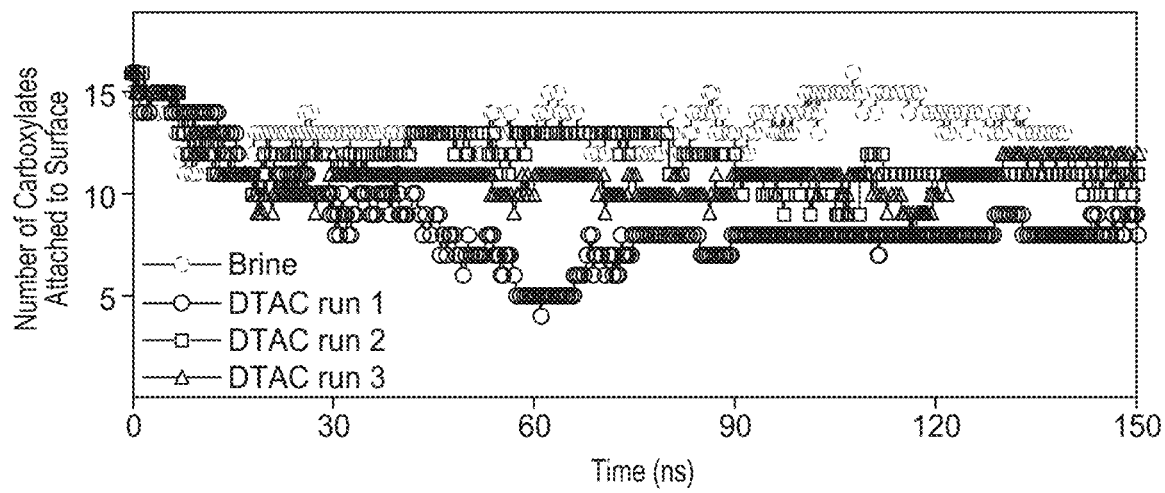
FIG. 14A shows exemplary MD simulation data of the wettability alteration by DTAC with a non-polar oil model according to at least one embodiment of the present disclosure. The data shown are from three independent MD trajectories with DTAC and an MD trajectory with brine alone.
Figure 14B:
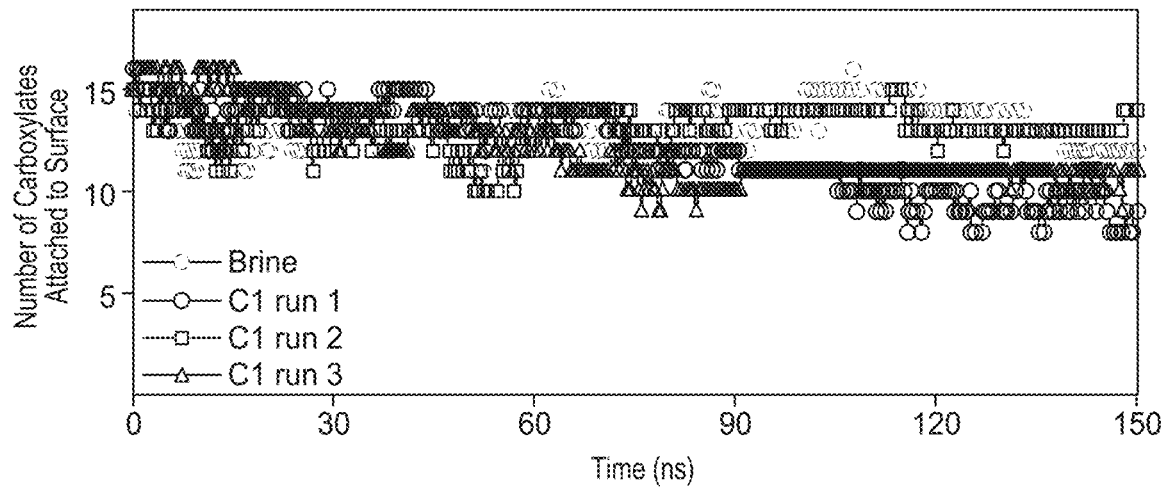
FIG. 14B shows exemplary MD simulation data of the wettability alteration by C1 with a non-polar oil model according to at least one embodiment of the present disclosure. The data shown are from three independent MD trajectories with C1 and an MD trajectory with brine alone.
Figure 14C:
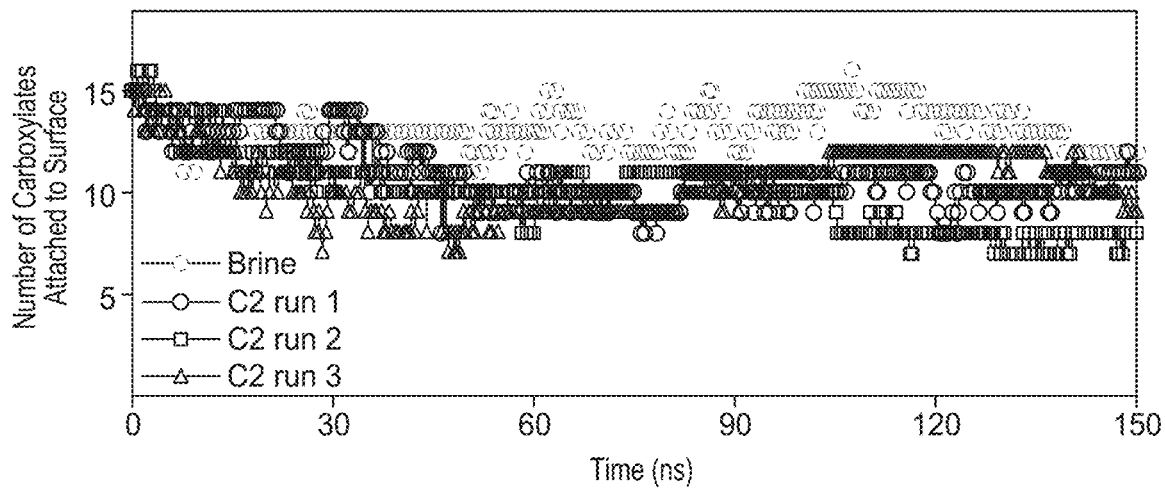
FIG. 14C shows exemplary MD simulation data of the wettability alteration by C2 with a non-polar oil model according to at least one embodiment of the present disclosure. The data shown are from three independent MD trajectories with C2 and an MD trajectory with brine alone.

The MD simulations of the wettability alteration by cationic surfactants with the non-polar oil model were also performed. The plots for the numbers of adsorbed oil carboxylates for the non-polar oil model (NOil) are shown in FIG. 14A-14C (further discussed below). The NOil MD trajectories were stopped at 150 ns since equilibrium had been established. The non-polar oil has only 16 organic carboxylates, all of which are initially attached to the calcite surface. The wettability behavior of the DTAC, C1, and C2 surfactants was similar to that shown in FIGS. 6A-6C.

Figure 7A:
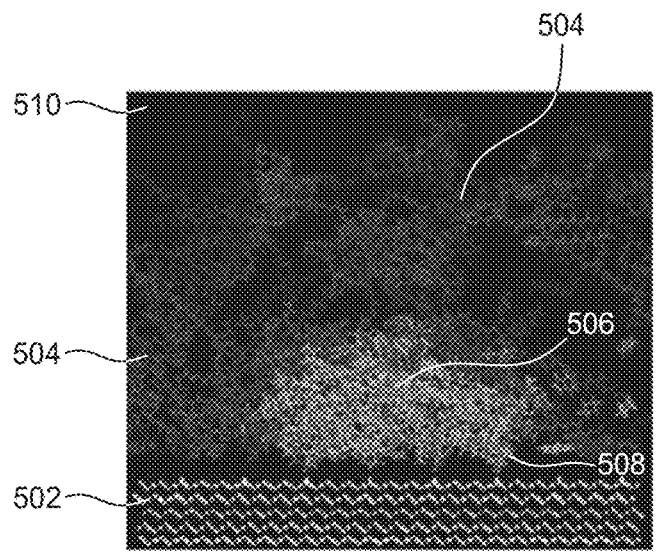
FIG. 7A shows a snapshot of the MD trajectory of a calcite/oil/brine system with dodecyl tetraethylene glycol ether (DTGE) at 0 ns (starting configuration) according to at least one embodiment of the present disclosure.
Figure 7B:
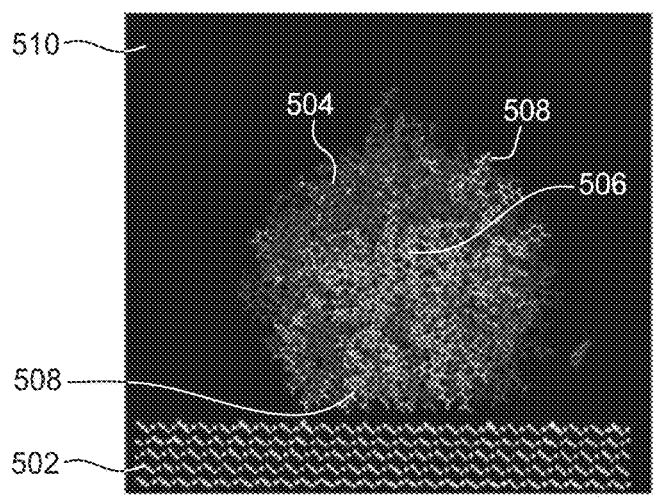
FIG. 7B shows a snapshot of the MD trajectory of a calcite/oil/brine system with DTGE at 150 ns according to at least one embodiment of the present disclosure.
Figure 7C:
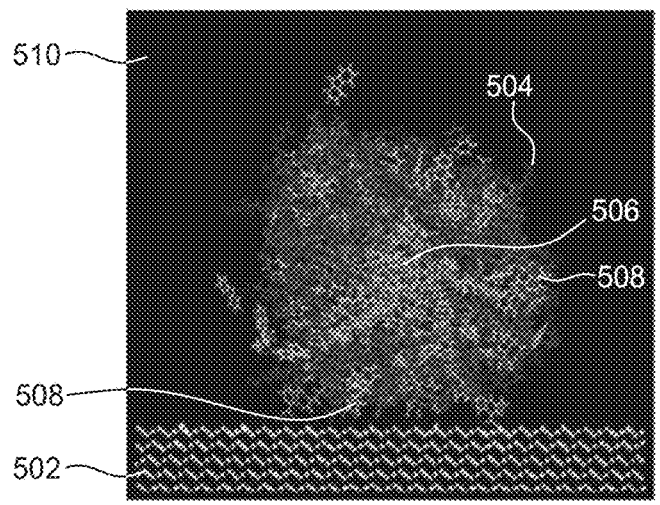
FIG. 7C shows a snapshot of the MD trajectory of a calcite/oil/brine system with DTGE at 300 ns according to at least one embodiment of the present disclosure.

The wettability alteration of the example non-ionic and zwitterionic surfactants shown in Table 2 were also examined. FIGS. 7A-7C show snapshots from the MD simulation of the calcite/oil/brine system with the non-ionic surfactant DTGE. Various components of the system are indicated: the calcite surface 502, surfactant 504 (DTGE), the oil 506 with carboxylate compounds 508, and the water 510. The water 510 fills the black space and the water molecules are not shown for clarity. Specifically, FIGS. 7A, 7B, and 7C show the MD simulation at 0 ns (starting configuration), the MD simulation at 150 ns, and the MD simulation at 300 ns, respectively. The data indicated that, in contrast to the cationic surfactants (FIGS. 5A-5C), no micelles were formed by the nonionic surfactant in brine. All surfactant molecules covered the oil droplet. The same behavior was observed for the other two nonionic surfactants (N1, N2) as well as the zwitterionic surfactant (A1).

Figure 8A:
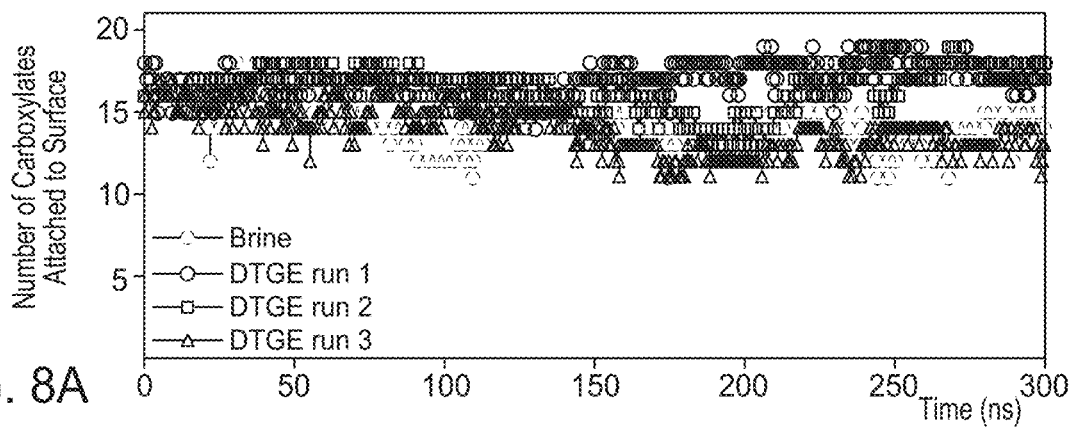
FIG. 8A shows exemplary MD simulation data of the wettability alteration by DTGE with a polar oil model according to at least one embodiment of the present disclosure. The data shown are from three independent MD trajectories with DTGE and an MD trajectory with brine alone.
Figure 8B:
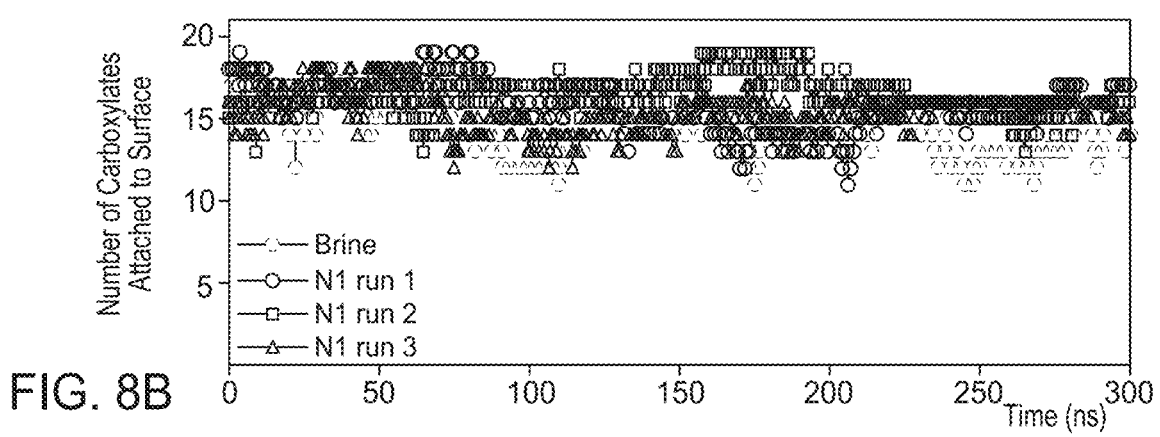
FIG. 8B shows exemplary MD simulation data of the wettability alteration by tetraethylene oxide n-dodecylamide (N1) with a polar oil model according to at least one embodiment of the present disclosure. The data shown are from three independent MD trajectories with N1 and an MD trajectory with brine alone.
Figure 8C:
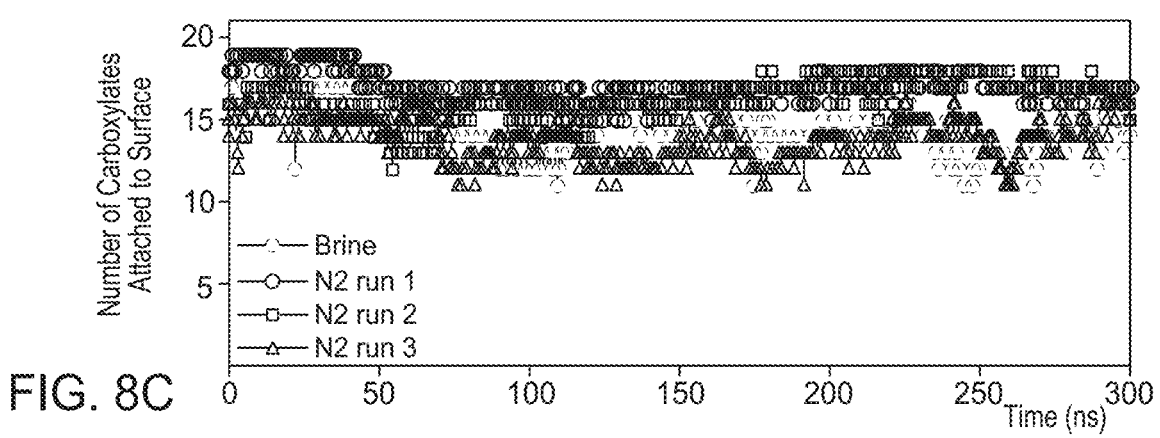
FIG. 8C shows exemplary MD simulation data of the wettability alteration by dodecyldiethanolamine (N2) with a polar oil model according to at least one embodiment of the present disclosure. The data shown are from three independent MD trajectories with N2 and an MD trajectory with brine alone.
Figure 8D:
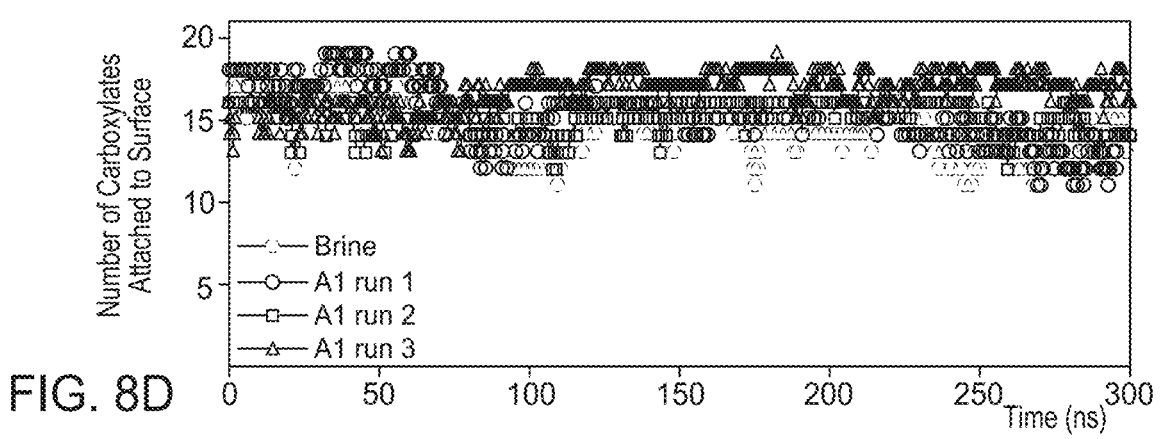
FIG. 8D shows exemplary MD simulation data of the wettability alteration by dodecylamidopropyl hydroxysultaine (A1) with a polar oil model according to at least one embodiment of the present disclosure. The data shown are from three independent MD trajectories with A1 and an MD trajectory with brine alone.

FIGS. 8A-8D show exemplary data for wettability alteration by nonionic surfactants and the zwitterionic surfactants with the polar oil model (POil). The plots detail the number of oil carboxylates bound to the calcite surface as a function of time during the 300 ns MD simulations with the nonionic surfactants DTGE (FIG. 8A), N1 (FIG. 8B), N2 (FIG. 8C), and the zwitterionic surfactant A1 (FIG. 8D). A control run with just the brine was also performed and shown in the figures. The MD simulations of the wettability alteration by nonionic and zwitterionic surfactants with the non-polar oil model (NOil) were also performed. The plots for the numbers of adsorbed oil carboxylates for the non-polar oil model (NOil) are shown in FIG. 15A-15D (further discussed below).

The numbers of bound carboxylates for the non-ionic and zwitterionic surfactant simulations (FIGS. 8A-8D and FIGS. 15A-15D) do not trend lower with time as strongly as for the cationic surfactants (FIGS. 6A-6C and FIGS. 14A-14C). In many cases the number of bound carboxylates for the non-ionic and zwitterionic surfactant simulations stayed mostly constant throughout the simulations. Further the fluctuations in the number of carboxylates at the surface were generally smaller for the non-ionic and zwitterionic surfactants relative to the cationic surfactants. Overall, the data indicated that the non-ionic surfactants (DTGE, N1, and N2) and the zwitterionic surfactant (A1) influenced the interactions of the oil carboxylates with the calcite surface less than the cationic ones (DTAC, C1, and C2).

Figure 9A:
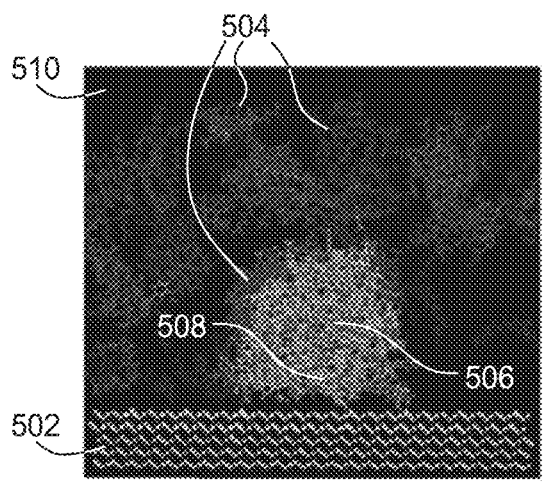
FIG. 9A shows a snapshot of the MD trajectory of a calcite/oil/brine system with sodium dodecyl sulfate (SDS) at 0 ns (starting configuration) according to at least one embodiment of the present disclosure.
Figure 10A:
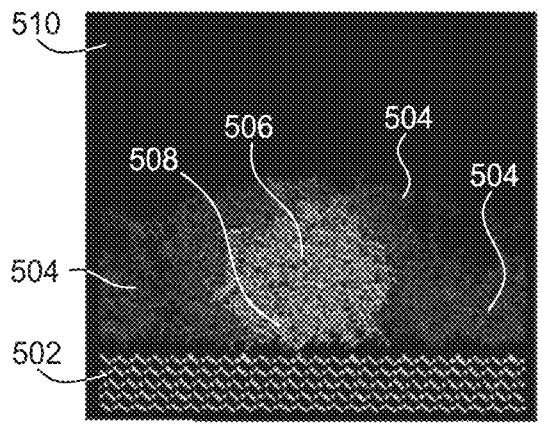
FIG. 10A shows a snapshot of the MD trajectory of a calcite/oil/brine system with sodium dodecylbenzene sulfonate (SDBS) at 0 ns (starting configuration) according to at least one embodiment of the present disclosure.
Figure 9B:
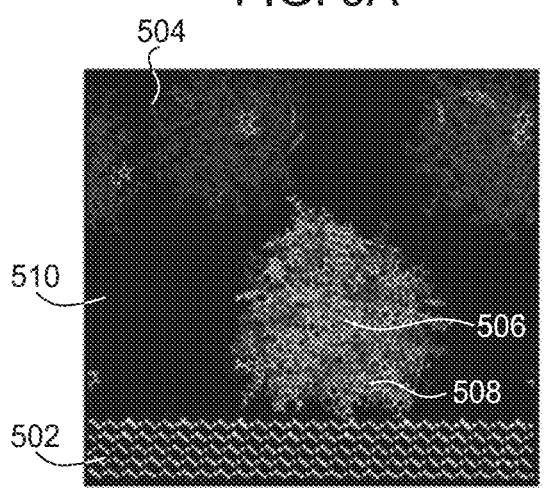
FIG. 9B shows a snapshot of the MD trajectory of a calcite/oil/brine system with SDS at 150 ns according to at least one embodiment of the present disclosure.
Figure 10B:
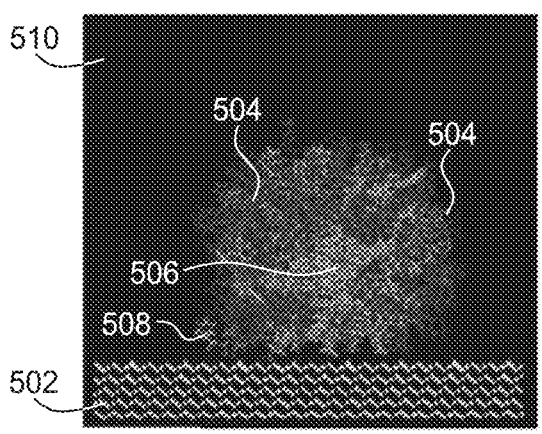
FIG. 10B shows a snapshot of the MD trajectory of a calcite/oil/brine system with SDBS at 150 ns according to at least one embodiment of the present disclosure.
Figure 9C:
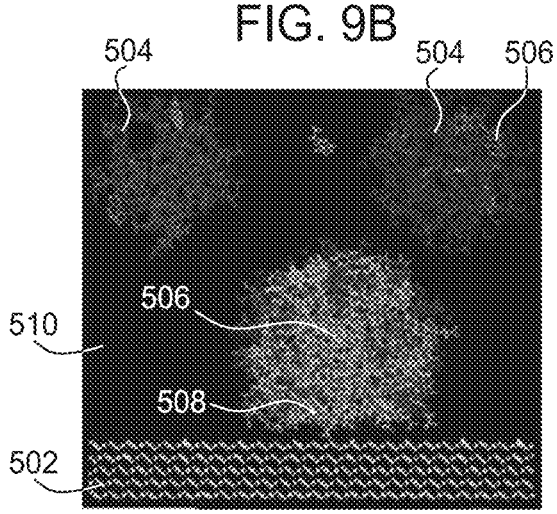
FIG. 9C shows a snapshot of the MD trajectory of a calcite/oil/brine system with SDS at 300 ns according to at least one embodiment of the present disclosure.
Figure 10C:
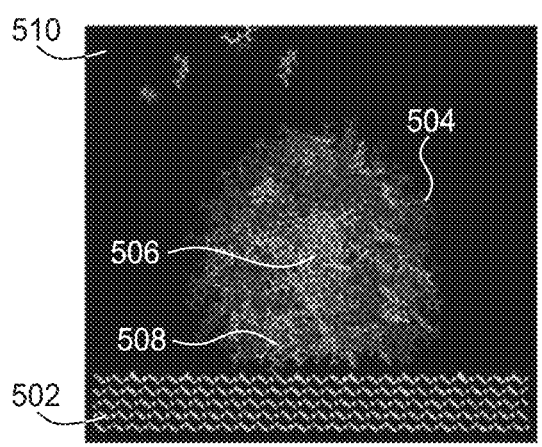
FIG. 10C shows a snapshot of the MD trajectory of a calcite/oil/brine system with the SDBS at 300 ns according to at least one embodiment of the present disclosure.

The wettability alteration of the example anionic surfactants shown in Table 2 were also examined. FIGS. 9A-9C show snapshots from the MD simulation of the calcite/oil/brine system with the anionic surfactant SDS, and FIGS. 10A-10C show snapshots from the MD simulation of the calcite/oil/brine system with the anionic surfactant SDBS. Various components of the systems are indicated: the calcite surface 502, surfactant 504 (SDS or SDBS), the oil 506 with carboxylate compounds 508, and the water 510. The water 510 fills the black space and the water molecules are not shown for clarity. The MD simulations at 0 ns (starting configuration) are shown in FIGS. 9A and 10A, the MD simulations at 150 ns are shown in FIGS. 9B and 10B, and the MD simulations at 300 ns are shown in FIGS. 9C and 10C.

The MD trajectory snapshots for the anionic surfactant SDS (FIGS. 9A-9C) displayed the formation of surfactant micelles, in solution, as also observed for the cationic surfactants (FIGS. 5A-5C), but not for the non-ionic or zwitterionic surfactants (FIGS. 7A-7C). The same behavior was observed in all three MD simulations for the SDS with both polar and non-polar oil models.

The MD trajectory snapshots for the anionic surfactant SDBS are shown in FIGS. 10A-10C. Three runs were performed for the polar oil model and three runs were performed for the non-polar oil model for a total of six runs. Only one run is shown. In the MD trajectory snapshots shown (FIGS. 10A-10C, run 1), no micelles were formed as the SDBS associated completely with the polar oil. In runs 2 and 3 (not shown) with the polar oil model, the MD trajectories showed formation of micelles with the polar oil. With respect to the non-polar oil model (runs 4-6, not shown), micelles only formed in one of the MD trajectories. Overall, this suggested that micelle formation can be quite general for all charged surfactants, cationic and anionic, with the exception of SDBS. In contrast, none of the neutral surfactants formed micelles in any of the simulations. SDBS fell exactly in the middle, with micelles formed in three of the six runs (3 each with the polar and non-polar oil, respectively) and with all the surfactant molecules surrounding the oil in the remaining three.

Without wishing to be bound by theory, the micelle formation may be related to both the size of the surfactant molecules and their overall polarity. Since the nonionic and zwitterionic surfactants are generally much larger than the charged ones, there is a lower number of their molecules present in the system (same concentration by weight %). As a result of the higher number of the charged surfactants, there may not be enough surface area on the oil droplet to accommodate them. In addition, the charged surfactant headgroups electrostatically repel each other and may require a larger surface area to form stable layers than the nonionic surfactants. SDBS is larger than SDS, but also less polar than SDS, which may help stabilize higher concentrations of SDBS on the oil droplet surface.

Figure 11A:
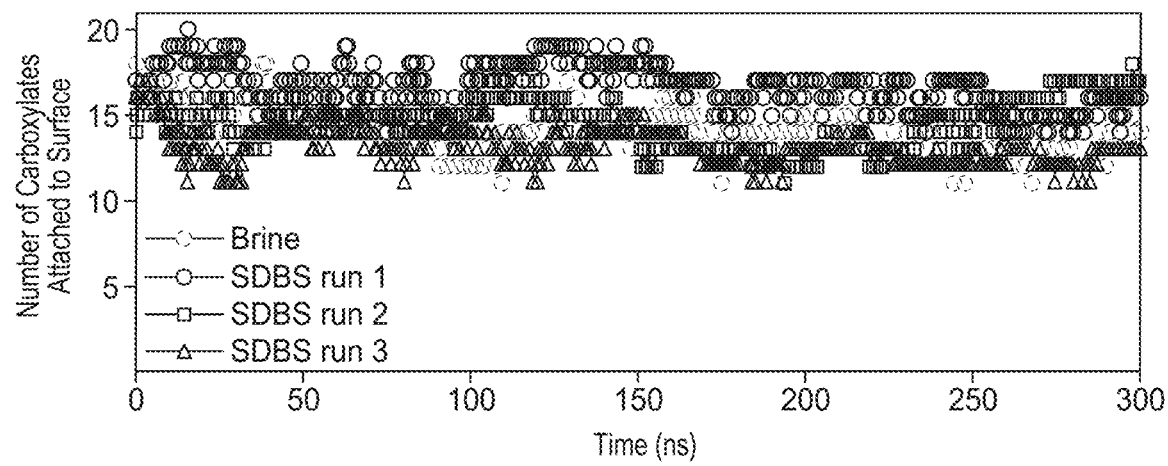
FIG. 11A shows exemplary MD simulation data of the wettability alteration by SDBS with a polar oil model according to at least one embodiment of the present disclosure. The data shown are from three independent MD trajectories with SDBS and an MD trajectory with brine alone.
Figure 11B:
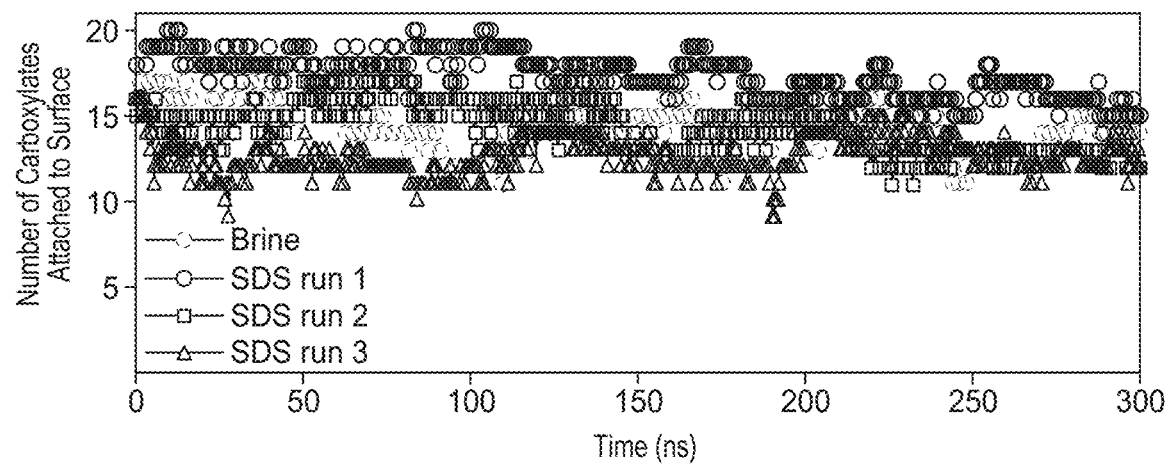
FIG. 11B shows exemplary MD simulation data of the wettability alteration by sodium dodecyl sulfate (SDS) with a polar oil model according to at least one embodiment of the present disclosure. The data shown are from three independent MD trajectories with SDS and an MD trajectory with brine alone.
Figure 16A:
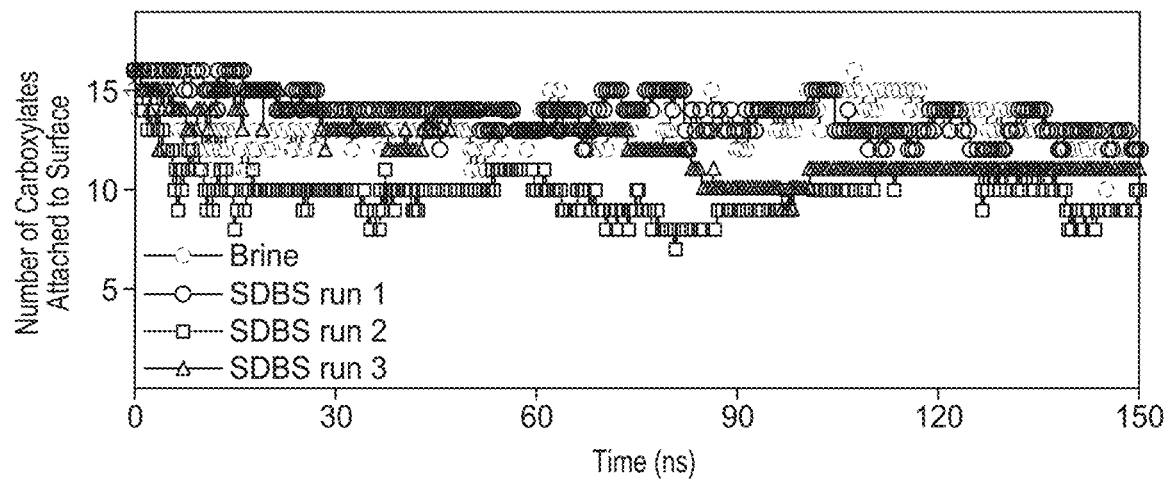
FIG. 16A shows exemplary MD simulation data of the wettability alteration by SDBS with a non-polar oil model according to at least one embodiment of the present disclosure. The data shown are from three independent MD trajectories with SDBS and an MD trajectory with brine alone.
Figure 16B:
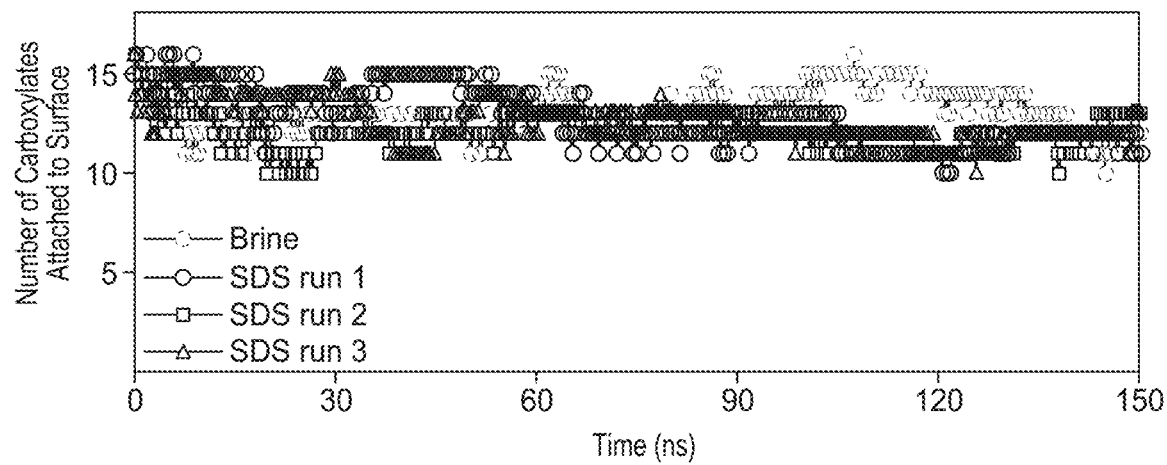
FIG. 16B shows exemplary MD simulation data of the wettability alteration by SDS with a non-polar oil model according to at least one embodiment of the present disclosure. The data shown are from three independent MD trajectories with SDS and an MD trajectory with brine alone.

FIGS. 11A and 11B show exemplary data for the wettability alteration by anionic surfactants with the polar oil model (POil). The plots detail the number of oil carboxylates bound to the calcite surface as a function of time during the 300 ns MD simulations with the anionic surfactants SDBS (FIG. 11A) and SDS (FIG. 11B). A control run with just the brine was also performed and shown in the figures. The MD simulations of the wettability alteration by the anionic surfactants with the non-polar oil model (NOil) were also performed, and the plots of adsorbed carboxylates for the NOil model are shown in FIGS. 16A and 16B (further discussed below).

The data shown in FIGS. 11A and 11B indicated that the behavior of the oil carboxylates in the presence of anionic surfactants, including both the overall level and the magnitude of the fluctuations, is somewhere in-between that observed for the cationic and neutral surfactants.

Multiple MD simulations were run for each surfactant with the polar oil model (POil). The MD simulation results with the surface bound carboxylates were subjected to statistical analyses to average over the fluctuations within each run as well as between the individual trajectories.

Figure 12A:
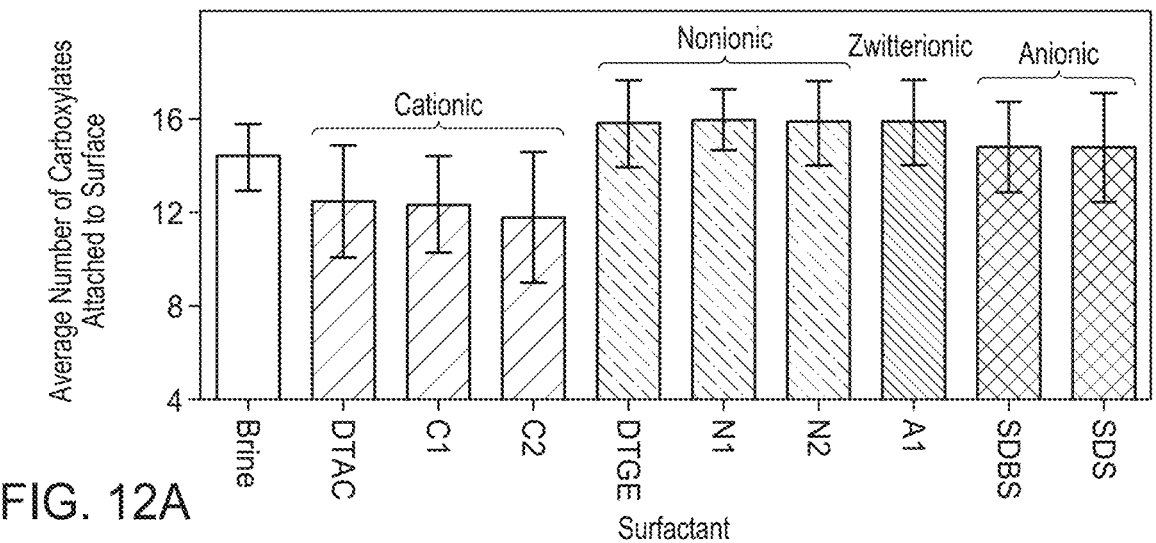
FIG. 12A is exemplary data showing the average number of polar oil carboxylates bound (or attached) to a calcite surface in the presence of surfactants over a 300-ns MD simulation, according to at least one embodiment of the present disclosure.
Figure 12B:
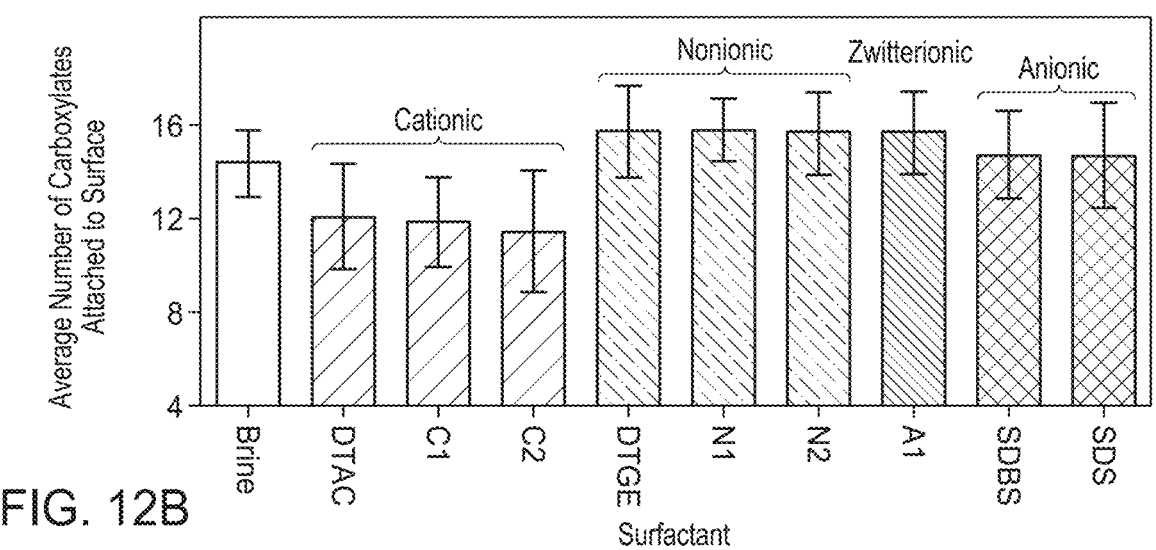
FIG. 12B is exemplary data showing the average number of polar oil carboxylates bound to a calcite surface in the presence of surfactants over the last 250 ns of a MD simulation, according to at least one embodiment of the present disclosure.
Figure 12C:
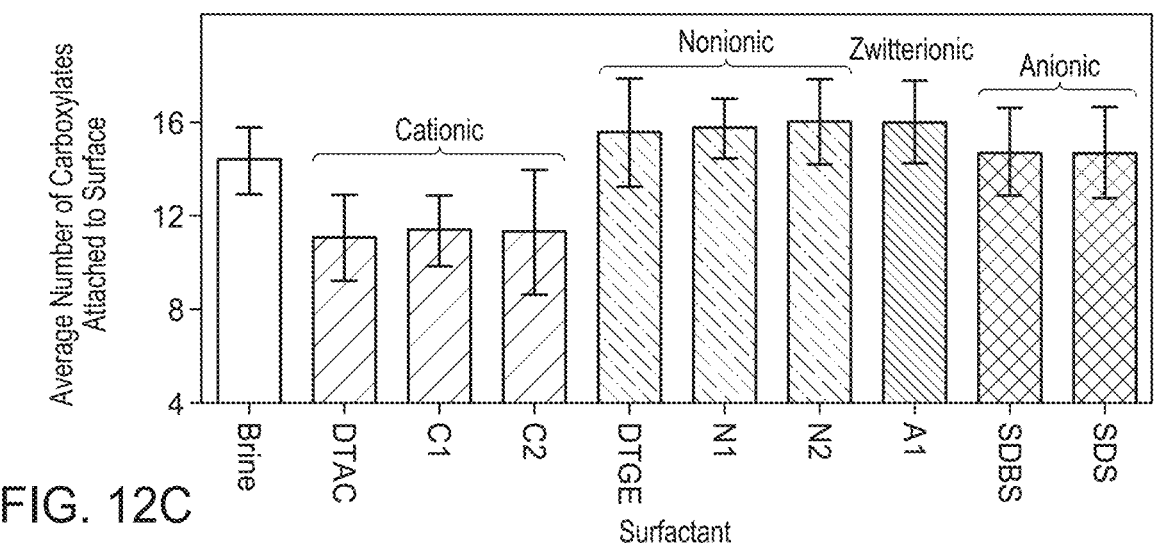
FIG. 12C is exemplary data showing the average number of polar oil carboxylates bound to a calcite surface in the presence of surfactants over the last 200 ns of a MD simulation, according to at least one embodiment of the present disclosure.

FIGS. 12A-12C show exemplary data illustrating the wettability alteration of the calcite surface by different surfactants for the polar oil model. The data are averages of the numbers of the polar oil carboxylates bound to the calcite surface along with the standard deviations (represented as error bars) over different portions of the trajectories—entire duration (300 ns), the last 250 ns, and the last 200 ns—from three MD trajectories. Specifically, FIG. 12A, FIG. 12B, and FIG. 12C shows the average number of polar oil carboxylates bound to the surface calculated over the entire duration (300 ns), the last 250 ns, and the last 200 ns of the MD simulations, respectively.

The data of FIGS. 12A-12C show the impact of the headgroup charge on the oil adsorption to the calcite surface. The cationic surfactants, on average, outperformed brine. The anionic surfactants are approximately on par with brine, while the neutral ones (non-ionic and zwitterionic) appeared to perform worse than brine.

Figure 13A:
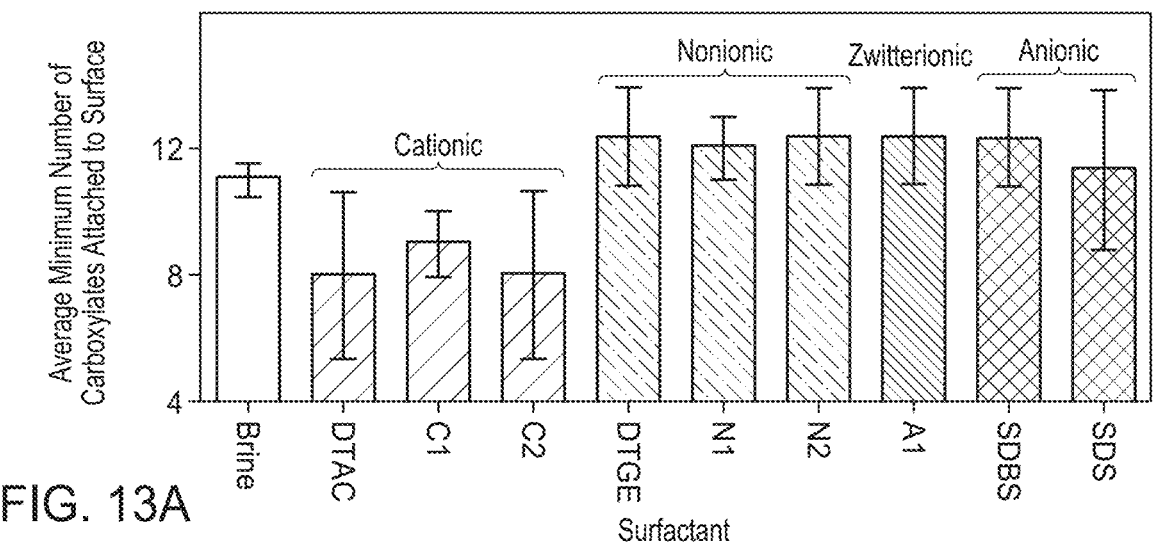
FIG. 13A is exemplary data showing the average minimum number of polar oil carboxylates bound to a calcite surface in the presence of surfactants according to at least one embodiment of the present disclosure. The average minimum number was calculated from three MD trajectories of each surfactant with the polar oil model.
Figure 13B:
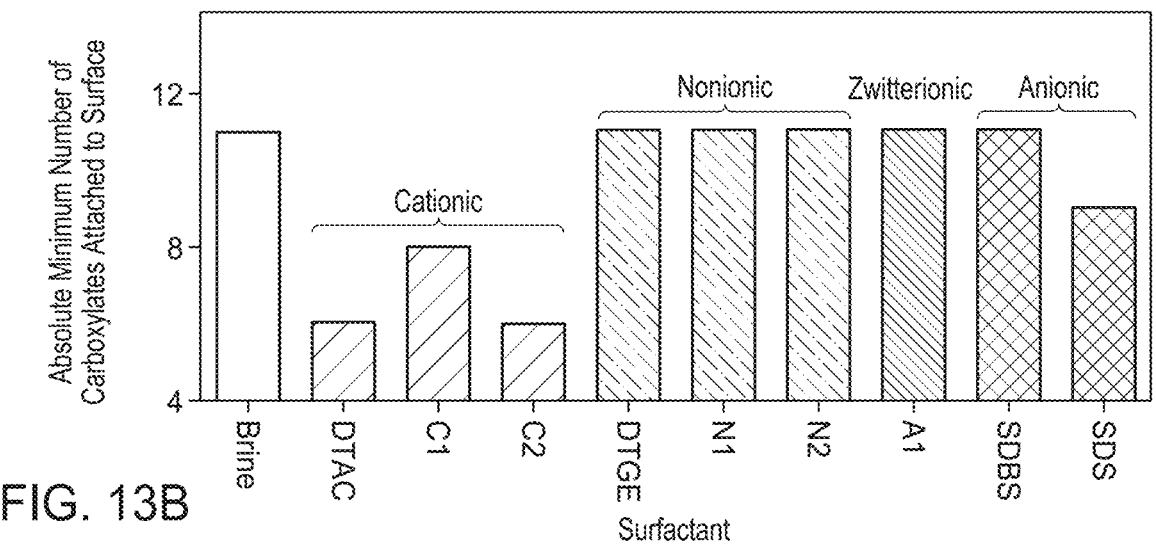
FIG. 13B is exemplary data showing the absolute minimum number of polar oil carboxylates bound to a calcite surface in the presence of surfactants according to at least one embodiment of the present disclosure. The absolute minimum number was taken from all MD trajectories of each surfactant with the polar oil model.
Figure 13C:
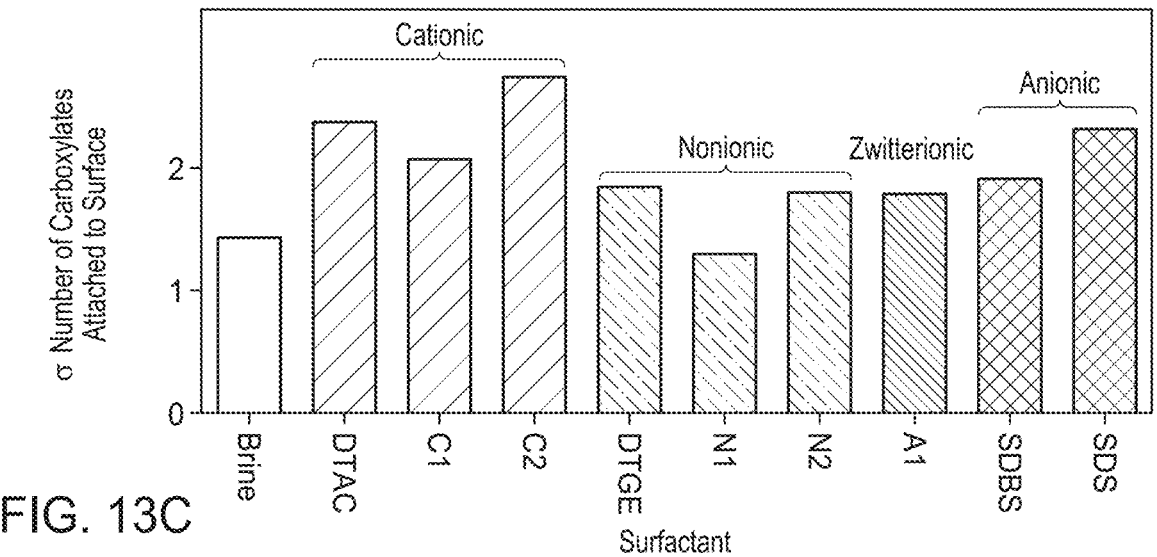
FIG. 13C is exemplary data showing the standard deviation ($\sigma$) of the number of polar oil carboxylates bound to a calcite surface in the presence of surfactants according to at least one embodiment of the present disclosure. The standard deviation was taken from all MD trajectories of each surfactant with the polar oil model.

Wettability alterations of the calcite surface by different surfactants for the polar oil model, in terms of the minimum number of oil carboxylates bound to the calcite surface, were also determined. FIG. 13A shows the average and standard deviation of minimum numbers of the carboxylates bound to the calcite surface achieved in the simulation over the three trajectories. The error bars represent one standard deviation. FIG. 13B shows the absolute minimum number of bound carboxylates from all MD runs. FIG. 13C shows the standard deviation ($\sigma$) of the number of the surface bound carboxylates from all MD data.

The data of FIGS. 13A-13C show that the cationic surfactants outperformed the other surfactants. The absolute minima plot (FIG. 13B) indicated that, with the exception of SDS, the anionic, non-ionic, and zwitterionic surfactants are not more effective in altering the wettability than the brine. The magnitude of the fluctuations (FIG. 13C) followed a similar trend.

The same analysis was performed for the non-polar oil (NOil) model, and exemplary data is shown in FIGS. 14A-14C, 15A-15D, 16A-16B, 17A-17C, and 18A-18D.

FIGS. 14A-14C show exemplary data for the MD simulation of the wettability alteration by cationic surfactants with the non-polar oil model (NOil). The plots detail the number of oil carboxylates bound to the calcite surface as a function of time for three independent MD trajectories with the cationic surfactants DTAC (FIG. 14A), C1 (FIG. 14B), and C2 (FIG. 14C). A control run with just the brine was also performed and shown in these figures. The NOil MD trajectories were stopped at 150 ns since equilibrium had been established. The non-polar oil has only 16 organic carboxylates, all of which are initially attached to the calcite surface. The wettability behavior of the DTAC, C1, and C2 surfactants was similar to that shown in FIGS. 6A-6C (polar oil model).

Figure 15A:
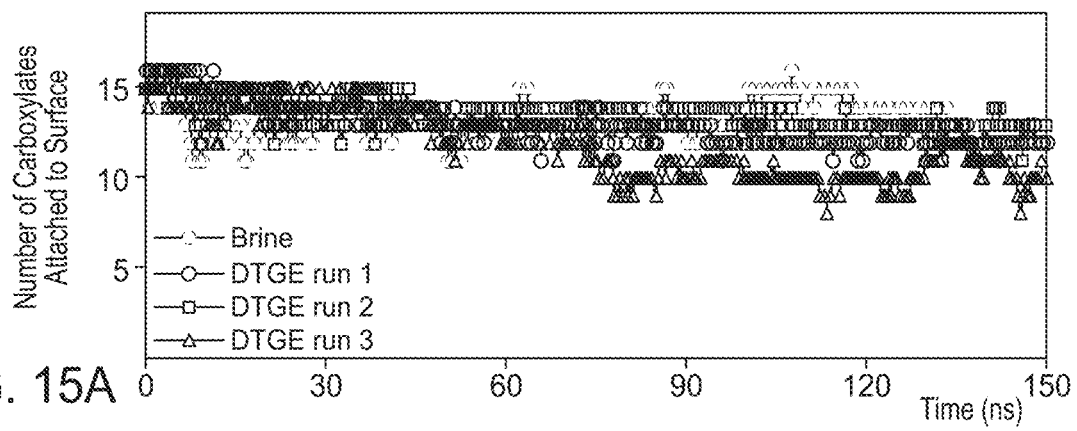
FIG. 15A shows exemplary MD simulation data of the wettability alteration by DTGE with a non-polar oil model according to at least one embodiment of the present disclosure. The data shown are from three independent MD trajectories with DTGE and an MD trajectory with brine alone.
Figure 15B:
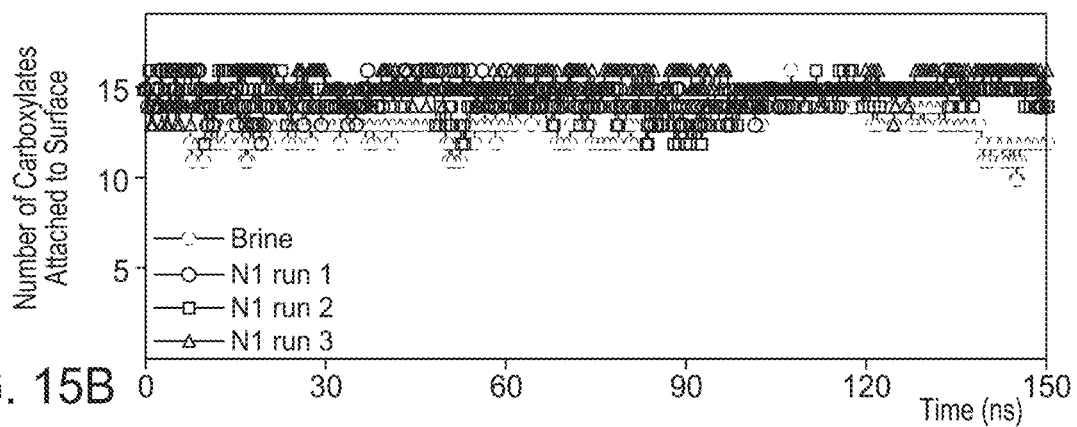
FIG. 15B shows exemplary MD simulation data of the wettability alteration by N1 with a non-polar oil model according to at least one embodiment of the present disclosure. The data shown are from three independent MD trajectories with N1 and an MD trajectory with brine alone.
Figure 15C:
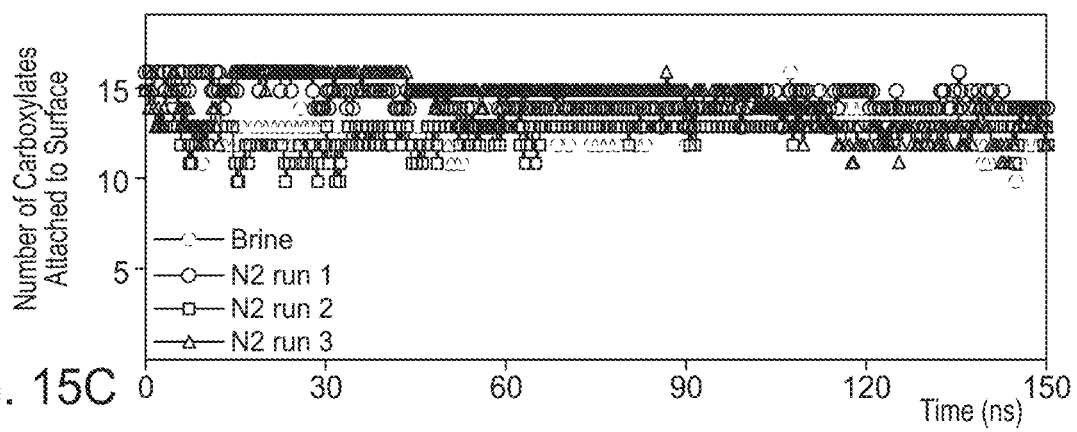
FIG. 15C shows exemplary MD simulation data of the wettability alteration by N2 with a non-polar oil model according to at least one embodiment of the present disclosure. The data shown are from three independent MD trajectories with N2 and an MD trajectory with brine alone.
Figure 15D:
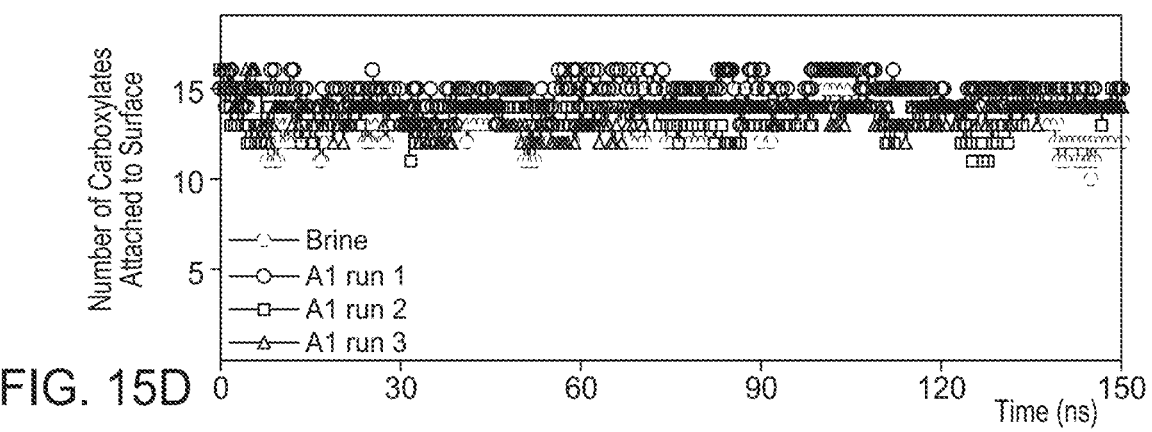
FIG. 15D shows exemplary MD simulation data of the wettability alteration by A1 with a non-polar oil model according to at least one embodiment of the present disclosure. The data shown are from three independent MD trajectories with A1 and an MD trajectory with brine alone.

FIGS. 15A-15D show exemplary data for the MD simulation of the wettability alteration by cationic surfactants with the non-polar oil model (NOil). The plots detail the number of oil carboxylates bound to the calcite surface as a function of time during the 300 ns MD simulations with the nonionic surfactants DTGE (FIG. 15A), N1 (FIG. 15B), N2 (FIG. 15C), and the zwitterionic surfactant A1 (FIG. 15D). The simulation with just the brine (gray) is also shown for comparison. The data indicates that the numbers of bound carboxylates for the non-ionic and zwitterionic surfactant simulations (FIGS. 15A-15D) do not trend lower with time as strongly as for the cationic surfactants (FIGS. 14A-14C).

FIGS. 16A and 16B show exemplary data for the wettability alteration by anionic surfactants with the non-polar oil model (NOil). The plots detail the number of oil carboxylates bound to the calcite surface as a function of time during the 300 ns MD simulations with the anionic surfactants SDBS (FIG. 16A) and SDS (FIG. 16B). A control run with just the brine was also performed and shown in the figures. The data of FIGS. 16A and 16B indicated that the behavior of the non-polar oil carboxylates in the presence of anionic surfactants, including both the overall level and the magnitude of the fluctuations, is somewhere in-between that observed for the cationic and neutral surfactants.

Figure 17A:
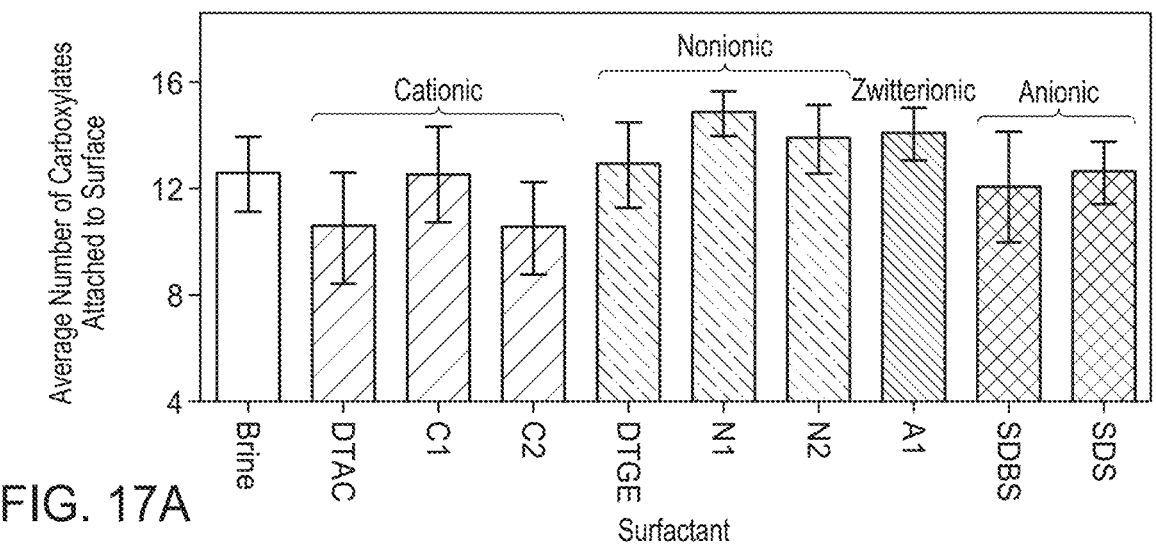
FIG. 17A is exemplary data showing the average number of non-polar oil carboxylates bound to a calcite surface in the presence of surfactants over an entire 150-ns MD simulation, according to at least one embodiment of the present disclosure.
Figure 17B:
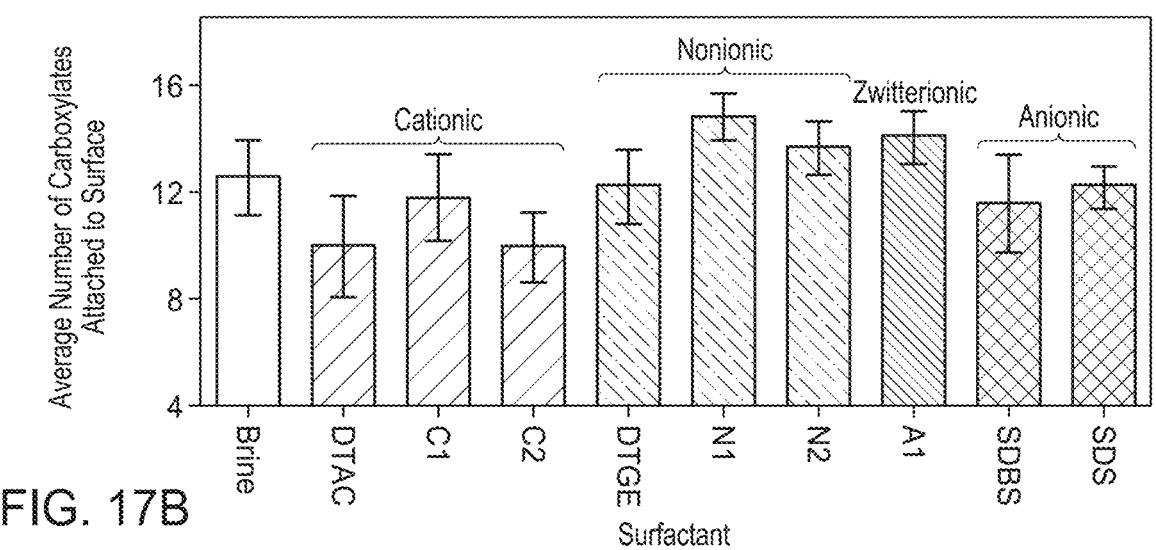
FIG. 17B is exemplary data showing the average number of non-polar oil carboxylates bound to a calcite surface in the presence of surfactants over the last 100 ns of the MD simulation, according to at least one embodiment of the present disclosure.
Figure 17C:
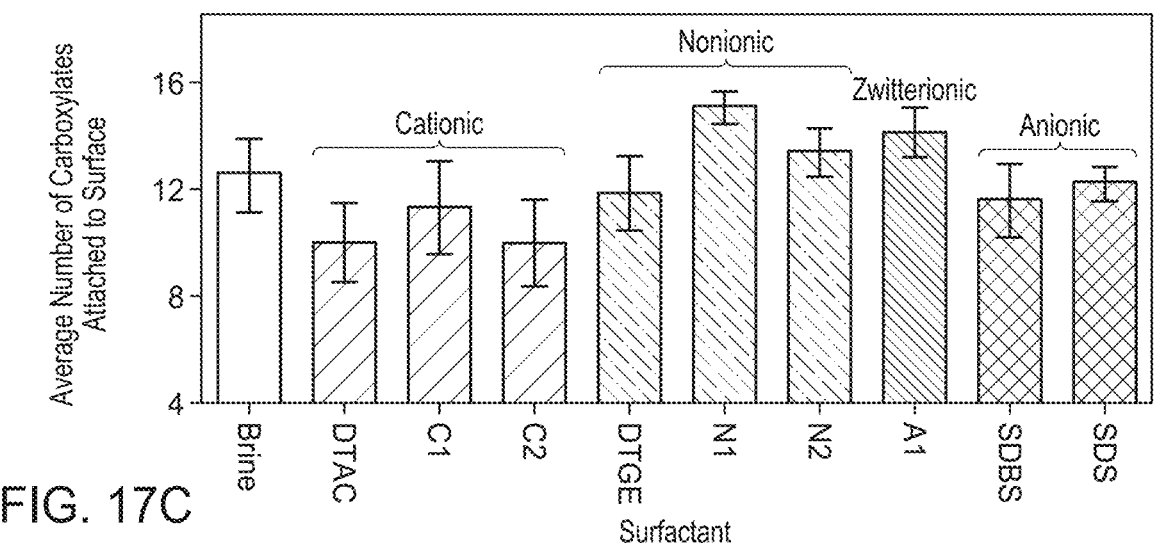
FIG. 17C is exemplary data showing the average number of non-polar oil carboxylates bound to a calcite surface in the presence of surfactants over the last 50 ns of the MD simulation, according to at least one embodiment of the present disclosure.

Multiple MD simulations were run for each surfactant with the non-polar oil (NOil) model. The MD simulation results with the surface bound carboxylates were subjected to statistical analyses to average over the fluctuations within each run as well as between the individual trajectories. FIGS. 17A-17C show exemplary data illustrating the wettability alteration of the calcite surface by different surfactants for the non-polar oil model. The data are averages of the numbers of the non-polar oil carboxylates bound to the calcite surface along with the standard deviations (represented as error bars) over different portions of the trajectories from all three MD runs. Specifically, FIG. 17A, FIG. 17B, and FIG. 17C shows the average number of non-polar oil carboxylates bound to the surface over the entire duration (150 ns), the last 100 ns, and the last 50 ns of the MD simulations, respectively. The data in FIGS. 17A-17C show the impact of the headgroup charge on the oil adsorption to the calcite surface.

Figure 18A:
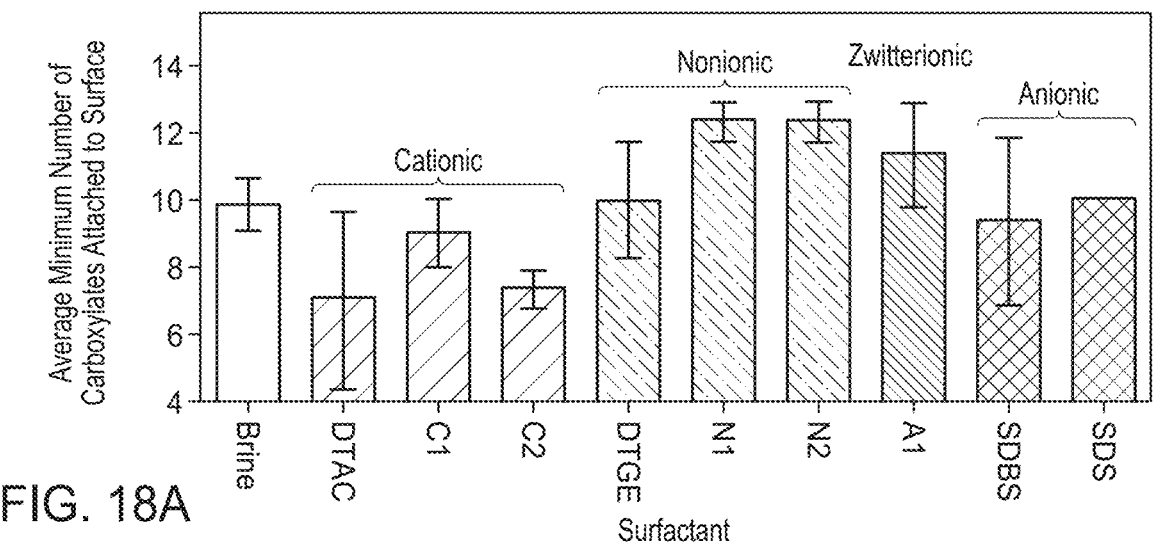
FIG. 18A is exemplary data showing the average minimum number of non-polar oil carboxylates bound to a calcite surface in the presence of surfactants according to at least one embodiment of the present disclosure. The average minimum number was calculated from three MD trajectories of each surfactant with the non-polar oil model.
Figure 18B:
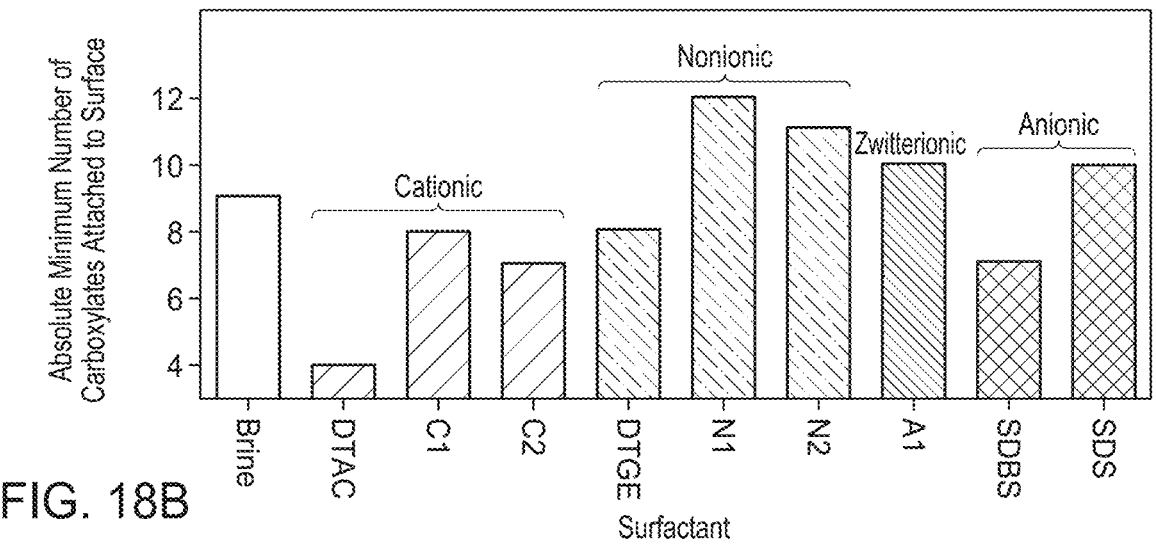
FIG. 18B is exemplary data showing the absolute minimum number of non-polar oil carboxylates bound to a calcite surface in the presence of surfactants according to at least one embodiment of the present disclosure. The absolute minimum number was taken from all MD trajectories of each surfactant with the non-polar oil model.
Figure 18C:
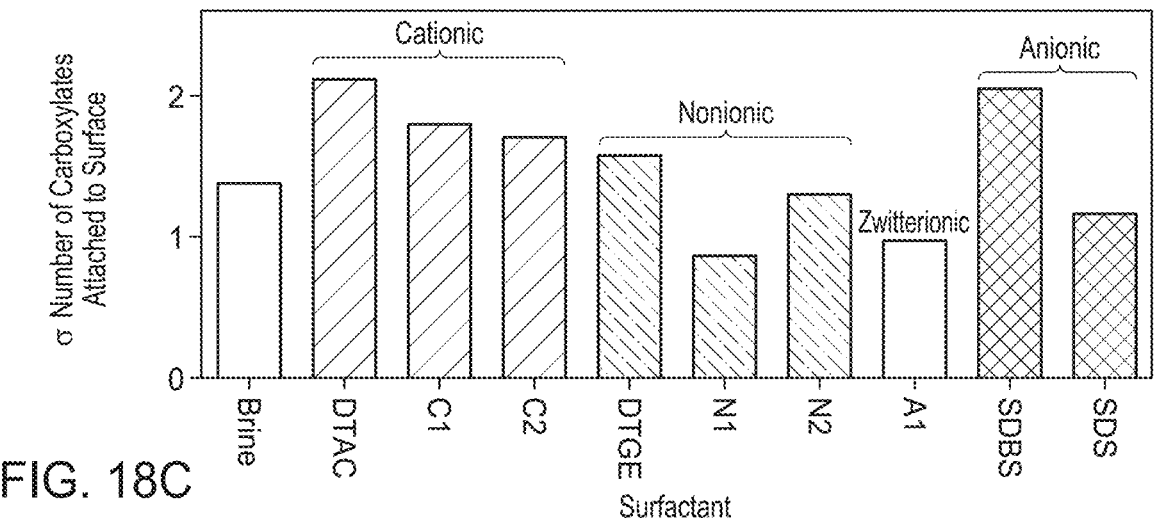
FIG. 18C is exemplary data showing the standard deviation ($\sigma$) of the number of non-polar oil carboxylates bound to a calcite surface in the presence of surfactants according to at least one embodiment of the present disclosure. The standard deviation was taken from all MD trajectories of each surfactant with the non-polar oil model.

Wettability alterations of the calcite surface by different surfactants for the non-polar oil model, in terms of the minimum number of oil carboxylates bound to the calcite surface, were also determined. FIG. 18A shows the average and standard deviation of minimum numbers of the non-polar oil carboxylates bound to the calcite surface achieved in the simulation over the three trajectories. The error bars represent one standard deviation. FIG. 18B shows the absolute minimum number of bound carboxylates from all MD runs. FIG. 18C shows the standard deviation ($\sigma$) of the number of the surface bound carboxylates from all MD data.

Overall, the wettability alteration of the calcite surface by different surfactants was similar between the non-polar oil model and polar oil model. One difference was the relatively stronger performance of the SDBS over SDS in the non-polar oil, in contrast to the polar oil. With respect to the charge of the surfactants, it was found that the cationic surfactants are able to detach the organic carboxylates more efficiently than brine, while the neutral and anionic surfactants do not seem to have any measurable effect on the wettability.

Embodiments described herein generally relate to methods and apparatus for enhanced oil recovery. Methods and apparatus described herein can be used to, e.g., pre-screen additives and to determine an additive or formulation for use in enhanced oil recovery operations. Moreover, embodiments described herein enable the uncovering of the molecular mechanism of the wettability alteration by different types of surfactants. Embodiments described herein can also enable the design of new additives and new additive formulations for enhanced oil recovery operations.

As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

References cited herein are incorporated by reference herein in their entirety to indicate the state of the art as of their publication or filing date and it is intended that this information can be employed herein, if needed, to exclude specific embodiments that are in the prior art.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

For the purposes of this present disclosure, and unless otherwise specified, the terms "group," "radical," and "substituent" may be used interchangeably.

For the purposes of this present disclosure, and unless otherwise specified, the term "alkyl" or "alkyl group" interchangeably refers to a hydrocarbyl group consisting of carbon and hydrogen atoms. An alkyl group can be substituted or unsubstituted and can be linear, branched, or cyclic.

For the purposes of this present disclosure, and unless otherwise specified, the terms "hydrocarbyl" or "hydrocarbyl group," interchangeably refer to a group consisting of hydrogen and carbon atoms only. A hydrocarbyl group can be saturated or unsaturated, linear or branched, cyclic or acyclic, aromatic, or non-aromatic. Examples of such groups include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and aryl groups, such as phenyl, benzyl, and naphthyl.

For the purposes of the present disclosure, and unless otherwise specified, the term "aryl" or "aryl group" interchangeably refers to a hydrocarbyl group comprising an aromatic ring structure therein. Likewise, heteroaryl refers to an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

For the purposes of this present disclosure, and unless otherwise specified, a substituted group refers to a group in which at least one atom is replaced by a different atom or a group. Thus, a substituted hydrocarbon is a hydrocarbon in which at least one hydrogen atom is replaced by a hydrocarbyl group, a halogen, any other non-hydrogen group, and/or at least one carbon atom and hydrogen atoms bonded thereto is replaced by a different group. As a non-limiting example, a substituted group is a group in which at least one hydrogen atom has been substituted with a heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as $C(O)R^*$, $C(C)NR^*_2$, $C(O)OR^*$, $NR^*_2$, $OR^*$, $SeR^*$, $TeR^*$, $PR^*_2$, $AsR^*_2$, $SbR^*_2$, $SR^*$, $SO_x$ (where x=2 or 3), $BR^*_2$, $SiR^*_3$, $GeR^*_3$, $SnR^*_3$, $PbR^*_3$, and the like, or where at least one heteroatom has been inserted within the hydrocarbyl or aryl such as one or more of halogen (Cl, Br, I, F), O, N, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen, hydrocarbyl (e.g., $C_1$-$C_{10}$), or two or more $R^*$ may join together to form a substituted or unsubstituted completely saturated, partially unsaturated, fully unsaturated, or aromatic cyclic or polycyclic ring structure.

"Substituted hydrocarbyl", "substituted aryl", and "substituted heteroaryl" refers to a hydrocarbyl, aryl, or heteroaryl where at least one hydrogen of the hydrocarbyl, aryl, or heteroaryl has been replaced by a hydrocarbyl, a heteroatom, or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as $C(O)R^*$, $C(C)NR^*_2$, $C(O)OR^*$, $NR^*_2$, $OR^*$, $SeR^*$, $TeR^*$, $PR^*_2$, $AsR^*_2$, $SbR^*_2$, $SR^*$, $SO_x$ (where x=2 or 3), $BR^*_2$, $SiR^*_3$, $GeR^*_3$, $SnR^*_3$, $PbR^*_3$, and the like, or where at least one heteroatom has been inserted within the hydrocarbyl or aryl such as one or more of halogen (Cl, Br, I, F), O, N, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen, hydrocarbyl (e.g., $C_1$-$C_{10}$), or two or more $R^*$ may join together to form a substituted or unsubstituted completely saturated, partially unsaturated, fully unsaturated, or aromatic cyclic or polycyclic ring structure.

The term "alkoxy" refers to an alkyl or aryl group bound to an oxygen atom, such as an alkyl ether or aryl ether group and can include those where the alkyl/aryl group is a $C_1$-$C_{10}$ hydrocarbyl. The alkyl/aryl group may be straight chain, branched, cyclic or acyclic, saturated or unsaturated, aromatic or non-aromatic. The alkyl/aryl group may be substituted.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl). When a compound is described herein such that a particular isomer, enantiomer or diastereomer of the compound is not specified, for example, in a formula or in a chemical name, that description is intended to include each isomers and enantiomer of the compound described individual or in any combination.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions that are appropriate for preparation of salts of for a given application.

As used herein, the indefinite article "a" or "an" shall mean "at least one" unless specified to the contrary or the context clearly indicates otherwise. For example, embodiments comprising "an additive" include embodiments comprising one, two, or more additives, unless specified to the contrary or the context clearly indicates only one additive is included.

While the foregoing is directed to embodiments of the present disclosure, other and further aspects of the disclosure may be devised without departing from the basic scope thereof, and the scope thereof is determined by the claims that follow.

What is claimed is:

1. A method of enhanced oil recovery from a reservoir, the method comprising:
   determining a three-dimensional molecular association between simulated oil and a simulated surface using molecular dynamics, wherein the simulated surface is modeled with a topmost calcite plane having a net positive charge by a method comprising:
      substituting a first carbonate ion ($CO_3^{2-}$) of a plurality of carbonate ions of the topmost calcite plane with a bicarbonate ion ($HCO_3^-$);
      substituting a second carbonate ion ($CO_3^{2-}$) of the plurality of carbonate ions of the topmost calcite plane with a first hydroxyl anion ($OH^-$) to form an OH filled vacancy site; and
      attaching a second hydroxyl anion ($OH^-$) to the $OH^-$ filled vacancy site of the topmost calcite plane;
   selecting a reservoir additive from a plurality of additives, wherein the selecting of the reservoir additive from the plurality of additives comprises:
      simulating an interaction of the reservoir additive of the plurality of additives with the three-dimensional molecular association between the simulated oil and the simulated surface using molecular dynamics;
   introducing the reservoir additive to the reservoir; and
   recovering oil from the reservoir using the reservoir additive.

2. The method of claim 1, wherein the selecting the reservoir additive from the plurality of additives further comprises:
   measuring a first simulated wettability alteration characteristic, wherein the first simulated wettability alteration characteristic is associated with a first additive of the plurality of additives;
   repeating the simulating and measuring operations for each remaining additive of the plurality of additives to produce a simulated wettability alteration characteristic for each remaining additive of the plurality of additives, wherein each simulated wettability alteration characteristic is associated with the respective additive;
   comparing the simulated wettability alteration characteristics of the plurality of additives to each other; and
   selecting the reservoir additive from the plurality of additives based on the comparison.

3. The method of claim 1, wherein the determining the three-dimensional molecular association further comprises:
   modeling oil adsorption on the simulated surface, the oil adsorption comprising an interaction of a negatively charged carboxylate of the simulated oil with a positively charged site of the simulated surface.

4. The method of claim 1, wherein the determining the three-dimensional molecular association further comprises modeling polar components of the simulated oil, non-polar components of the oil, or both.

5. The method of claim 1, wherein the determining the three-dimensional molecular association further comprises modeling a brine component of the reservoir.

6. The method of claim 1, wherein the simulated oil has an aliphatic hydrocarbon, an aromatic hydrocarbon, a sulfur-containing compound, an oxygen-containing compound, and a nitrogen-containing compound.

7. The method of claim 1, wherein the plurality of additives comprises a surfactant, a foaming chemical, a polymer, an amphiphile, a nanoparticle, or combinations thereof.

8. The method of claim 1, wherein the plurality of additives comprises a cationic surfactant, an anionic surfactant, a non-ionic surfactant, a zwitterionic surfactant, or combinations thereof.

9. The method of claim 1, wherein the simulated surface is configured to model a carbonate surface.

10. The method of claim 9, wherein the carbonate surface is calcite.

11. The method of claim 1, wherein the determining the three-dimensional molecular association further comprises modeling the simulated surface as a $\{1,0,-1,4\}$ plane of calcite.

12. The method of claim 1, wherein the simulated surface is configured to model a dolomite surface, a silica surface, or a combination thereof.

13. The method of claim 1, wherein the simulated surface includes multiple layers.

14. The method of claim 1, wherein the simulated surface includes a vacancy.

15. The method of claim 1, wherein:
   the simulated surface is a first simulated surface; and
   the method further comprises selecting a second reservoir additive from the plurality of additives, wherein the selecting the second reservoir additive comprises:
      determining a second three-dimensional molecular association between the simulated oil and a second simulated surface using molecular dynamics;
      simulating an interaction of a first additive of the plurality of additives with the second three-dimensional molecular association between the simulated oil and the second simulated surface using molecular dynamics;
      measuring a first simulated wettability alteration characteristic, wherein the first simulated wettability alteration characteristic is associated with the first additive;
      repeating the simulating and measuring operations for each remaining additive of the plurality of additives to produce a simulated wettability alteration characteristic for each remaining additive of the plurality of additives, wherein each simulated wettability alteration characteristic is associated with the respective additive;
      comparing the simulated wettability alteration characteristics of the plurality of additives to each other; and
      selecting the second reservoir additive from the plurality of additives based on the comparison.

16. A method of determining an effect of a formulation for use in enhanced oil recovery, the method comprising:
   determining a three-dimensional molecular association between simulated oil and a simulated surface using molecular dynamics, wherein the simulated surface is modeled with a topmost calcite plane having a net positive charge by a method comprising:
    substituting a first carbonate ion ($CO_3^{2-}$) of a plurality of carbonate ions of the topmost calcite plane with a bicarbonate ion ($HCO_3^-$);
    substituting a second carbonate ion ($CO_3^{2-}$) of the plurality of carbonate ions of the topmost calcite plane with a first hydroxyl anion ($OH^-$) to form an OH filled vacancy site; and
    attaching a second hydroxyl anion ($OH^-$) to the $OH^-$ filled vacancy site of the topmost calcite plane;
simulating an interaction of a first formulation with the simulated oil and the simulated surface using molecular dynamics, the first formulation comprising a surfactant;
measuring a first simulated wettability alteration characteristic, wherein the first simulated wettability alteration characteristic is associated with the first formulation;
repeating the simulating and measuring operations for a second formulation to produce a second simulated wettability alteration characteristic;
comparing the first simulated wettability alteration characteristic and the second simulated wettability alteration characteristic to each other;
selecting a preferred formulation based on the comparison; and
providing a reservoir additive based on the preferred formulation for use in enhanced oil recovery.

17. The method of claim 16, wherein:
the simulated surface is configured to model a calcite surface, a dolomite surface, a silica surface, or a combination thereof; and
the simulated oil includes polar components and non-polar components.

18. An oil extraction apparatus, comprising:
a processor configured to:
    determine a three-dimensional molecular association between simulated oil and a simulated surface using molecular dynamics, wherein the simulated surface is modeled with a topmost calcite plane having a net positive charge by a method comprising;
        substituting a first carbonate ion ($CO_3^{2-}$) of a plurality of carbonate ions of the topmost calcite plane with a bicarbonate ion ($HCO_3^-$);
        substituting a second carbonate ion ($CO_3^{2-}$) of the plurality of carbonate ions of the topmost calcite plane with a first hydroxyl anion ($OH^-$) to form an OH filled vacancy site; and
        attaching a second hydroxyl anion ($OH^-$) to the $OH^-$ filled vacancy site of the topmost calcite plane;
    simulate an interaction of a first additive of a plurality of additives with the simulated oil and the simulated surface using molecular dynamics;
    measure a first simulated wettability alteration characteristic, the first simulated wettability alteration characteristic associated with the first additive;
    repeat the simulate and measure operations for each remaining additive of the plurality of additives to produce a simulated wettability alteration characteristic for each remaining additive;
    compare the simulated wettability alteration characteristics of the plurality of additives to each other; and
    select a reservoir additive from the plurality of additives based on the comparison;
an additive injection unit configured to inject the reservoir additive into a reservoir; and
an extraction unit configured to extract oil from the reservoir.

19. The oil extraction apparatus of claim 18, wherein:
the simulated surface is a simulated carbonate surface; and
the reservoir is a carbonate-containing reservoir.

20. The oil extraction apparatus of claim 18, wherein the plurality of additives comprises a surfactant.

* * * * *